US012495955B2

(12) United States Patent
Switzer

(10) Patent No.: US 12,495,955 B2
(45) Date of Patent: Dec. 16, 2025

(54) SELF-ADVANCING ENDOSCOPIC PROBE AND SYSTEM COMPROMISING SAME

(71) Applicant: Endogene Limited, Brighton (AU)

(72) Inventor: Anthony Switzer, Glenbrook (AU)

(73) Assignee: ENDOGENE LIMITED, Brighton (AU)

( * ) Notice: Subject to any disclaimer, the term of this patent is extended or adjusted under 35 U.S.C. 154(b) by 980 days.

(21) Appl. No.: 17/290,007

(22) PCT Filed: Oct. 31, 2019

(86) PCT No.: PCT/AU2019/051204
§ 371 (c)(1),
(2) Date: Apr. 29, 2021

(87) PCT Pub. No.: WO2020/087129
PCT Pub. Date: May 7, 2020

(65) Prior Publication Data
US 2022/0000346 A1 Jan. 6, 2022

(30) Foreign Application Priority Data

Oct. 31, 2018 (AU) .................................. 2018904148

(51) Int. Cl.
*A61B 1/00* (2006.01)
(52) U.S. Cl.
CPC ...... *A61B 1/00147* (2013.01); *A61B 1/00059* (2013.01); *A61B 1/0011* (2013.01);
(Continued)

(58) Field of Classification Search
CPC ............ A61B 1/00147; A61B 1/00059; A61B 1/0011; A61B 1/00128; A61B 1/00135;
(Continued)

(56) References Cited

U.S. PATENT DOCUMENTS 3,485,237 A * 12/1969 Bedford ............. A61M 25/0116
138/116
5,985,038 A * 11/1999 Dawson ................. A61B 90/70
134/1
(Continued)

FOREIGN PATENT DOCUMENTS

| CN | 115429195 | * | 9/2022 |
| CN | 117137583 | * | 8/2023 |
| WO | WO 2018/195598 A1 | | 11/2018 |

OTHER PUBLICATIONS

International Search Report for corresponding International Patent Application No. PCT/AU2019/051204, dated Jan. 16, 2020, 11 pgs.
(Continued)

*Primary Examiner* — Anh T Nguyen
*Assistant Examiner* — Li-Ting Song
(74) *Attorney, Agent, or Firm* — Crowell & Moring LLP

(57) ABSTRACT

Embodiments generally relate to propulsion devices, systems, or components thereof, for progressing instruments along passages, as well as associated methods of manufacture. For example, the instruments may include tools, sensors, probes and/or monitoring equipment for medical use (such as endoscopy) or industrial use (such as mining). The described embodiments may also be suitable for applications in other fields to progress an instrument along a passage. Some embodiments relate to an endoscope comprising or configured to receive a propulsion tube configured to assist in progressing the endoscope along a passage.

20 Claims, 36 Drawing Sheets

(52) U.S. Cl.
CPC ...... *A61B 1/00128* (2013.01); *A61B 1/00135* (2013.01); *A61B 1/00154* (2013.01); *A61B 1/00156* (2013.01); *A61B 1/00158* (2013.01); *A61B 2562/0219* (2013.01)

(58) Field of Classification Search
CPC ............ A61B 1/00154; A61B 1/00156; A61B 1/00158; A61B 2562/0219
See application file for complete search history.

(56) References Cited

U.S. PATENT DOCUMENTS

| | | | |
|---|---|---|---|
| 2002/0018735 A1* | 2/2002 | Rossell | A61L 2/18 422/128 |
| 2002/0111535 A1 | 8/2002 | Kim et al. | |
| 2006/0089535 A1* | 4/2006 | Raz | A61B 1/0052 600/152 |
| 2006/0235368 A1* | 10/2006 | Oz | A61B 17/32056 606/1 |
| 2008/0097292 A1 | 4/2008 | Cabiri et al. | |
| 2008/0199065 A1* | 8/2008 | Swain | A61B 1/00156 382/133 |
| 2010/0256448 A1 | 10/2010 | Smith et al. | |
| 2011/0270037 A1* | 11/2011 | Soutorine | A61M 25/005 600/139 |
| 2015/0119639 A1 | 4/2015 | Ebata | |
| 2016/0015247 A1 | 1/2016 | Irion et al. | |
| 2016/0380523 A1 | 12/2016 | Hunter et al. | |
| 2017/0079515 A1* | 3/2017 | Iwasaki | A61B 1/123 |
| 2017/0112367 A1* | 4/2017 | Soutorine | A61M 25/01 |
| 2018/0125372 A1* | 5/2018 | Petroff | A61B 5/6852 |
| 2018/0279994 A1* | 10/2018 | Schaer | A61B 8/12 |
| 2022/0142462 A1* | 5/2022 | Douk | A61B 1/015 |

OTHER PUBLICATIONS

Written Opinion for corresponding International Patent Application No. PCT/AU2019/051204, dated Jan. 16, 2020, 10 pgs.

* cited by examiner

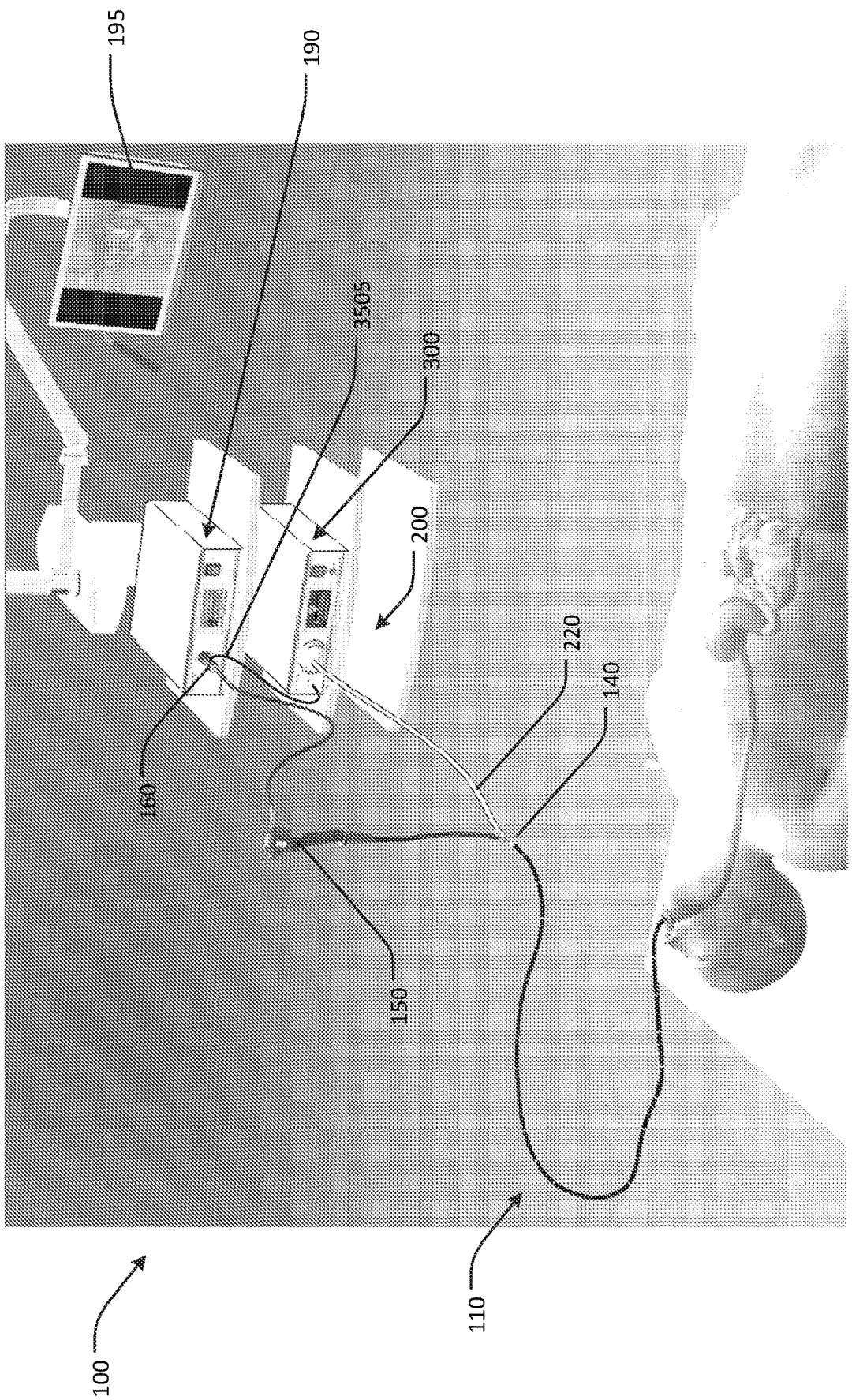

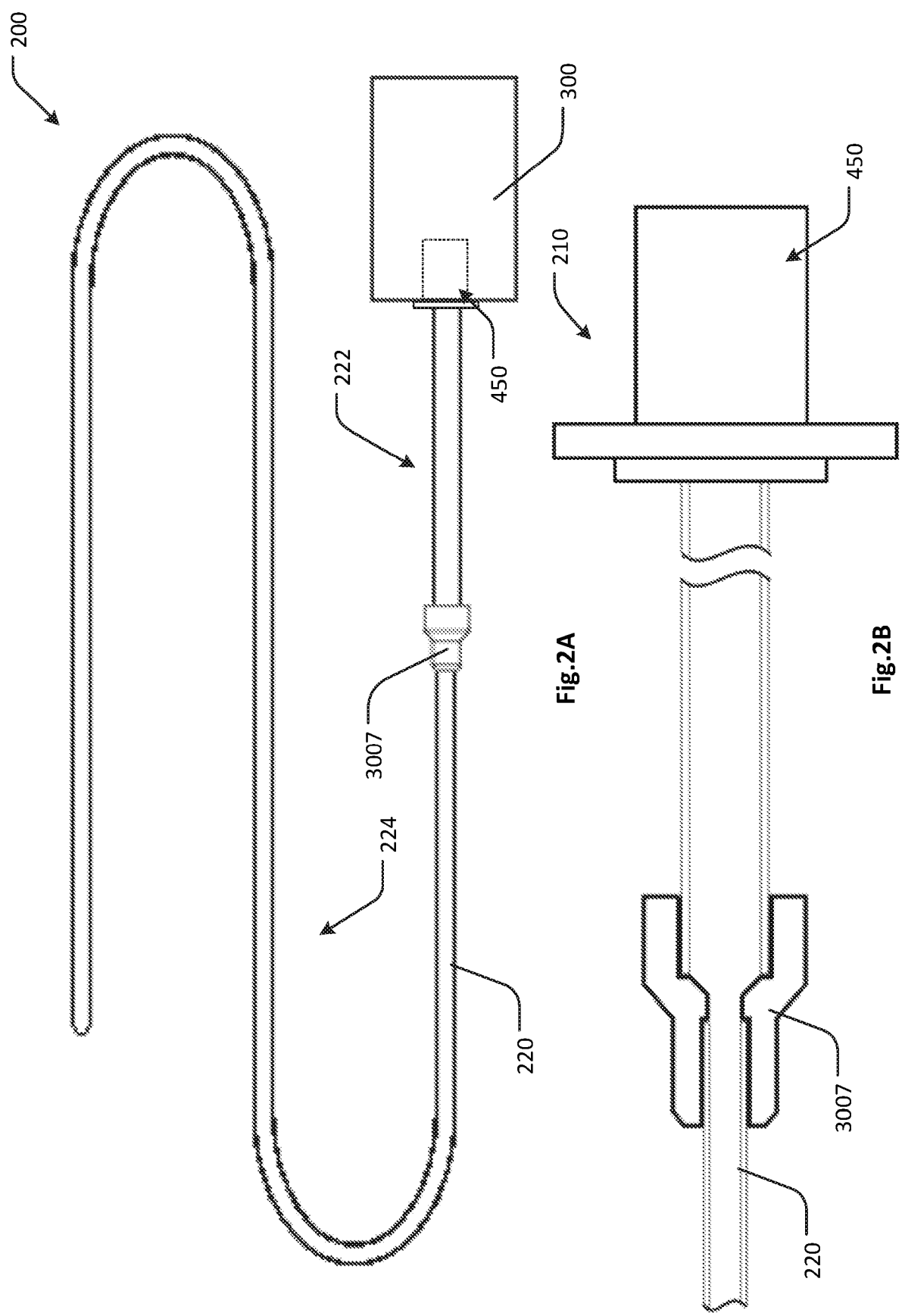

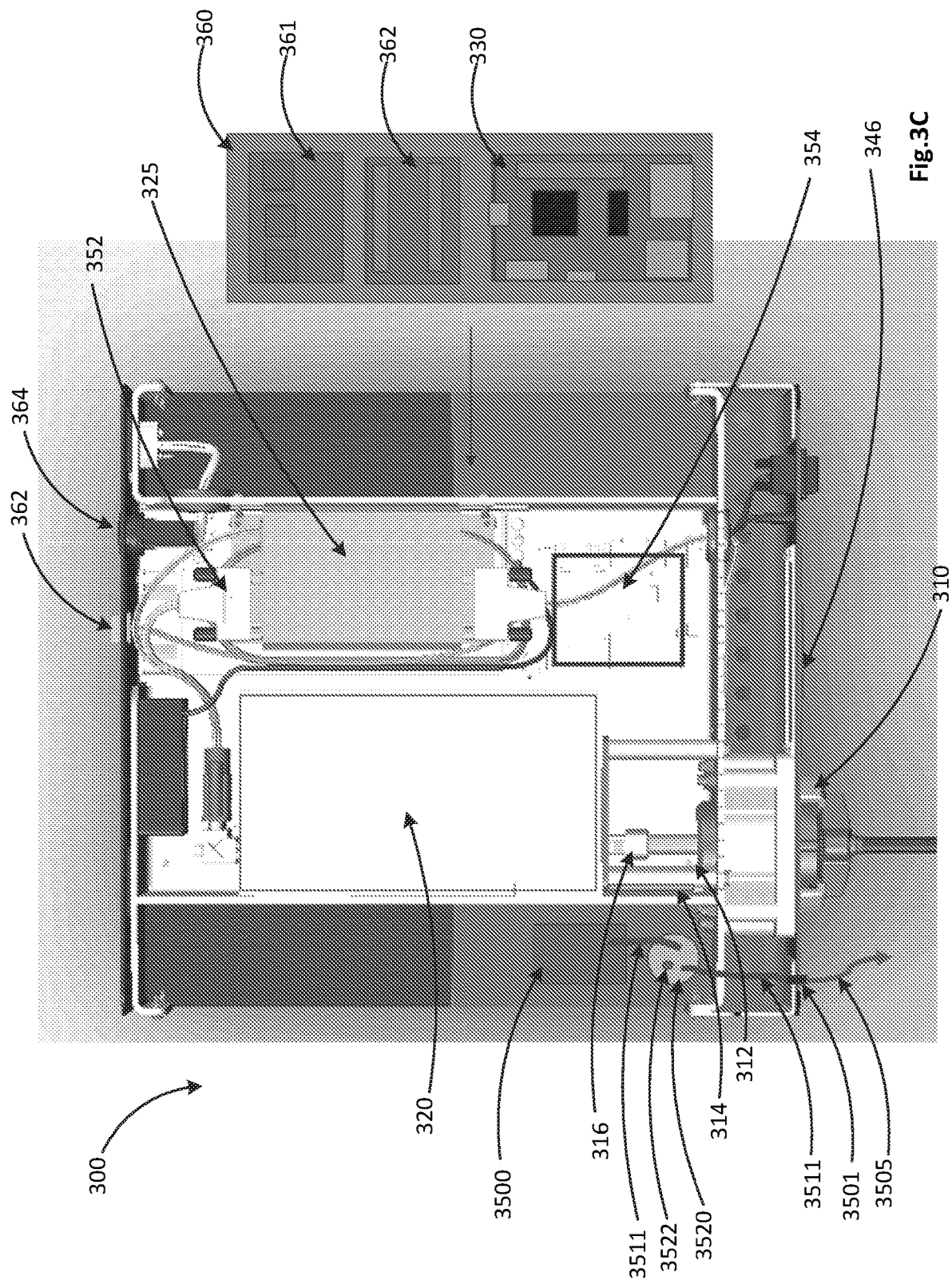

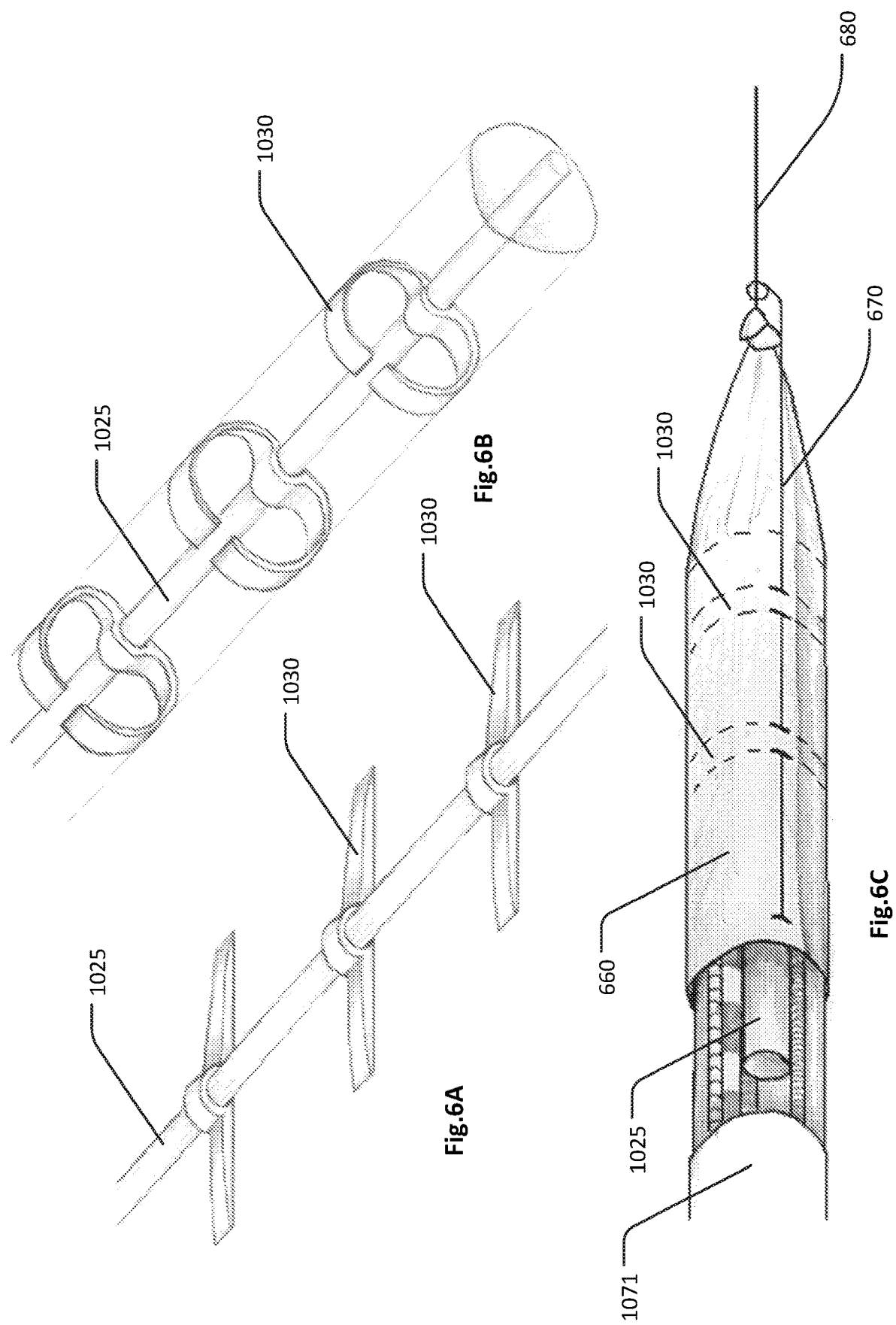

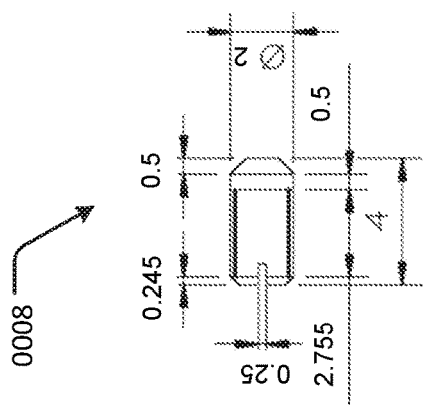
Fig.7D
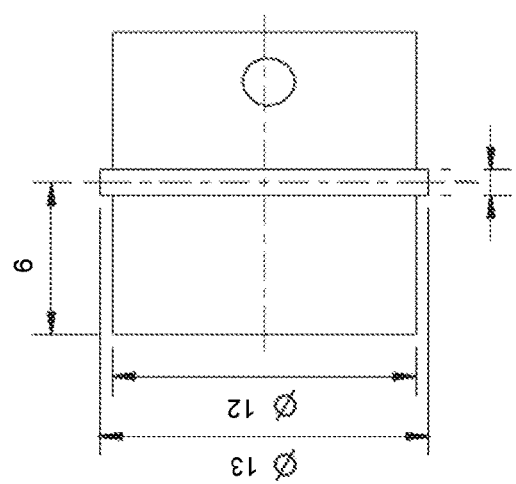
Fig.7C
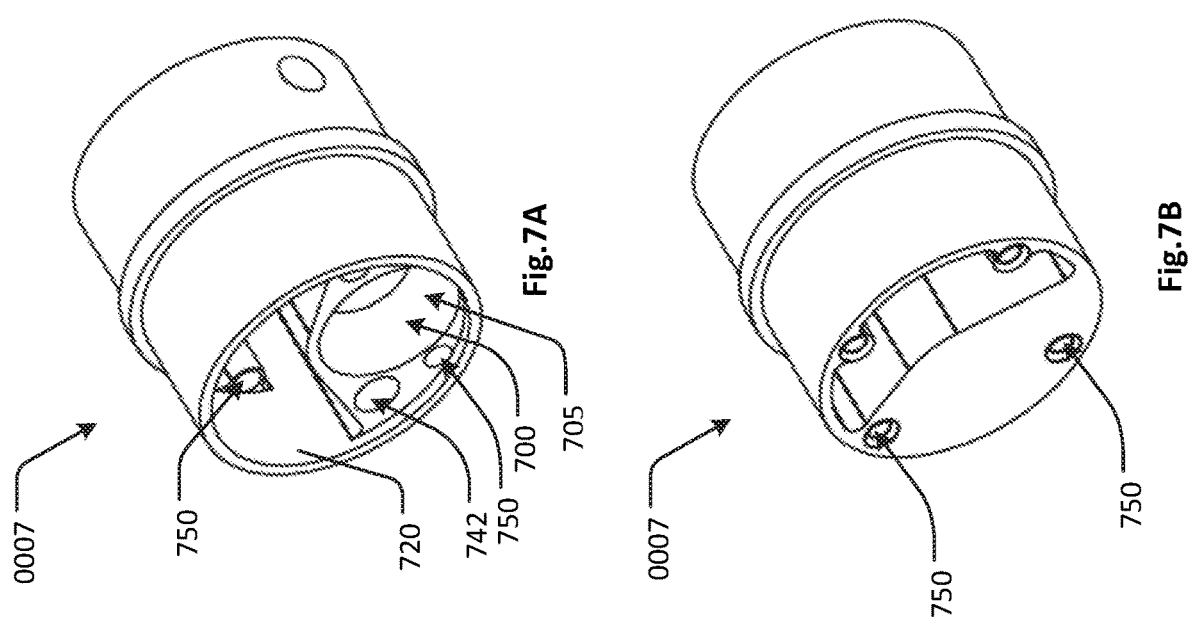
Fig.7A
Fig.7B

SECT C-C

SECT A-A

SECT B-B 1001
1034

1001
1034

INSERTION TUBE LOCKING RING
(NITINOL)
(2:1)

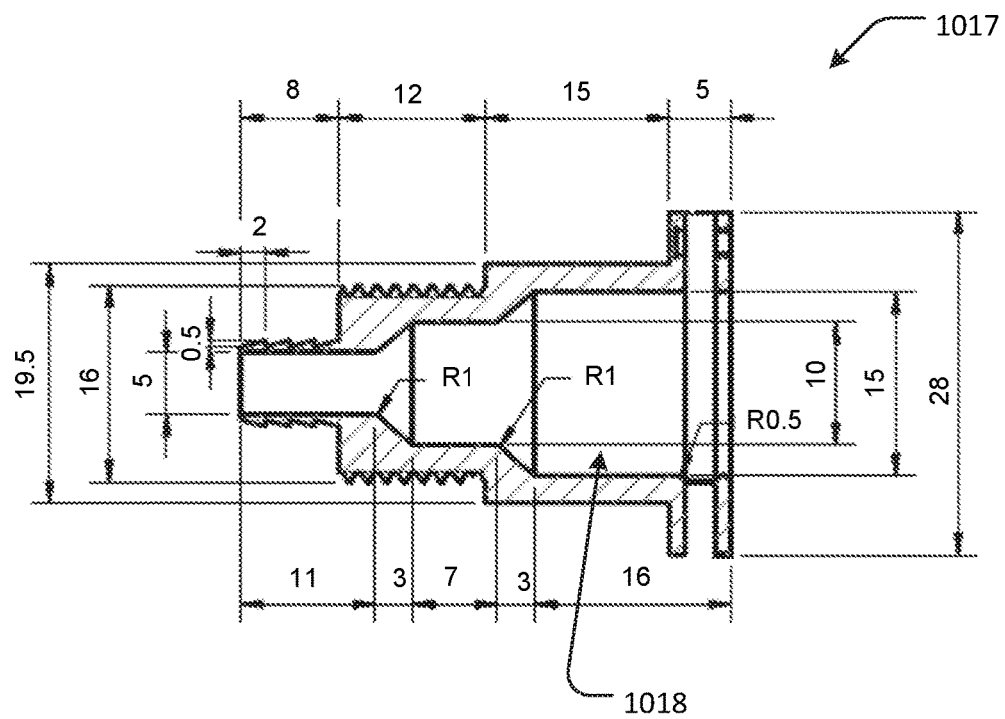
Fig.10D
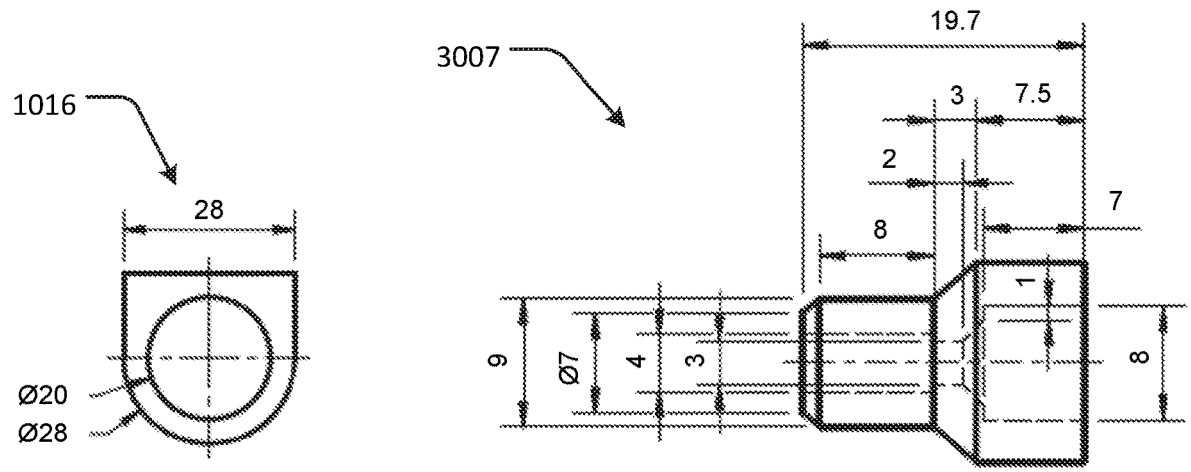
Fig.10E
Fig.10F

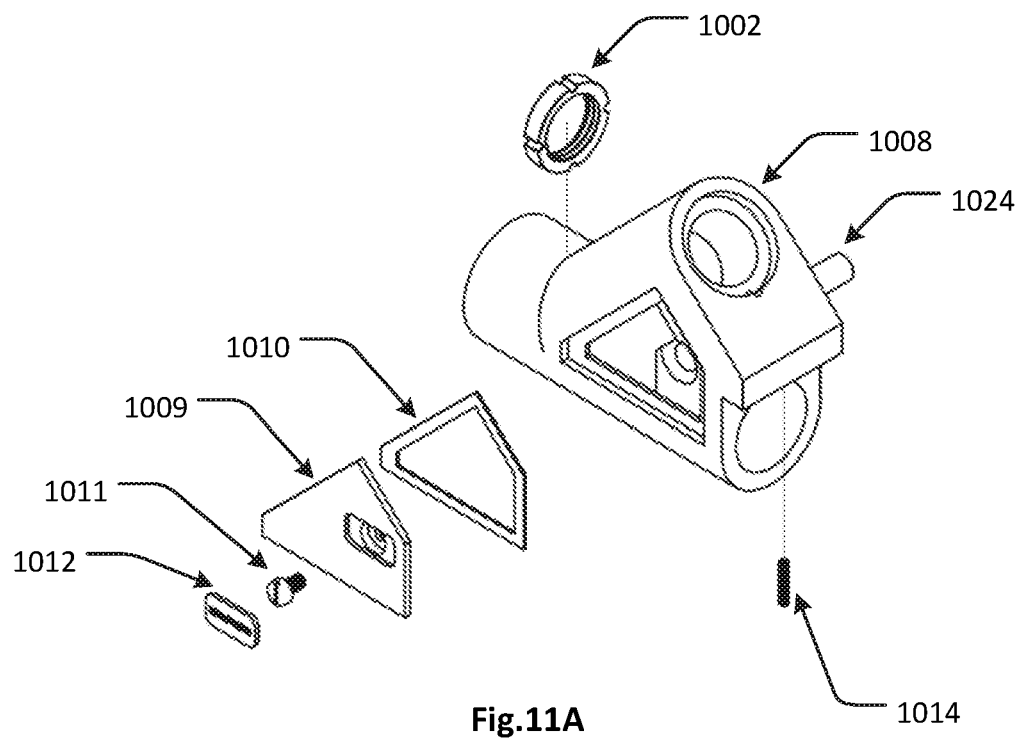
Fig.11A
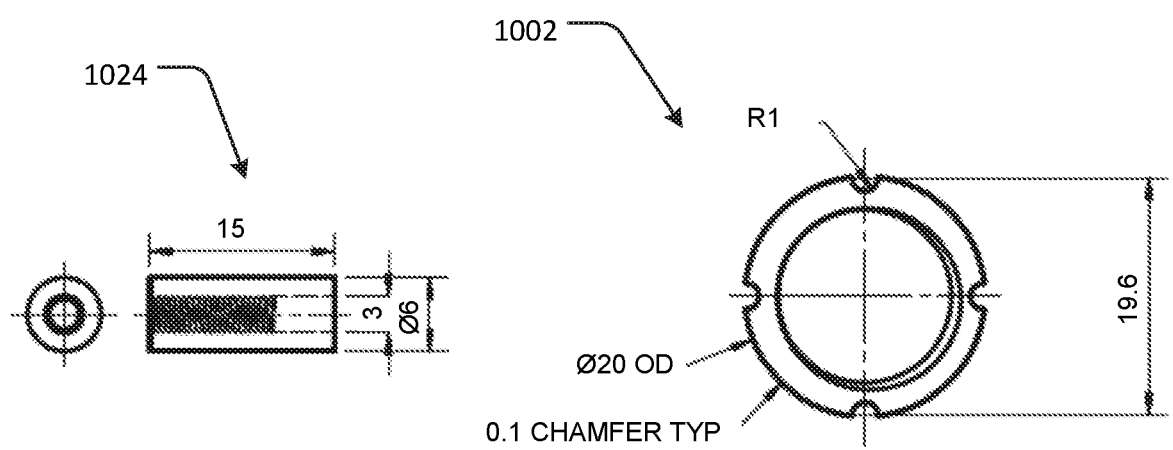
Fig.11B
Fig.11C

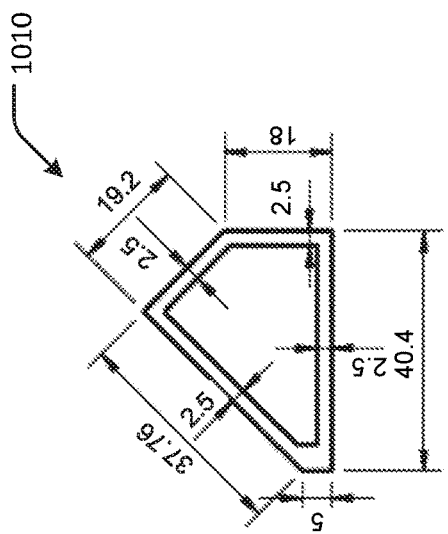
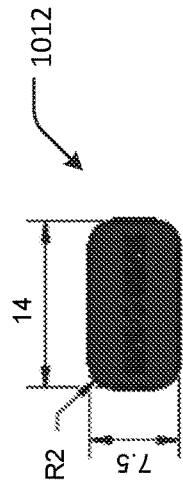
Fig.11G
Fig.11H
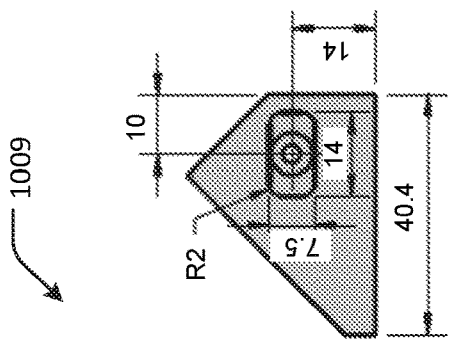
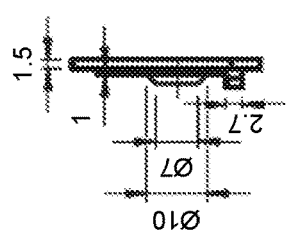
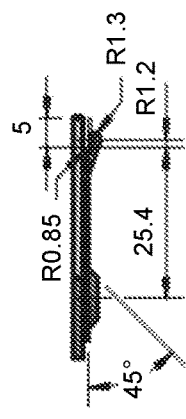
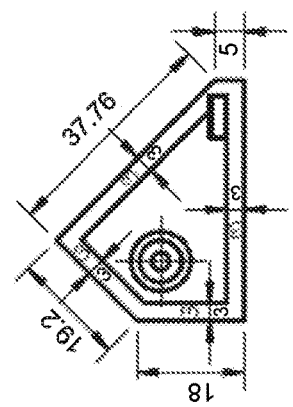
Fig.11F

G-G
(5:1)

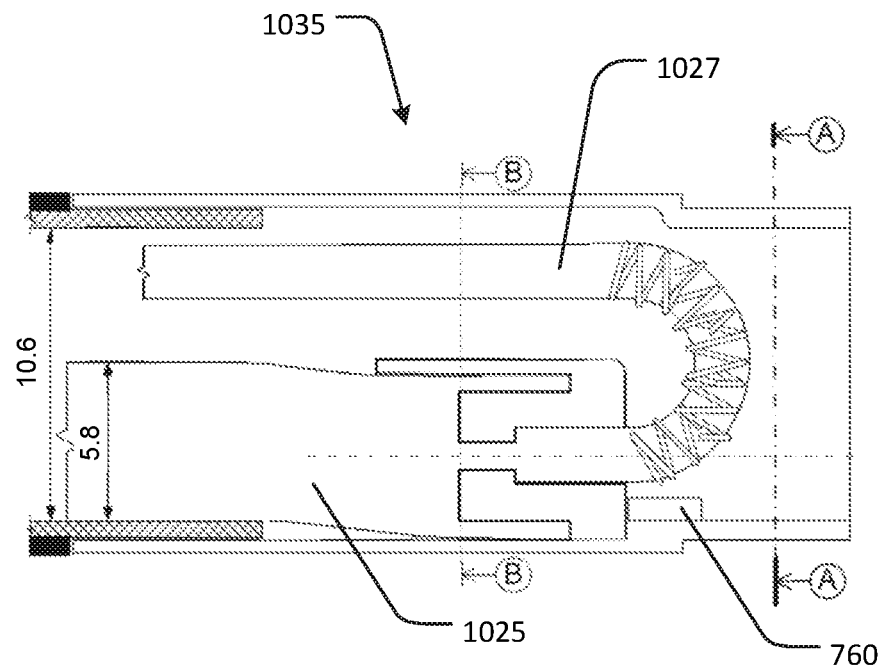
Fig.13F
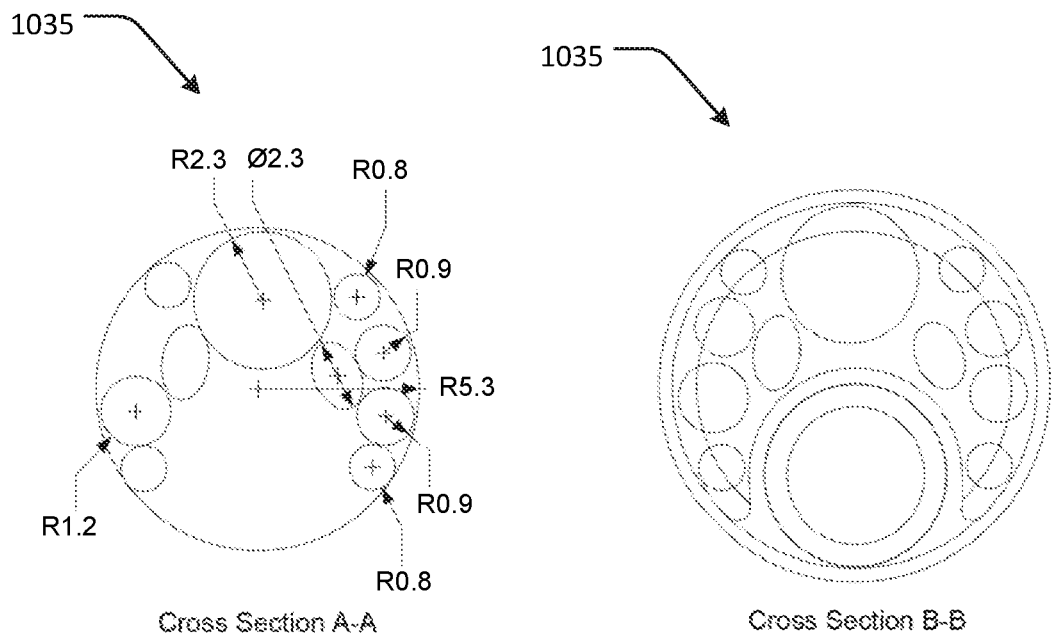
Fig.13G
Fig.13H

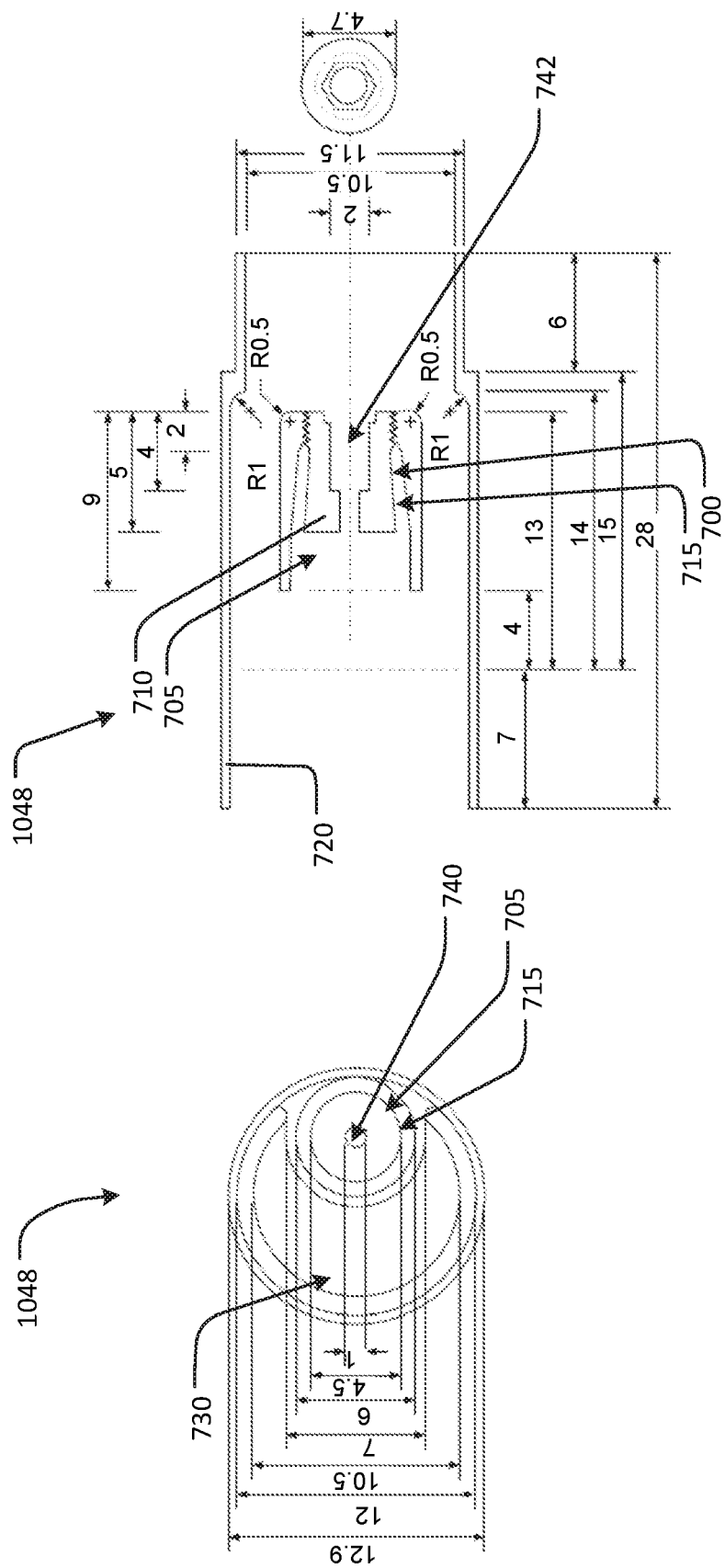

SELF-ADVANCING ENDOSCOPIC PROBE AND SYSTEM COMPROMISING SAME

Cross-Reference to Related Applications

This application is a U.S. national phase application under 35 U.S.C. § 371 of International Application No. PCT/AU2019/051204, filed Oct. 31, 2019, which claims the benefit of Australian Patent Application No. 2018904148, filed Oct. 31, 2018, the contents of each of which are incorporated herein by reference in their entireties.

TECHNICAL FIELD

Embodiments generally relate to propulsion devices, systems, or components thereof, for progressing instruments along passages. For example, the instruments may include tools, sensors, probes and/or monitoring equipment for medical use (such as endoscopy) or industrial use (such as mining). The described embodiments may also be suitable for applications in other fields to progress an instrument along a passage.

BACKGROUND

Conventional medical endoscopes require a minimum level of stiffness to allow them to be inserted into the gastrointestinal tract by pushing. However, due to the stiffness of the insertion tube, the minimum bending radius is relatively large and is not well-suited to the anatomy of the gastrointestinal tract. In some cases, pushing the insertion tube against the turns of the intestines can cause damage.

It is desired to address or ameliorate one or more shortcomings of existing systems for progressing instruments along passages, or to at least provide a useful alternative.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Embodiments generally relate to endoscopic systems, or components thereof, configured for use with an endoscope propulsion system. For example, such an endoscope propulsion system may comprise an elongate propulsion tube defining a lumen or channel configured to accommodate a fluid (such as a liquid, a liquid-gas mixture, or gas saturated liquid), and a drive unit comprising a pressure actuator configured to selectively adjust a pressure of the fluid in the channel. The propulsion system may comprise features and be operated as described in International Patent Application PCT/AU2018/050380, Australian Provisional Patent Application Number 2017901531, or U.S. Patent Application Publication Number 20200297197, the disclosures of which are incorporated herein by reference. Additional optional or alternative features of the propulsion system are described in the present disclosure, according to some embodiments.

The drive unit may be configured to gradually reduce the pressure within the channel of the propulsion tube to induce cavitation and form gas bubbles in the liquid, and then to suddenly increase the pressure to compress and collapse the gas bubbles back into the liquid, thereby accelerating at least part of the liquid towards a distal end of the propulsion tube, such that momentum is transferred from the liquid to the propulsion tube. In this way, the propulsion system may be used to progress an endoscope along a passage, such as part of a gastrointestinal tract of a patient, for example.

While the described embodiments generally refer to endoscopic systems, and the advancement of an endoscopic probe, the components, systems, methods and other embodiments described herein may be used to progress or advance other instruments or probes, such as an ultrasound device or other non-endoscopic probes, for example. Furthermore, the described embodiments may be used for medical or non-medical instruments, such as industrial endoscopes, for example.

Some embodiments relate to an endoscope configured to receive at least part of a propulsion tube of an endoscope propulsion system to assist in progressing the endoscope along a passage. The endoscope may define a propulsion tube conduit configured to receive at least part of the propulsion tube. The propulsion tube conduit may terminate at a distal end of an insertion tube of the endoscope adjacent a bending section of the endoscope.

In some embodiments, the endoscope may comprise a plurality of flexible ribs extending away from the propulsion tube conduit and circumferentially around part of an inner surface of the insertion tube. The flexible ribs may resist axial movement of the propulsion tube conduit within the insertion tube and transfer momentum from the propulsion tube conduit to the insertion tube.

Some embodiments relate to an endoscope comprising a propulsion tube according to any one of the embodiments described herein, the propulsion tube being fixed within or formed as part of an insertion tube of the endoscope. The propulsion tube may terminate at a distal end of the insertion tube a bending section of the endoscope.

Some embodiments relate to an endoscope comprising: an insertion tube; a bending section; and a distal head. The insertion tube may comprise an elongate propulsion tube comprising a first end and a second end opposite the first end, the tube defining a channel configured to accommodate a liquid, a first end of the channel being closed at or near the first end of the tube and a second end of the channel being defined by the second end of the tube; and a piston assembly connected to the second end of the tube, the piston assembly comprising: a body defining a bore in fluid communication with the channel of the tube; and a movable piston disposed within the bore and configured to seal against an internal surface of the bore, wherein the piston assembly and the tube cooperate to define a sealed vessel containing a selected mass of fluid. The fluid may comprise a selected mass of liquid. In some embodiments, the fluid may comprise a selected mass of liquid and a selected mass of gas.

The distal head is located at a distal end of the bending section and may comprise one or more endoscopic or non-endoscopic instruments or probes, such as lights, cameras, ultrasound transducers, or sensors, for example. The distal head may also provide distal openings for one or more channels, such as air, gas, or water channels, suction channels, biopsy channels, or instrument channels, for example. The insertion tube may also define a channel to accommodate cables, channels, tubes and conduits connecting the instruments and/or probes of the distal head to a proximal control body or control console to operate the endoscope. The piston assembly of the endoscope may be configured to be received in a propulsion console to operate the propulsion tube to transfer momentum to the insertion tube to assist in progressing the endoscope along a passage.

A proximal end of the insertion tube may terminate at a Y junction or three-way connector. The Y junction may define a proximal opening of the propulsion tube conduit configured to allow passage of the propulsion tube into the propulsion tube conduit. The Y junction may comprise a connector, such as a latch or blade latch, at the proximal opening of the propulsion tube conduit to connect the propulsion tube to the Y junction.

In some embodiments, the Y junction may connect the proximal end of the insertion tube to a control tube. The control tube may connect the Y junction to a control body comprising one or more controls for operating the endoscope. The control body may define a proximal opening of an instrument channel or biopsy channel of the endoscope.

In some embodiments, the endoscope may comprise a connector body connected to the control body by a connector tube or universal tube. For example, the connector body may provide proximal connection points for one or more cables or conduits of the endoscope, such as vacuum lines, suction lines, water lines, electrical cables, signal cables, camera cables, video cables, LED cables, or optic fibre light guides.

In some embodiments, the endoscope may comprise a connector for connecting the bending section to the insertion tube, directly or indirectly. The connector may also be referred to as an insertion tube collar, a propulsion tube conduit collar, a propulsion tube conduit termination connector, a pipe collar, a coil pipe collar, or a distal connector.

The connector may define a terminus configured to receive the distal end of the propulsion tube conduit and connect the propulsion tube conduit to the connector. The terminus may define a propulsion tube striking block configured to be impacted by the propulsion tube, in use in the endoscope, to transfer momentum from the propulsion tube to the bending section and insertion tube.

Some embodiments relate to a connector for connecting a bending section of an endoscope to an insertion tube of the endoscope, the connector defining:
  an outer wall configured to engage the insertion tube or bending section or one or more intermediate connectors to connect the bending section to the insertion tube;
  an aperture to allow passage of one or more channels or cables from the insertion tube to the bending section; and
  a terminus within the outer wall configured to receive a propulsion tube conduit for accommodating a propulsion tube of a propulsion system and configured to connect the propulsion tube conduit to the connector, wherein at least part of the terminus defines a propulsion tube striking block configured to be impacted by the propulsion tube, in use in the endoscope, to transfer momentum from the propulsion tube to the bending section and insertion tube.

In some embodiments, the terminus may define a socket configured to receive the distal end of the propulsion tube conduit. In some embodiments, the terminus may define an annulus between a tapered socket and a tapered striking block. The annulus may be configured to receive the distal end of the propulsion tube conduit. The striking block may be threadedly engaged with a body of the terminus and rotatably adjustable to reduce radial thickness of the annulus, to clamp the distal end of the propulsion tube conduit in the annulus. In other words, rotating the striking block relative to the socket moves the striking block along its axis of rotation like a screw adjusting the distance between the striking block and the socket.

In some embodiments, the striking block may define an aperture to allow fluid communication between the propulsion tube conduit and vacuum line. This may allow for air to be evacuated from the distal end of the propulsion tube conduit to assist with insertion of the propulsion tube in the propulsion tube conduit. The striking block aperture may be in fluid communication with a vacuum line socket defined in the connector and configured to receive a distal end of the vacuum line of the endoscope. In some embodiments, the vacuum line socket may be defined in the terminus or striking block coaxial with the terminus.

In some embodiments, the vacuum line socket may be defined in the connector adjacent the terminus. The vacuum line socket may extend in parallel with the terminus and striking block aperture. The connector may further define a lateral vacuum passage fluidly connecting the vacuum line socket to the striking block aperture.

In some embodiments, the connector may define a plurality of angulation cable channels. The angulation cable channels may be located near a periphery of the connector. The angulation cable channels may extend in parallel with, and equally spaced from, each other circumferentially around the connector.

In some embodiments, the connector may comprise a motion sensor configured to detect movement of the connector. For example, the motion sensor may comprise an electronic motion sensor configured to detect vibration or changes in tilt angle, such as a Signal Quest SQ-MIN-200 sensor, or accelerometer such as a single axis accelerometer arranged to detect momentum changes along a longitudinal axis of the endoscope during operation of the propulsion system. The endoscope may comprise an motion sensor signal cable to carry measurement signals from the accelerometer to a monitoring station.

In some embodiments, the endoscope may comprise a polymer insertion tube. The polymer insertion tube may comprise an inner convoluted tube surrounded by a braided or woven mesh and an outer coating. The woven mesh may be bonded to the inner convoluted tube at periodically spaced locations along the tube.

Some embodiments relate to a polymer insertion tube for an endoscope, the insertion tube comprising:
  an inner convoluted polymer tube defined by a plurality of cylindrical portions joined end to end by annular rib portions allowing the insertion tube to be flexed about the rib portions;
  an intermediate layer of woven polymer fibres surrounding the convoluted tube; and
  an outer polymer coating surrounding the woven fibres.

In some embodiments, the fibres are bonded to the convoluted tube at specific locations to limit a minimum bending radius of the insertion tube during flexing. The fibres may be bonded to the convoluted tube by heat welding, for example. The fibres may be bonded to the convoluted tube in an annular bonding region extending circumferentially around the convoluted tube. The bonding locations may be equally spaced along a length of the insertion tube. There may be one bonding location on each cylindrical portion.

The minimum bending radius of the insertion tube may be set by selecting one or more of a length, orientation, and tension of the fibres between bonding locations when the insertion tube is in an un-flexed or straight configuration.

Some embodiments relate to a method of assembling an endoscope comprising: placing a bundle of cables and conduits in a fabric sleeve and inserting the sleeve and its contents into an insertion tube. The bundle of cables and conduits may include a propulsion tube conduit configured to receive a propulsion tube of an endoscope propulsion system. The propulsion tube conduit may comprise a plurality of flexible ribs extending laterally away from the conduit and configured to extend circumferentially around part of an inner surface of the insertion tube when installed in the insertion tube.

The method may further comprise: laying out the propulsion tube and flexible ribs on a fabric sheet; laying out the cables and conduits on top of the ribs; and rolling the fabric sheet to form the fabric sleeve surrounding the bundle of cables and conduits with the flexible ribs at least partially surrounding the bundle of cables and conduits. The method may further comprise stitching opposed edges of the fabric sheet to each other with wire to form the fabric sleeve. The method may further comprise tying an end of the fabric sleeve to a draw wire to assist in drawing the fabric sleeve and bundle of cables and conduits through the insertion tube.

The method may further comprise removing the fabric sleeve from the insertion tube once the bundle of cables and conduits has been installed in the insertion tube. The method may further comprise removing the stitching wire from the fabric sleeve prior to removing the fabric from the insertion tube.

Some embodiments relate to a propulsion tube unit comprising:
an elongate propulsion tube comprising a first end and a second end opposite the first end, the tube defining a channel configured to accommodate a liquid, a first end of the channel being closed at or near the first end of the tube and a second end of the channel being defined by the second end of the tube; and
a piston assembly connected to the second end of the tube, the piston assembly comprising:
a body defining a bore in fluid communication with the channel of the tube; and
a movable piston disposed within the bore and configured to seal against an internal surface of the bore,
wherein the piston assembly and the tube cooperate to define a sealed vessel containing a selected mass of fluid. The fluid may comprise a selected mass of liquid. In some embodiments, the fluid may comprise a selected mass of liquid and a selected mass of gas.

In some embodiments, the sealed vessel contains the fluid at atmospheric pressure in a rest state corresponding to a rest position of the piston in the cylinder.

In some embodiments, the rest position of the piston is nearer to an end of the cylinder which is most proximal to the propulsion tube than an end of the cylinder which is most distal from the propulsion tube. In some embodiments, the rest position of the piston is at an end of the cylinder which is most proximal to the propulsion tube.

In some embodiments, the gas is fully dissolved in the liquid in the rest state. In some embodiments, the fluid comprises only liquid.

In some embodiments, the sealed vessel may contain the selected mass of liquid and selected mass of gas at a pressure which is at or above standard atmospheric pressure in a rest (or neutral) state with the piston in a rest (or neutral) position corresponding to a maximum volume of the sealed vessel. In this case, the gas and liquid may exist in a two phase condition in the rest state, and the piston may be moved to increase the pressure in the sealed vessel (by decreasing the volume of the sealed vessel) and cause the gas to partially or fully dissolve into the liquid. When the piston is released and allowed to move freely, the sealed vessel will be allowed to expand, thereby allowing nucleation and cavitation of the gas in the liquid to return to the two phase gas-liquid rest state, and returning the piston to the rest position.

In some embodiments, the sealed vessel may contain the selected mass of liquid and selected mass of gas at a pressure which is at or below standard atmospheric pressure in a rest (or neutral) state with the piston in a rest (or neutral) position corresponding to a minimum volume of the sealed vessel. In this case, the gas may be partially or fully dissolved in the liquid in the rest state, and the piston may be moved to decrease the pressure in the sealed vessel (by increasing the volume of the sealed vessel) and cause gas nucleation and cavitation in the liquid to create a two phase gas-liquid condition. When the piston is released and allowed to move freely, atmospheric pressure acting on the piston will return the piston to the rest position, thereby allowing the gas to dissolve back into the liquid.

In some embodiments, the sealed vessel may contain the selected mass of liquid and selected mass of gas at standard atmospheric pressure in a rest (or neutral) state with the piston in a rest (or neutral) position. In this case, the gas may be partially or fully dissolved in the liquid in the rest state, and the piston may be moved to increase or decrease the pressure in the sealed vessel. The piston may be moved from the rest position to increase the pressure in the sealed vessel to cause the gas to fully dissolve into the liquid. Alternatively, the piston may be moved in to decrease the pressure in the sealed vessel to cause gas nucleation and cavitation in the liquid to increase the amount of gas in the gas phase.

In embodiments where the fluid comprises liquid only, the sealed vessel may contain the selected mass of liquid at standard atmospheric pressure in a rest (or neutral) state with the piston in a (or neutral) rest position. In this case, the piston may be moved to increase or decrease the pressure in the sealed vessel. The piston may be moved to decrease the pressure in the sealed vessel to cause gas nucleation and cavitation in the liquid such that some of the liquid transforms into a vapour or gas phase. The piston may then be moved to suddenly increase the pressure and condense the vapour gas back into liquid.

In some embodiments, the propulsion tube unit may comprise a stepdown collar connecting a relatively larger diameter proximal portion of the propulsion tube to a relatively smaller diameter distal portion of the propulsion tube. The piston assembly may be configured for cooperation with an actuator to effect movement of the piston to selectively adjust a pressure of the liquid in the channel to alternatingly: reduce the pressure to induce cavitation and form gas bubbles in the liquid; and increase the pressure to collapse some or all of the gas bubbles back into the liquid, thereby accelerating at least part of the liquid towards the first end of the tube and transferring momentum to the tube to progress the tube along the passage.

The propulsion tube may comprise one or more mechanisms configured to promote cavitation in a plurality of regions spaced along at least part of the length of the channel in the distal portion of the propulsion tube when the pressure is reduced. The proximal portion of the propulsion tube may define a smooth internal surface to reduce the likelihood of cavitation occurring when the pressure is reduced.

In some embodiments, the propulsion tube unit further comprises a mechanism for promoting gas nucleation or cavitation at a distal end of the propulsion tube. The mechanism may comprise a layer of porous ceramic material fixed to an internal distal surface of the propulsion tube.

Some embodiments relate to a propulsion console for selectively adjusting a pressure within a channel of a tube of an endoscopic device, the console comprising:
- at least one user input device;
- an actuator;
- a connection component for mechanically coupling a piston of the endoscopic device to the actuator, wherein the actuator is configured to actuate movement of the piston when the piston device is coupled to the actuator; and
- a computing device configured to execute program code to:
  - receive operating instructions from the at least one user input device; and
  - send instructions to the actuator to control at least one of a speed and direction of the actuator.

In some embodiments, the actuator comprises: a frame; an actuator shaft; a fixed magnet, fixed to the frame; and a moving magnet fixed to the actuator shaft and configured to move with the actuator shaft during operation, wherein at least one of the fixed magnet and the moving magnet comprises electromagnetic coils configured to be operated to cause linear movement of the actuator shaft relative to the frame.

In some embodiments, the actuator further comprises a holding magnet configured to temporarily hold the actuator shaft in a rearward position before releasing the actuator shaft to being a forward stroke of the actuator. This may provide an advantage in allowing more time for energy to build up in the one or more electromagnets of the fixed magnet and the moving magnet resulting in a larger force being applied to the actuator shaft for the forward stroke.

According to some embodiments, the console further comprises at least one detection component configured to detect whether the endoscopic device is coupled to the actuator. In some embodiments, the detection device sends a signal to the computing device when it detects that the endoscopic device is coupled to the motor. In some embodiments, the computing device is configured to send instructions to the motor only after receiving the signal from the detection device indicating that the endoscopic device is coupled to the motor.

According to some embodiments, the console further comprises at least one identification component configured to identify at least one characteristic of the endoscopic device when the endoscopic device is coupled to the actuator. According to some embodiments, the identification component reads an identification code from the endoscopic device when the endoscopic device is coupled to the actuator. According to some embodiments, the identification component is or comprises at least one of a camera or laser scanner and the identification code is a visual code. According to some embodiments, the code is a QR code. According to some embodiments, the code is a barcode. According to some embodiments, the identification component is or comprises a RFID reader and the identification code is an RFID code. In some embodiments, the identification device sends a signal to the computing device based on the code read. In some embodiments, the computing device is configured to determine the instructions to send to the actuator based at least in part on the identification code.

Some embodiments, relate to an actuator comprising: a frame; an actuator shaft; a fixed magnet, fixed to the frame; and a moving magnet fixed to the actuator shaft and configured to move with the actuator shaft during operation, wherein at least one of the fixed magnet and the moving magnet comprises electromagnetic coils configured to be operated to cause linear movement of the actuator shaft relative to the frame.

In some embodiments, the actuator further comprises a holding magnet configured to temporarily hold the actuator shaft in a rearward position before releasing the actuator shaft to being a forward stroke of the actuator. This may provide an advantage in allowing more time for energy to build up in the one or more electromagnets of the fixed magnet and the moving magnet resulting in a larger force being applied to the actuator shaft for the forward stroke.

In some embodiments, the actuator further comprises a spring mounted between part of the actuator shaft and a fixed spring mount. The spring may be arranged such that it is loaded with potential spring energy during a rearward stroke of the actuator shaft, and releases the potential spring energy during a forward stroke of the actuator shaft in the form of a forward impulse applied to the actuator shaft.

Some embodiments relate to a propulsion system comprising a propulsion tube unit according to any one of the described embodiments and propulsion console according to any one of the described embodiments.

Some embodiments relate to an endoscopic system comprising a propulsion system according to any one of the described embodiments and an endoscope according to any one of described embodiments.

Some embodiments relate to a method of assembling an endoscopic system according to any one of the described embodiments, the method comprising: inserting the propulsion tube into the propulsion tube conduit.

The method may further comprise applying a lubricant to the propulsion tube prior to inserting the propulsion tube in the propulsion tube conduit. The lubricant may comprise a water-based lubricant such as methylcellulose based lubricant, or other fast drying lubricant, for example. The method may further comprise allowing the lubricant to dry out to form a friction bond between the propulsion tube and the propulsion tube conduit. The method may further comprise operating the propulsion system to successfully induce cavitation and dissolution of the gas into the liquid of the propulsion tube to progress the propulsion tube along the propulsion tube conduit. The method may further comprise operating the propulsion system to increase the channel pressure of the propulsion tube to stiffen the propulsion tube, allowing the propulsion tube to be pushed into the propulsion tube conduit.

The method may further comprise evacuating air from the propulsion tube conduit as the propulsion tube is inserted into the propulsion tube conduit. The method may further comprise applying suction to a vacuum line in fluid communication with a distal end of the propulsion tube conduit to evacuate air from the propulsion tube conduit as a propulsion tube is inserted into the propulsion tube conduit. The method may further comprise drawing air through the propulsion tube conduit via the vacuum line to at least partially dry the lubricant and partially bond an outer surface of the propulsion tube to an inner surface of the propulsion tube conduit. For example, the dried lubricant may assist in forming an adhesive bond or a friction bond between an outer surface of the propulsion tube and an inner surface of the propulsion tube conduit.

BRIEF DESCRIPTION OF DRAWINGS

Embodiments are described below by way of example and with reference to the drawings, in which:

FIG. 1C is a perspective view of the endoscopic system of FIG. 1A in use in a clinical setting;

FIG. 2A is a schematic diagram of the propulsion system of FIG. 1A in isolation;

FIG. 2B is a close-up view and cross section of a propulsion tube unit of the propulsion system of FIG. 2A;

FIG. 3C is a layout diagram of the components of the propulsion console of FIG. 3A;

FIG. 6A is a perspective view of a propulsion tube conduit with friction ribs according to some embodiments;

FIG. 6B is a perspective view of the propulsion tube conduit of FIG. 6A showing the friction ribs in a flexed configuration;

FIG. 6C is a perspective view illustrating a method of inserting the propulsion tube conduit into an insertion tube with other conduits and cables according to some embodiments;

FIG. 7A is a perspective view of a connector according to some embodiments;

FIG. 7B is a second perspective view of the connector of FIG. 7A;

FIG. 7C is a side view of the connector of FIG. 7A;

FIG. 7D is a side view of a set screw of the connector of FIG. 7A;

FIG. 10D is a cross-sectional view of a propulsion tube conduit barb of the Y junction of FIG. 8A;

FIG. 10E is a plan view of a seal of the Y junction of FIG. 8A;

FIG. 10F is a side view of a stepdown collar of the Y junction of FIG. 8A, and of the propulsion tube unit of FIG. 2B;

FIG. 11A shows a junction body subset of the components of the Y junction of FIG. 8A;

FIG. 11B in the side view of the hat screw pushing of the Y junction of FIG. 8A;

FIG. 11C is a plan view of a locking ring of the Y junction of FIG. 8A;

FIG. 11F shows orthogonal views of a side hatch of the Y junction of FIG. 8A;

FIG. 11G is a plan view of a side hatch seal of the Y junction of FIG. 8A;

FIG. 11H is a plan view of a screw cover of the Y junction of FIG. 8A;

FIG. 13F is a side view of the connector of FIG. 13A illustrating the connection of the propulsion tube conduit and vacuum line to the connector;

FIG. 13G is a cross-section of the connector of FIG. 13A indicated by line A-A in FIG. 13F and illustrating the arrangement of cables and conduits in the connector and bending section, according to some embodiments;

FIG. 13H is a cross-section of the connector of FIG. 13A indicated by line B-B in FIG. 13F and illustrating the arrangement of cables and conduits in the connector and insertion tube, according to some embodiments;

FIG. 14A is an end view of an alternative connector according to some embodiments;

FIG. 14B is a longitudinal cross-section of the connector of FIG. 14A; and

DESCRIPTION OF EMBODIMENTS

Embodiments generally relate to propulsion devices, systems, or components thereof, for progressing instruments along passages. For example, the instruments may include, tools, sensors, probes and/or monitoring equipment for medical use (such as endoscopy) or industrial use (such as mining). The described embodiments may also be suitable for applications in other fields to progress an instrument along a passage.

Some embodiments relate to endoscopic equipment, such as endoscopic probes, propulsion devices, drive units, control devices or endoscopic systems, for example.

Some embodiments relate to endoscopic systems, or components thereof, configured for use with an endoscope propulsion system. For example, such an endoscope propulsion system may comprise an elongate propulsion tube defining a lumen or channel configured to accommodate a fluid (such as a liquid-gas mixture, or gas saturated liquid), and a drive unit comprising a pressure actuator configured to selectively adjust a pressure of the fluid in the channel. The propulsion system may comprise features and be operated as described in International Patent Application PCT/AU2018/050380, Australian Provisional Patent Application Number 2017901531, or U.S. Patent Application Publication Number 20200297197, the disclosures of which are incorporated herein by reference.

The drive unit may be configured to gradually reduce the pressure within the channel of the propulsion tube to induce cavitation and form gas bubbles in the liquid, and then to suddenly increase the pressure to compress and collapse the gas bubbles back into the liquid, thereby accelerating at least part of the liquid towards a distal end of the propulsion tube, such that momentum is transferred from the liquid to the propulsion tube. In this way, the propulsion system may be used to progress an endoscope along a passage, such as part of a gastrointestinal tract of a patient, for example.

Figures 1A, 1B:
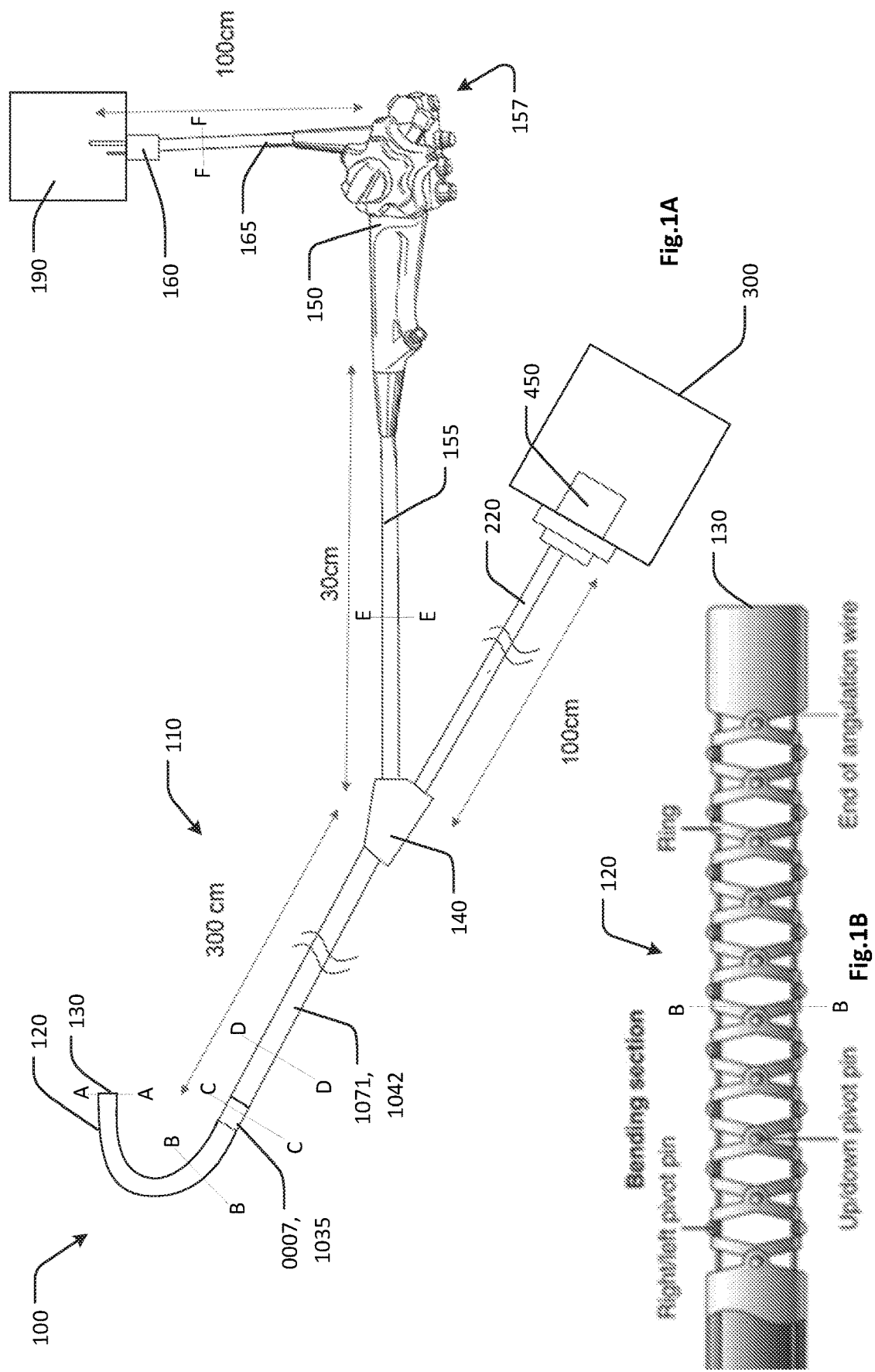
FIG. 1A is a layout drawing of an endoscopic system including an endoscope and propulsion system according to some embodiments.
FIG. 1B is a close up view of a distal end of the endoscope of FIG. 1A showing the bending section.

Referring to FIGS. 1A to 1C, an endoscope system 100 is shown according to some embodiments. The endoscope system 100 generally comprises an endoscope 110, a video console 190, and propulsion system 200 comprising a propulsion tube unit 210 and propulsion console 300. A number of cross-section lines are indicated in FIG. 1A which correspond to cross sections of the endoscope shown in FIGS. 4A to 4F illustrating the cables and conduits present at various locations along the endoscope.

The endoscope 110 comprises an insertion tube 1071, 571, 1042, a bending section 120, and a distal head 130. The distal head 130 is located at a distal end of the bending section 120 and may comprise one or more endoscopic or non-endoscopic instruments or probes, such as lights, cameras, ultrasound transducers, or sensors, for example. The distal head 130 may also provide distal openings for one or more channels, such as air, gas, or water channels, suction channels, biopsy channels, or instrument channels, for example.

The endoscope 110 differs from a conventional endoscope in that it comprises a propulsion tube conduit 1025 within the insertion tube which is configured to receive a propulsion tube 220 of the propulsion system 200. The endoscope 110 may comprise a conventional type insertion tube 1042 or one of the alternative insertion tubes 571, 1071 described herein in relation to FIGS. 5A to 5E. In some embodiments, the propulsion tube 220 may be permanently fixed within or form part of the insertion tube 1042, 571, 1071. The endoscope 110 comprises a distal connector 0007, 1035 to connect a distal end of the insertion tube to a proximal end of the bending section. In some embodiments, there may be one or more intermediate connectors between the distal connector 0007, 1035 and the bending section 120. The distal connector 0007, 1035 also provides a termination point for the propulsion tube conduit as discussed further below.

A proximal end of the propulsion tube conduit terminates at a three-way connector or Y junction 140, which provides an opening for insertion of the propulsion tube 220 into the propulsion tube conduit.

The conventional endoscope cables and conduits branch off at the Y junction 140 to a control body 150 via a control tube 155. The control body 150 includes a biopsy port and controls for operating the endoscope 110 including valves to control suction, air and water as well as angulation control knobs for manipulating the bending section 120. In some embodiments, the control body 150 may also include one or more switches 157 for operating the propulsion system 200.

The control body 150 is connected to a connector body 160 via a connector tube or universal tube 1094.

Alternatively, in some embodiments, the Y-junction 140 may also comprise the control body 150. However, it may be preferable to separate the control body 150 from the Y-junction 140 by the flexible control tube 155 as shown in the drawings for ease of use, as the control tube 155 allows for some movement of the Y-junction 140 without impacting the or causing vibration in the control body 150 which may be uncomfortable for the operator.

FIG. 1C illustrates the endoscope system 100 in use in a clinical setting, with a video console 190 connected to a video monitor 195 to display video from a camera on the distal head 130.

The propulsion system 200 is shown separately in FIG. 2A, including the propulsion tube unit 210 and propulsion console 300. The propulsion tube unit 210 may comprise the propulsion tube 220 and a piston assembly 450 as described in International Patent Application PCT/AU2018/050380. Further optional or alternative features of the piston assembly 450 and propulsion tube 220 are set out below.

The propulsion tube 220 may also comprise a stepdown collar 3007 connecting a relatively larger diameter proximal portion 222 of the propulsion tube 220 to a relatively smaller diameter distal portion 224 of the propulsion tube 220. The distal portion is configured for insertion into the propulsion tube conduit 1025 while the proximal portion 222 is simply for translating fluid and pressure from the propulsion console to the distal portion of the propulsion tube. The distal end of the propulsion tube 220 may be sealed with a plug and a stainless steel swage, for example. In some embodiments, the propulsion tube 220 may be formed with a closed distal end.

Figure 2C:
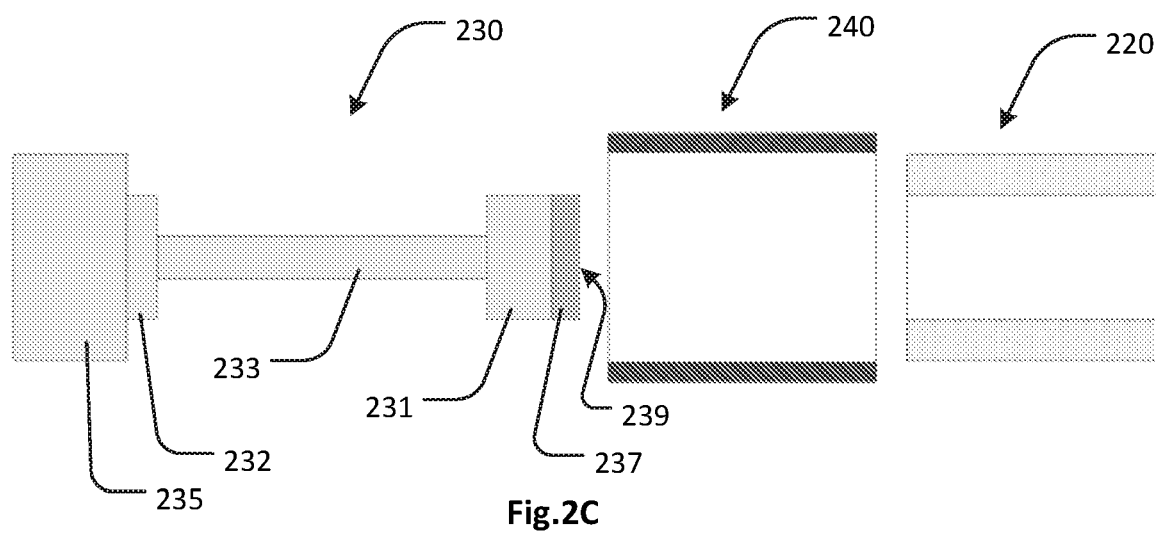
FIG. 2C is a cross-section illustrating distal end components of the propulsion tube unit of FIG. 2B, according to some embodiments.

In embodiments where the propulsion tube 220 is formed with an open distal end, it may be closed with a plug. For example, a suitable plug and swage arrangement is shown in FIGS. 2C to 2E.

The propulsion tube 220 may comprise a plug 230 configured to be inserted into and close the distal end of the propulsion tube 220, and a swage 240 configured to restrict removal of the plug 230 from the propulsion tube 220. The plug 230 may be substantially cylindrically symmetrical, and is shown in cross-section in the drawings.

The plug 230 may vary in diameter from a first end 231, having a diameter substantially similar to the inner diameter of the propulsion tube 220, to a second end 232, having a similar diameter to the first end 231, via a middle portion 233 extending between the first and second ends 231, 232 and having a smaller diameter than the two ends 231, 232. The plug 230 may be formed predominantly of an inert material, such as stainless steel, for example.

Figure 2D:
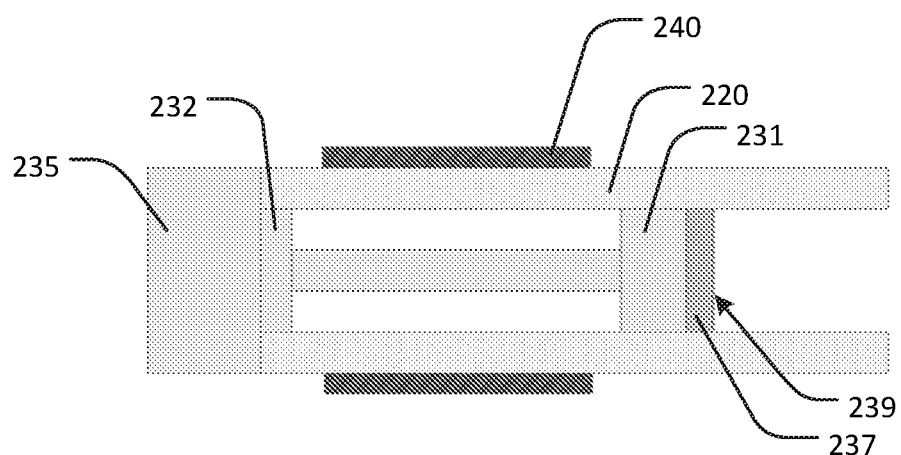
FIG. 2D is a cross-section illustrating the assembly of the distal end components of FIG. 2C.
Figure 2E:
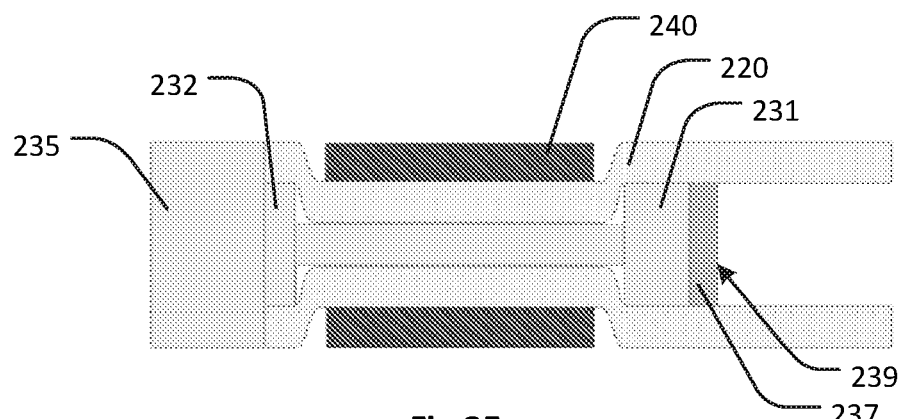
FIG. 2E is a cross-section illustrating the assembly of the distal end components of FIG. 2C and swaging to restrict disassembly of the components.

The swage 240 may define a hollow cylinder having an initial internal diameter greater than or similar to an external diameter of the propulsion tube 220, so as to allow placement of the swage 240 over the distal end of the propulsion tube 220, as shown in FIG. 2D.

The distal end of the propulsion tube 220 may be closed by inserting the two ends 231, 232 of the plug 230 into the lumen of the distal end of the propulsion tube 220. The plug 230 may then be held in place (or restricted from being removed) by swaging the swage 240 around the propulsion tube 220 and middle portion 233 of the plug 230, as shown in FIG. 2E, thereby reducing the internal diameter of the swage 240 to clamp part of the wall of the propulsion tube 220 between the swage 240 and middle portion 233 and/or end portions 231, 232 of the plug 230. An external diameter of the swage 240 may be reduced to a diameter which is substantially similar to, or slightly less than the initial outer diameter of the propulsion tube 220. This may be necessary in some embodiments, so as to allow the propulsion tube 220 to be fed through the propulsion tube conduit 1025.

The swage 240 may be formed of a malleable material such as a metal or metal alloy (e.g., steel, brass, copper). The swage 240 may be swaged (and reduced) around the propulsion tube 220 and plug 230 located therein, by crimping or otherwise deforming the swage 240 to reduce in diameter as described above.

The plug 230 may also comprise a striker 235 having a diameter substantially similar to the external diameter of the distal portion 224 of the propulsion tube 220, and configured to abut the distal end of the propulsion tube 220 when the plug 230 is inserted therein, as shown in FIGS. 2D and 2E. The striker 235 may be configured to strike a striking block 710 (described below) of the distal connector 0007 to transfer momentum from the propulsion tube 220 to the insertion tube 1071 of the endoscope 110 during operation of the propulsion system 200.

In some embodiments, the plug 230 may further comprise a mechanism 237 to promote gas nucleation and/or cavitation in the fluid near the distal end of the propulsion tube 220. The mechanism 237 may comprise any suitable means for enhancing, promoting, encouraging or increasing the likelihood of cavitation, bubble nucleation and/or bubble coalescence, such as those set out in PCT/AU2018/050380 or US2020/0297197, for example.

In some embodiments the mechanism 237 may comprise a surface variation, surface coating or layer of material configured to form an internal distal end surface 239 of the propulsion tube 220, when the plug 230 is inserted to close the distal end of the propulsion tube 220. For example, the mechanism 237 may comprise a disc or layer of porous ceramic material fixed to the first end 231 of the plug 230. In some embodiments, the mechanism 237 may comprise an active piezo ceramic transducer element. The mechanism 237 (such as a disc of porous ceramic material) may be fixed to the first end 231 of the plug 230 by a suitable adhesive, such as epoxy resin, for example.

Any suitable porous material may be used for the mechanism 237 to promote gas nucleation. For example, some suitable materials include porous ceramics, porous Alumina Ceramic (Aluminium Oxide Ceramic) or porous Zirconium Oxide Ceramic. The porous material may have a porosity in the range of 1% to 20%, 2% to 10%, 3% to 8% or approximately 5%, for example. The porous material may have a pore size in the range of 10 to 50 micron, or 20 to 40 micron, for example. The porous ceramic material may be formed as a disc having a diameter similar to an inner diameter of the propulsion tube 220 and a thickness in the range of 0.5 mm to 5 mm, 1 mm to 3 mm, or 1 mm to 2 mm, for example.

In some embodiments, the porous ceramic material of the mechanism 237 may comprise Oxide Mixed Ceramics or Dispersion Ceramics to reduce pore deformation. Such materials may include the addition of amounts of SrO, $Y_2O_3$, and/or $Cr_2O_3$ to the ceramic. Strontia may be included for the formation of platelets inside the matrix, which may resist crack propagation supporting the toughness of the material.

Referring again to FIG. 2A, the distal portion 224 of the propulsion tube 220 must have a relatively smaller diameter to fit inside the propulsion tube conduit 1025, whereas the proximal portion 222 can be a larger diameter to reduce pipe friction resistance in that part of the propulsion tube 220. For example, the distal portion of the propulsion tube may have an inner diameter of 3 mm and an outer diameter of 4 mm, while the proximal portion may have an inner diameter of 6 mm and an outer diameter of 8 mm. The distal portion 224 may extend substantially the entire length of the insertion tube 1071, which may or may not include the length of the bending section 120. For example, the distal portion 224 of the propulsion tube 220 may have a length in the range of 2 m to 5 m, 3 m to 4 m, about 3 m, or about 2.7 m, for example. In some embodiments, the proximal portion 222 of the propulsion tube 220 may have a length that is a fraction of the length of the distal portion 224 of the propulsion tube 220, such as less than 40%, less than 30%, less than 20% or about 35%, for example. The propulsion tube 220 may comprise one or more mechanisms configured to promote cavitation in a plurality of regions spaced along at least part of the length of the channel, in the distal portion of the propulsion tube, when the pressure is reduced. For example, an internal surface of the distal portion 224 of the propulsion tube 220 may define surface variations to promote cavitation in the plurality of regions. The proximal portion 222 of the propulsion tube 220 may define a smooth internal surface to reduce the likelihood of gas nucleation and cavitation occurring when the pressure is reduced. The proximal portion 222 of the propulsion tube 220 may be formed of or coated with a hydrophilic substance with low nucleation potential, such as PFA (Perfluoroalkoxy alkane) or PTFE (polytetrafluoroethylene), for example.

The stepdown collar 3007 may be received in the Y junction 140 via a blade latch 1013, for example, and locked in place by the blade latch.

Figure 3A:
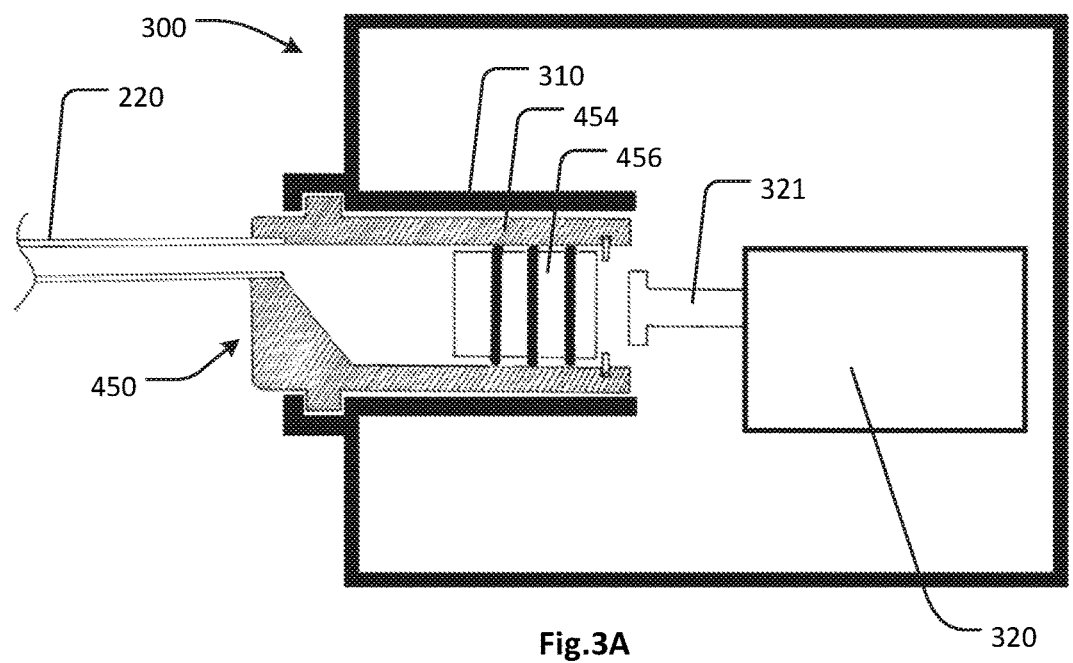
FIG. 3A is a diagram illustrating a propulsion console and piston assembly of the propulsion system, according to some embodiments.
Figure 3B:
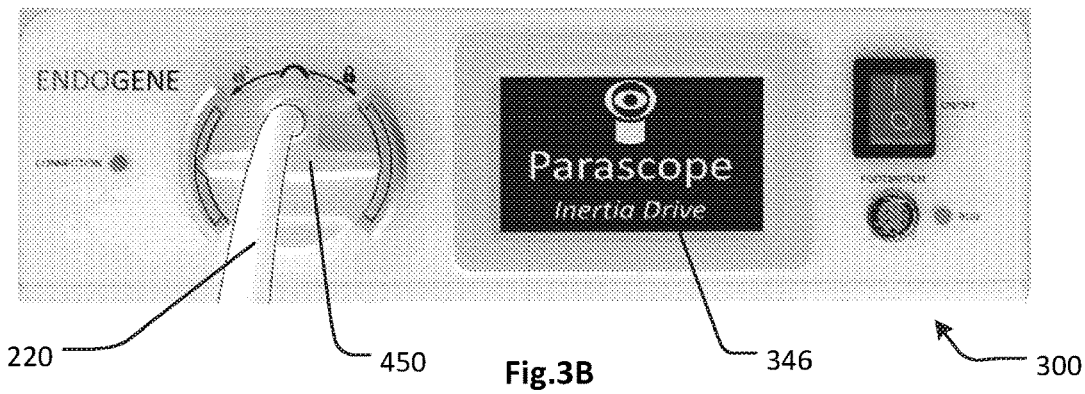
FIG. 3B is a front view of the propulsion console of FIG. 3A.

FIGS. 3A to 3D show the propulsion console 300 in further detail. The propulsion console 300 is configured to control the operation of propulsion tube unit 210. Piston assembly 450 of propulsion tube unit 210 is releasably receivable in a piston assembly receptacle 310 of propulsion console 300. Piston assembly receptacle 310 comprises one or more piston assembly detection and/or identification components 311, as shown in FIG. 3C.

For example, in the illustrated embodiment, piston receptacle 310 comprises a micro switch 312 and an RFID reader 314. Micro switch 312 is configured to detect the presence of piston assembly 450 in piston assembly receptacle 310, while RFID reader 314 is configured to read an RFID from an RFID tag 311 located on piston assembly 450. The RFID tag 311 may comprise a glass bead style RFID tag fixed in a recess in the body of the piston assembly 450. Piston assembly receptacle 310 further comprises connection components 316 to connect piston assembly 450 to an actuator 320 configured to actuate piston assembly 450.

Figure 2F:
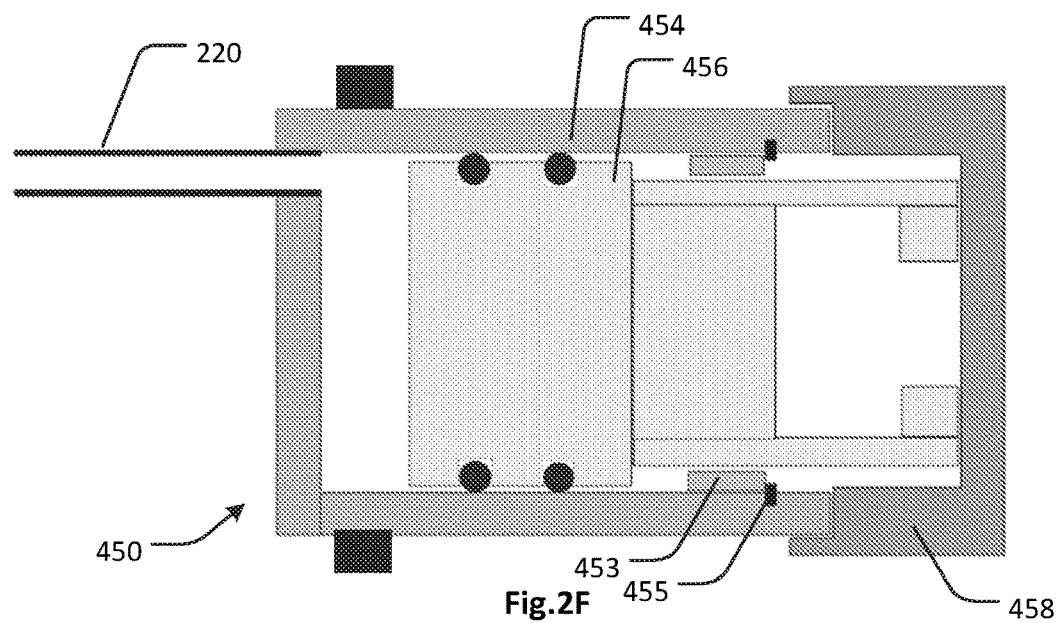
FIG. 2F is a cross-section of a piston assembly of the propulsion tube unit of FIG. 2B, according to some embodiments.
Figure 3D:
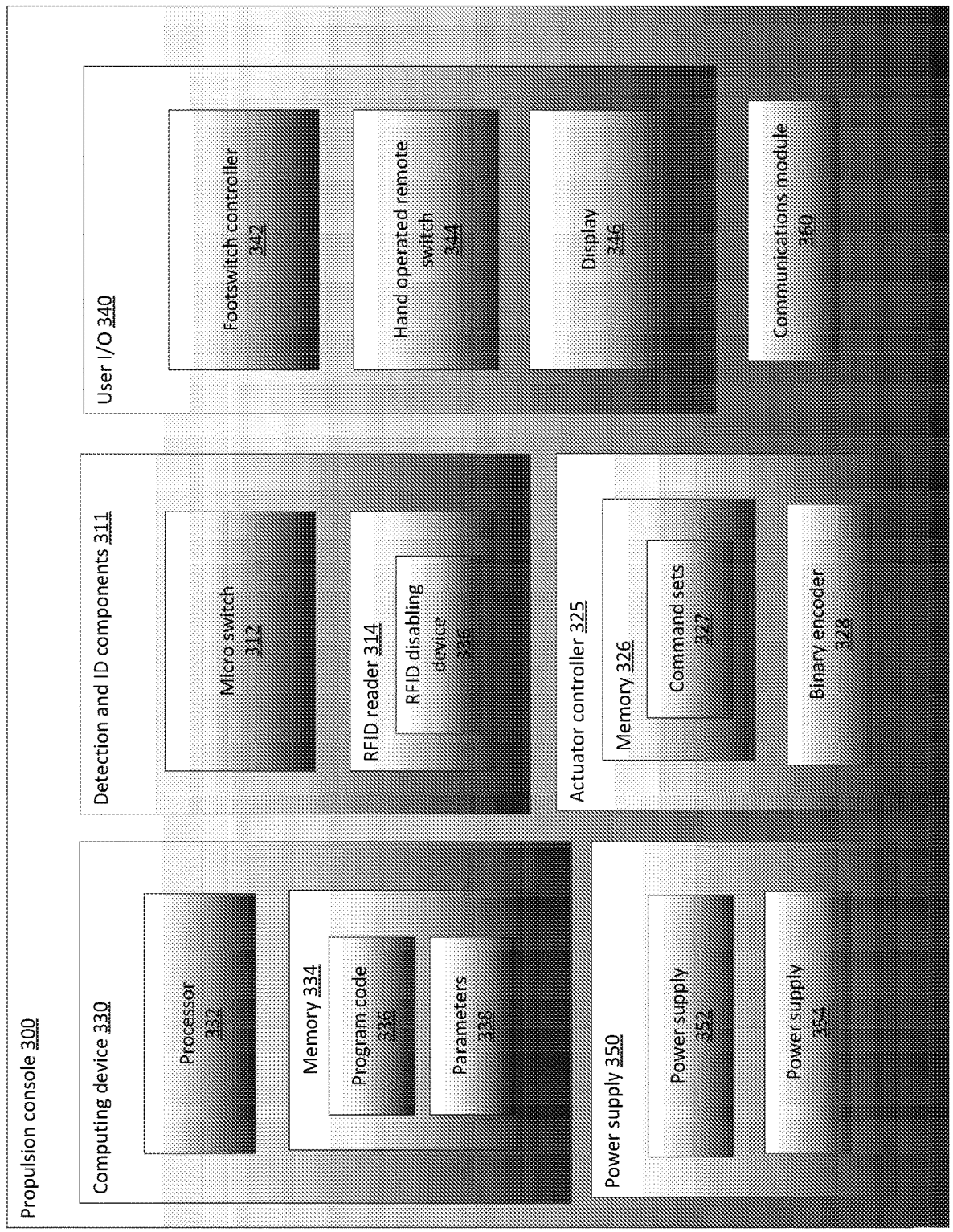
FIG. 3D is a block diagram of the hardware components of the propulsion console FIG. 3A.

As set out in PCT/AU2018/050380, the piston assembly 450 may comprise a body 452 defining a cylinder 454, a piston 456 disposed in the cylinder 454, and a piston seal to seal the piston 456 against an internal bore of the cylinder 454. The piston 456 and cylinder 454 act together to form a piston pump. One end of the cylinder 454 is connected to and in fluid communication with the propulsion tube 220 while the other end of the cylinder 454 defines an opening to allow mechanical communication between the piston 456 and the actuator 320. Removal of the piston 456 from the cylinder 454 may be restricted by a clip 455 such as a circlip, and a buffer ring 453 may be disposed between the clip 455 and the piston 456, as shown in FIGS. 2F and 3F.

In some embodiments, the propulsion tube unit 210 may further comprise a removable cap 458 to temporarily seal the open end of the cylinder 454. The cap 458 may be configured to engage part of the body 452 and seal the cylinder 454 in a substantially pressure tight manner to protect the internal bore of the cylinder, and to resist movement of the piston 456 in the cylinder 454 due to changes in ambient atmospheric pressure during transport, for example. The cap 458 may include a bayonet or screw type engaging portion, for example, to couple to the body 452. The piston assembly 450 may further comprise one or more seals or gaskets between the body 452 and the cap 458. Once the piston 456 is installed in the cylinder and the channel of the propulsion tube 220 is filled with a selected mass of fluid and sealed, the cap 458 may be attached to the body 452 to seal the open end of the cylinder. The propulsion tube unit 210 may then be sterilised and packaged. The cap 458 may then be removed when the propulsion tube unit 210 is to be connected to the propulsion console 300 for operation.

For propulsion tube units containing liquid and gas at a pressure above standard atmospheric pressure, the actuator 320 may be used to move the piston 456 from its rest position within the bore of the cylinder 454 by extending an actuator rod or shaft 321 to contact and push the piston 456 along a length of the bore. When the actuator shaft 321 is withdrawn, the pressure within the propulsion tube 220 acts to return the piston 456 to its rest position.

For propulsion tube units containing liquid and gas at a pressure which is at or below standard atmospheric pressure, it may be necessary for the actuator shaft 321 to be mechanically coupled to the piston 456 so that the actuator 320 can pull the piston 456 along the bore as well as being able to push the piston 456.

For example, the liquid may be saturated with the gas within the sealed vessel of the propulsion tube unit at a partial pressure approximately equal to standard atmospheric pressure. In a rest state, at atmospheric pressure with no force acting on the piston 456, a corresponding rest position of the piston 456 may be at or near a forward most position in the cylinder 454 corresponding to a rest volume of the sealed vessel of the propulsion tube unit. In some embodiments, the rest volume may be equivalent to a minimum volume of the sealed vessel of the propulsion unit, and the rest position of the piston 456 may be the forward most position of the piston 456 in the cylinder 454. In some embodiments, the rest volume may be greater than the minimum volume of the sealed vessel and less than the maximum volume of the sealed vessel of the propulsion tube unit. The rest position of the piston 456 may be located between the forward most position and rearward most position in the cylinder. The rest position of the piston 456 may be between the two ends of the bore of the cylinder 454. In some embodiments, the rest position of the piston 456 may be nearer the forward most position in the cylinder 454 than the rearmost position in the cylinder 454.

In these cases, the piston 456 may be pulled toward the rearmost end of the cylinder 454 by the actuator 320 to reduce the pressure in the sealed vessel and induce cavitation of the gas from the liquid. The desired cavitation and separation of the fluid column will occur at low pressure due to the rearward force on the piston 456 induced by the actuator 320.

When the piston 456 is to be moved forward to increase the pressure in the sealed vessel and dissolve the gas back into the liquid, the forward stroke of the piston 456 will be assisted by the effects of atmospheric pressure proportional to the differential pressure. This reduces the amount of force required from the pressure actuator to produce the required forward velocity and consequential transfer of Kinetic Energy from the fluid medium to the propulsion tube and endoscope 110.

Figure 3E:
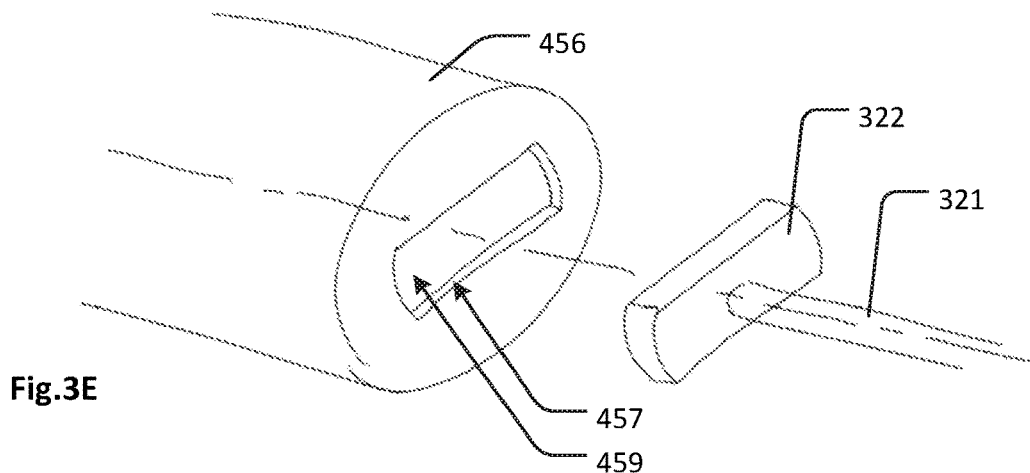
FIG. 3E is a perspective diagram illustrating part of a piston of the piston assembly of FIGS. 2F and 3A, and actuator shaft of an actuator of the propulsion console of FIG. 3A, according to some embodiments.
Figure 3F:
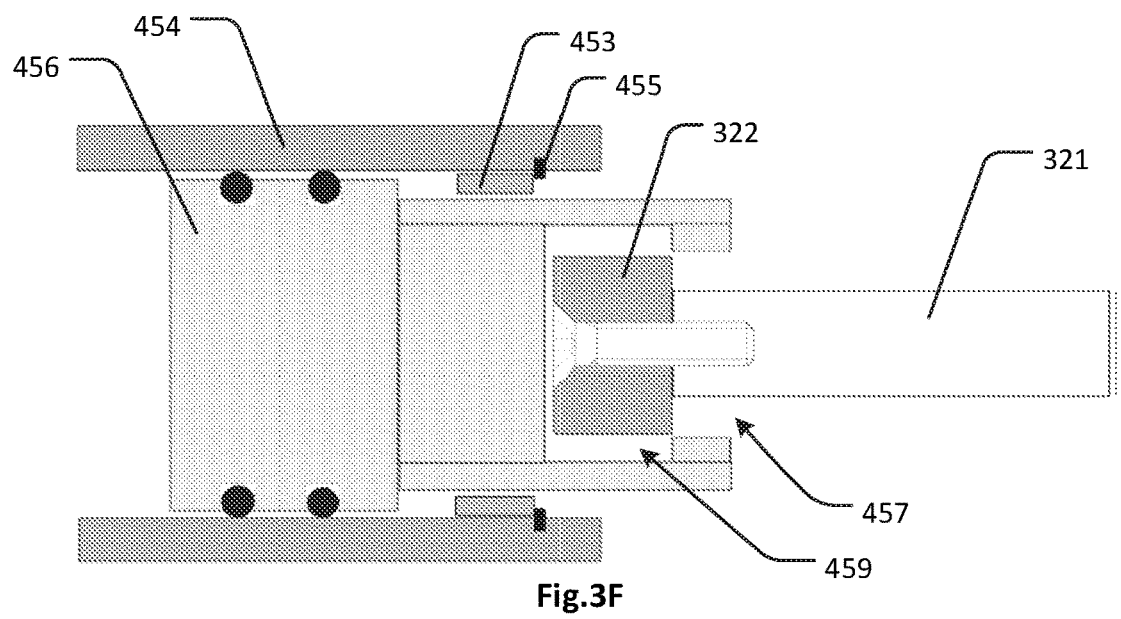
FIG. 3F is a cross-section of the piston and actuator shaft of FIG. 3E illustrating insertion of an end cap of the actuator shaft into a slot and recess of the piston, according to some embodiments.

Referring to FIGS. 3E and 3F, in some embodiments, the actuator rod 321 may comprise an end cap 322 configured to engage part of the piston 456 to mechanically couple the piston 456 to the actuator shaft 321. The end cap 322 may extend laterally beyond a diameter of the actuator shaft 321 and may be wider in one direction than the other. For example, the end cap 322 may comprise an elliptical plate, a rectangular plate or a rounded rectangular plate, as shown in FIG. 3E.

The piston 454 may define an aperture or slot 457 configured to receive the end cap 322, with edges of the slot 457 arranged to partially overhang a chamber or recess 459, also configured to receive the end cap 322. This is shown in perspective in FIG. 3E and in cross-section in FIG. 3F. The slot 457 may define a complimentary shape to the outline of the end cap 322.

The slot 457 and end cap 322 are arranged to be in alignment when the piston assembly 450 is inserted into the propulsion console 300, as shown in FIGS. 3A and 3E, so that the end cap 322 passes through the slot 457 and is received in the recess 459 of the piston 456. When the piston assembly 450 is rotated (e.g., by 90 degrees) relative to the propulsion console 300 to lock the piston assembly 450 into the propulsion console 300, the piston 456 rotates with it, such that the slot 457 is rotated relative to the end cap 322 to capture the end cap 322 in the recess 459. In this way, the piston 456 is mechanically coupled to the actuator shaft 321. In other embodiments, alternative means could be employed to mechanically couple the piston 456 to the actuator shaft 321.

Figure 3G:
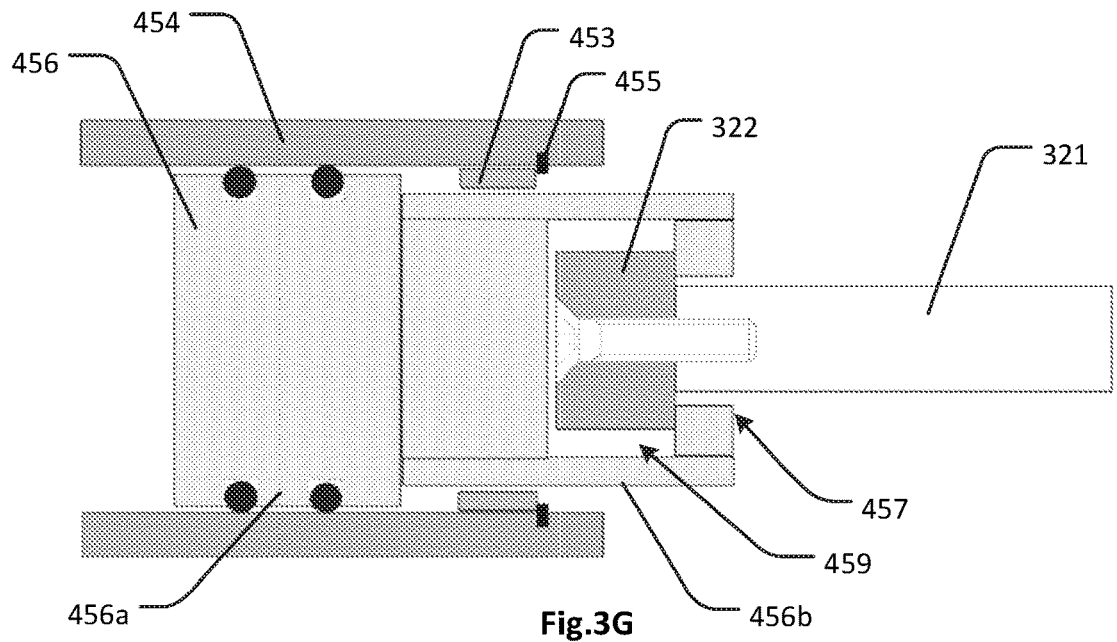
FIG. 3G is a cross-section illustrating the components of FIG. 3F after rotation of the piston assembly to capture the end cap of the actuator shaft in the recess of the piston.

FIG. 3F shows the end cap 322 in alignment with the slot 457 as it is inserted into the recess 459 through the slot 457. The piston assembly 450 is then rotated (by 90 degrees, for example, so that the length of the end cap 322 is aligned with the width of the slot 457) so that the end cap is captured in the recess 459 as shown in FIG. 3G. The end cap 322 may contact the piston 456 to push it away from the actuator 320 (the forward stroke). It is also evident from FIG. 3G that when the actuator shaft 321 is withdrawn, the end cap 322 will catch on the edges defining the slot 457 and pull the piston 456 towards the actuator 320 (the rearward stroke).

In some embodiments, the recess 459 may be deeper in an axial direction than a corresponding depth of the end cap 322. This may allow for a free travel distance of the end cap 322 within the recess 459 to allow for unimpeded acceleration of the actuator shaft 321 up to a desired forward velocity before impacting and pushing the piston 456 forward. The free travel distance may be in the range of 1 mm to 10 mm, 1 mm to 5 mm or 1 mm to 2 mm, for example.

In some embodiments, the slot 457 and recess 459 may be formed in the body of the piston 456, such as by injection moulding for example. In some embodiments, the piston 456 may comprise independent components configured to be assembled to form the slot 457 and recess 459, as shown in FIG. 3F, by welding, adhesive and/or mechanical fasteners, for example.

In some embodiments, the piston 456 may comprise a piston head 456a and a piston shaft 456b. The piston shaft 456b may be narrower than the piston head 456a. In some embodiments, the piston shaft 456b may be narrower than an inner diameter of the circlip 455, such that part of the piston shaft 456b is allowed to pass through the circlip 455 in the rearmost position in the cylinder 454 to engage the actuator shaft 321, as shown in FIG. 3G.

In some embodiments, the piston 456 and cylinder 454 may be keyed to prevent or mitigate against rotation of the piston 456 in the cylinder 454, which may cause misalignment of the slot 457 of the piston 456 with the end cap 322 of the actuator. That is, corresponding parts of the piston 456 and cylinder 454 may define complementary surfaces (e.g., non-cylindrical surfaces) configured to engage each other and resist relative rotation.

Figure 3H:
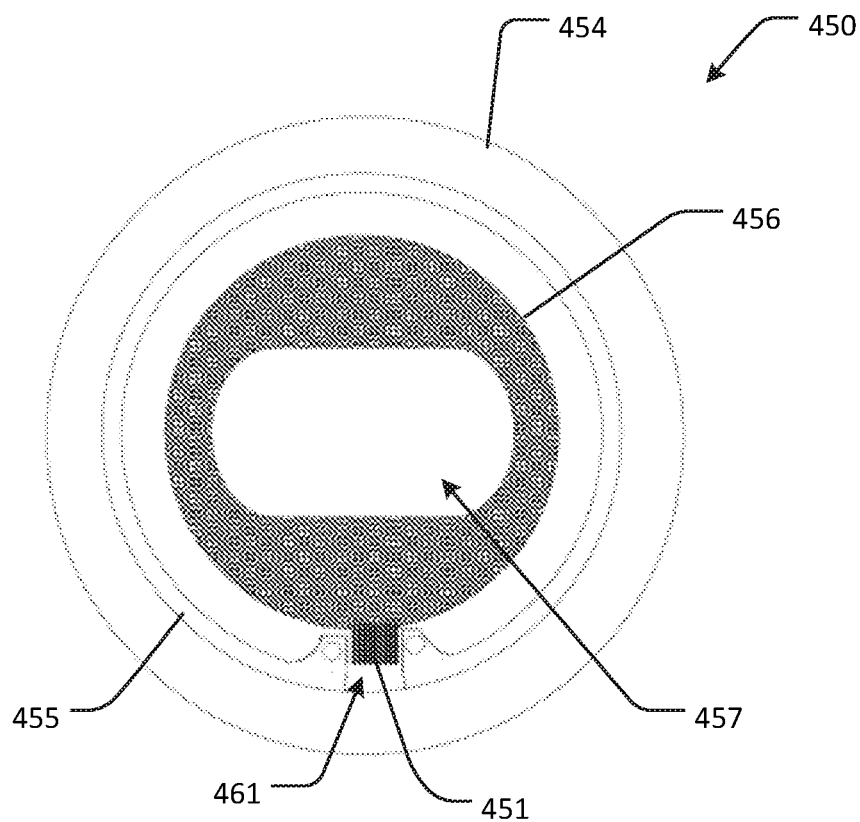
FIG. 3H is an end view of the piston assembly of FIGS. 2F and 3A illustrating a key and keyway of the piston assembly, according to some embodiments.

Any suitable configuration of keying surfaces may be employed. For example, in some embodiments, as shown in FIG. 3H, the piston shaft 456b may include an elongate key 451 protruding radially from a cylindrical surface of the piston shaft 456b and extending along part of the piston shaft 456b. The key 451 may engage a keyway 461 as the piston 456 moves back and forth in the cylinder 454 to maintain a constant rotational orientation with respect to the cylinder 454. The keyway 461 may be formed by a gap in the circlip 455, for example.

Figure 3J:
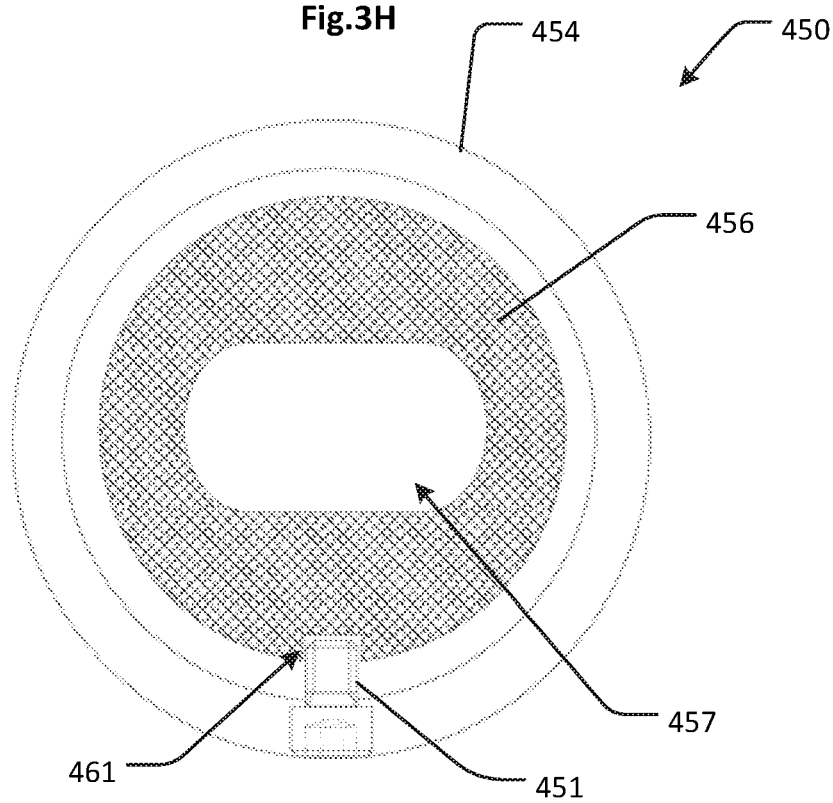
FIG. 3J is an end view of the piston assembly of FIGS. 2F and 3A illustrating a key and keyway of the piston assembly, according to some embodiments.

In some embodiments, the piston shaft 456b may define an elongate keyway 461, as shown in FIG. 3J. The keyway 461 may be defined by an elongate recess extending axially along the piston shaft 456b, and may be configured to receive a key 451 protruding radially inward from a sidewall of the cylinder 454. For example, the key 451 may comprise a screw inserted through the sidewall of the cylinder 454 such that it extends into the key recess 461 of the piston shaft 456b. As the piston 456 moves back and forth within the cylinder 454, the piston shaft 456b may track along the key 451 with the key 451 being maintained within part of the keyway 461.

According to some embodiments, actuator 320 may be a motor, such as a linear motor. In some embodiments, actuator 320 may be a direct drive, single axis linear actuator. Actuator 320 may be capable of a 50 mm stroke with a 240 to 1200N force potential, for example.

In embodiments where the piston 456 is moved rearwardly by the actuator 320 to reduce the pressure to a pressure below atmospheric pressure, atmospheric pressure will act on the piston 456 to move it towards the rest position of the piston 456 when the rearward force from the actuator 320 is released. The actuator 320 may also be operated to push the piston 456 forward towards the rest position of the piston 456. In some circumstances, the atmospheric pressure may act to begin pushing the piston 456 forward in the cylinder 454 before the actuator 320 has begun to apply forward force to the piston 456. In this situation, the initial forward impulse due to atmospheric pressure may induce pressure waves in the fluid column of the propulsion tube, which may be detrimental to the operation of the propulsion system. Therefore, the actuator 320 may be configured to induce the forward movement of the piston 456 faster than or at the same velocity as would occur due to atmospheric pressure and inertia alone.

Figure 3K:
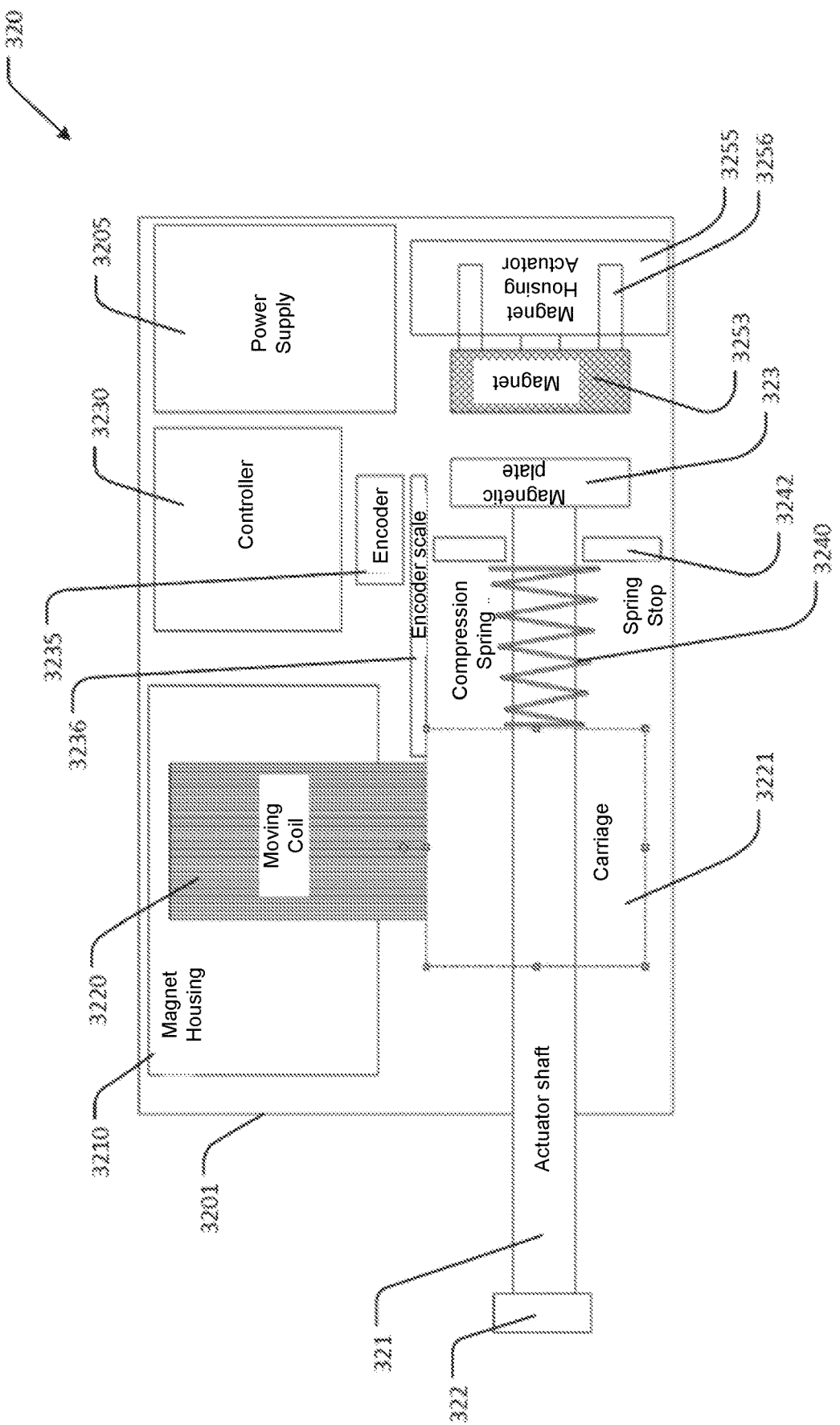
FIG. 3K is a schematic diagram of the actuator of the propulsion console of FIG. 3A, according to some embodiments.

Referring to FIG. 3K, the actuator 320 is shown in more detail according to some embodiments. The actuator 320 comprises an actuator shaft 321 and end cap 322 as described above. The actuator shaft 320 extends from within an actuator housing 3201, which also houses other components of the actuator 320 referred to below.

Movement of the actuator shaft 321 is effected by a fixed magnet 3210, which is fixed relative to the actuator housing 3201 and a moving magnet 3220 which is attached to the shaft 321 via a carriage 3221 and moves with the shaft 321 and carriage 3221. The moving magnet 3220 may comprise an electrical coil configured to operate as an electromagnet to cooperate with the fixed magnet 3210 to cause linear motion of the shaft 321 due to the opposing magnetic fields of the fixed magnet 3210 and moving magnet 3220. In some embodiments, the moving magnet 3220 may comprise multiple electromagnetic coils arranged in parallel.

The fixed magnet 3210 may comprise one or more permanent magnets and/or electric magnets. In some embodiments, the magnets of the fixed magnet 3210 may be arranged in a Halbach array to increase the magnetic flux density in the region of the moving magnet 3220 during operation. In some embodiments, the fixed magnet 3210 may consist entirely of one or more electromagnets.

The fixed magnet 3210 and moving magnet 3220 may each be controlled by a controller 3230, which controls electrical power supplied to the magnets 3210, 3220 by a power supply 3205. The actuator 320 may further comprise an encoder 3235 and associated encoder scale 3236 configured to measure and monitor the position of the carriage 3221 and/or shaft 321, and feed that position information back to the controller 3230.

In some embodiments, the actuator 320 may further comprise a bias, such as a spring 3240 to bias the shaft 321 to the extended position. For example, the bias may comprise a helical compression spring 3240, which may be located between the carriage 3221 and a spring stop 3242 positioned rearward of the carriage 3221. The spring 3240 may be located surrounding part of the shaft 321, as shown in FIG. 3G.

The bias 3240 may be loaded during rearward movement of the shaft 321 and provide an additional forward force (additional to the magnetic force) to assist in pushing the actuator shaft 321 forward.

In some embodiments, the actuator 320 may further comprise a holding magnet 3253. The holding magnet 3253 may comprise an electromagnet or solenoid powered by the power supply 3205 and controlled by the controller 3230. The holding magnet 3253 may be operated to temporarily hold the shaft 321 in a rearward position while the electromagnet(s) of the moving magnet 3220 and fixed magnet 3210 are switched to provide a forward force to the shaft 321, and then release the shaft 321 to begin the forward stroke once the moving magnet 3220 and fixed magnet 3210 are energised. This may allow time for the electromagnet(s) to become fully energised before commencing the forward stroke of the actuator, thus increasing the impulse applied to the actuator shaft.

This allows for the forward magnet forces to act simultaneously with the differential pressure forces acting on the piston (and optionally also the additional force from the potential energy stored in the bias 3240 or spring) to combine to provide a single impulse to the shaft 321 to drive the piston 456 forward.

This arrangement is suitable for providing a significantly faster forward stroke of the piston 456 (relative to the rearward stroke) to suddenly dissolve the gas into the liquid of the propulsion tube 220 and thus impart momentum to the insertion tube 1071 of the endoscope via the propulsion tube 220, while the relatively slower rearward stroke is suitable for drawing the piston 456 rearwardly and (optionally) simultaneously loading the spring or bias 3240.

The shaft 321 may further comprise a magnetic plate 323 configured to engage and be held by the holding magnet 3253. For example, the magnetic plate 323 may be formed of a non-magnetised ferromagnetic material or a permanent magnet.

In some embodiments, the actuator 320 may further comprise a holding magnet actuator 3255, powered by the power supply 3205 and controlled by the controller 3220, configured to adjust the position of the holding magnet 3253 to adjust the stroke length of the actuator and/or force or velocity profile of the actuator 320. The holding magnet actuator 3255 may be connected to the holding magnet 3253 by connector rods 3256. The holding magnet actuator 3255 may comprise a ball-screw actuator.

According to some embodiments, actuator 320 may have data input and output capability. For example, actuator 320 may be configured to receive input commands from an actuator controller 325, which may receive instructions from an on-board computing device 330. According to some embodiments, computing device 330 may be a single board computer (SBC). Computing device 330 may be in communication with an input/output relay board 361 and an input/output distribution board 362, for processing inputs and outputs to computer 330. In some embodiments, actuator 320 may further be configured to output sensor signals to actuator controller 325, such as a "low pressure" or "no pressure" signal, to indicate a fault, such as a fluid leak within piston assembly 450.

According to some embodiments, actuator controller 325 may comprise a programmable encoder having an interface configured to control the operation of actuator 320. According to some embodiments, actuator controller 325 may be a single axis encoder, such as a 5 micron single axis encoder, for example. According to some embodiments, actuator controller 325 may comprise an input/output interface to facilitate communications with actuator 320.

In the illustrated embodiment, propulsion console 300 further comprises power supplies 352 and 354. Power supply 352 may be a 48V power supply, while power supply 354 may be a 5V power supply, in some embodiments.

Propulsion console 300 further comprises communication means, including an endoscope interface 362 and a serial interface 364, as described in further detail below.

FIG. 3D shows the hardware components of propulsion console 300 in further detail. Computing device 330 comprises a processor 332 and memory 334. Processor 332 may comprise one or more data processors for executing instructions, and may include one or more of a microprocessor, a microcontroller-based platform, a suitable integrated circuit, an application-specific integrated circuit (ASIC), or an arithmetic logic unit (ALU) for mathematical and/or logical execution of instructions, such operations performed on data stored in any internal registers. Processor 332 may be configured to access memory 334, and to execute instructions stored in program code 336 of memory 334. Memory 334 may include one or more memory storage locations, which may be in the form of ROM, RAM, flash, or other memory types. Memory 334 stores program code 336 executable by processor 332. Memory 334 may further store data such as operational parameters 338 accessible to be read and written to by processor 332. As program code 336 is executed by processor 332, processor 332 may write to and read from operation parameters 338.

Actuator controller 325 may receive instructions from computing device 330, and send instructions to actuator 320 to cause actuator 320 to actuate piston assembly 450, according to one or more actuator control sequences stored in program code 336, as described in further detail below. According to some embodiments, actuator controller 325 may form part of computing device 330. According to some embodiments, actuator controller 325 may operate independently of computing device 330, and may comprise its own memory 326 storing executable command sets for controlling operation of actuator 320. According to some embodiments, command sets may be stored as macro command sets within actuator controller 325. The command sets 327 may be executed by actuator controller to control the movement of actuator 320.

Command sets 327 may comprise one or more command sets for each type of propulsion tube unit 210 which can be connected to propulsion console 300. The appropriate command set is selected from the stored command sets 327 by data string matching the data read by RFID reader 314 with an identification code associated with each command set. As described below, the execution of the selected command set may be initiated and terminated based on detection of a user input, which may be via a footswitch controller 342 or a hand held remote controller 344, in some embodiments. Each command set may comprise one or more time/position data sets, which may be interpreted and translated into a motion by actuator controller 325. According to some embodiments, actuator controller 325 may comprise a binary encoder 328 to interpret the time/position dataset. According to some embodiments, binary encoder 328 may have a positional resolution of 5 microns.

One or more command sets 327 may be of a fixed profile format, where the time-position and velocity parameters are fixed based on parameters determined to produce optimal movement of the identified propulsion tube unit 210. The fixed profile command sets may be configured to, when executed, cause actuator 320 to produce a reverse saw-tooth pressure/time profile, as defined in application number International Patent Application PCT/AU2018/050380, for example. One or more command sets may be of a smart profile format, wherein the time-position and velocity parameters are modified in real-time based on feed-back from actuator 320 and sensors and transducers located on propulsion tube unit 210, such as one or more gas pressure transducers 370 and/or motion sensors or accelerometers 760, as described in further detail below. For example, a command set for a particular propulsion tube unit 210 may include commands for running forward at 5 Hz, running forward at 3 Hz, running forward at 2 Hz, and running forward at 1 Hz. Actuator controller 325 may start by running the first command (3 Hz). However, if a pressure transducer 370 senses an over pressure scenario, actuator controller 325 may terminate that command and initiate a Macro with a lower frequency (2 Hz or 1 Hz, for example) for a predetermined cycle count. Actuator controller 325 may continue to decrease the cyclic rate until the pressure is determined to be within safe predetermined parameters. If the lowest frequency does not resolve the over pressure situation, a permanent interrupt requiring user reset intervention may be triggered.

In some embodiments, the propulsion tube 220 may comprise a pressure transducer 370 configured to measure the channel pressure of the propulsion tube 220. In some embodiments, the actuator 320 may be configured to act as a pressure sensor 370 as well as an actuator, by providing feedback to the controller 325 including force resistance data indicating the level of force being applied to the piston by the actuator, from which the channel pressure of the propulsion tube 220 can be inferred.

Detection and identification components 311, such as micro switch 312 and RFID reader 314, may be communicably coupled to processor 332, to allow processor 332 to receive signals generated by components 311.

In some embodiments, micro switch 312 may be configured to operate as a safety interrupt switch, to reduce risk of injury to patients and users of the device. For example, micro switch 312 may be configured to close the circuit between actuator 320 and a power supply 350, so that no power can be provided to actuator 320 without piston assembly 450 being correctly inserted into piston assembly receptacle 310. Micro switch 312 may be configured to be activated when piston assembly 450 is fully inserted into piston assembly receptacle 310. According to some embodiments, when micro switch 312 is activated, micro switch 310 may also send an activation signal to computing device 330, which computing device 330 may use to determine that a piston assembly 450 has been inserted into piston assembly receptacle 310.

RFID reader 314 may be positioned so that when a piston assembly 450 is fully inserted into piston assembly receptacle 310, RFID reader 314 is positioned adjacent to an RFID tag located on the piston assembly 450. RFID reader 314 is configured to read the RFID tag located on piston assembly 450 and communicate the read RFID code to computing device 330. On receipt of the RFID code, computing device 330 may be configured to determine the type of propulsion tube unit 210 that has been inserted, based on a database of RFID codes stored in memory 334. Computing device 330 may further be configured to select a code module for execution from program code 336 based on the RFID code identified. If the RFID tag is not recognised, computing device 330 may prevent any code module from executing, to prevent activation of actuator 320 where an invalid or incompatible piston assembly 450 has been coupled to console 300. In some embodiments, RFID reader 314 may be replaced by another device configured to read an identification code, such as a laser scanner for reading a barcode, or a camera for reading a QR code, for example.

Where propulsion tube unit 210 is configured to be a one-time use, disposable unit, RFID reader 314 may further comprise an RFID disabling device 315, which may be an electromagnetic RFID disabling device in some embodiments. RFID disabling device 315 may be configured to generate an electromagnetic field to disable the RFID tag, so that once the propulsion tube unit 210 is withdrawn, it cannot be read by RFID reader 314 if it is reinserted, preventing the reuse of propulsion tube unit 210 on more than one patient. This may prevent cross infection, and fatigue failure of the propulsion tube unit 210.

Where RFID reader 314 is replaced by a laser scanner for reading a barcode, or a camera for reading a QR code, for example, RFID disabling device 315 may be replaced with a different code disabling device configured to render the code read by the device unreadable or void. According to some alternative embodiments, computing device 330 may be configured to store read codes in memory 334 or in an external memory, and to identify codes that have already been read to prevent re-use of a propulsion tube unit 210, for example by triggering a software-initiated lockout signal sent to the actuator controller 325.

Propulsion console 300 further comprises user inputs and outputs 340, which may include one or more touchscreens, keyboards, electronic mice, buttons, joysticks, or other input devices, as well as one or more LEDs, buzzers, speakers, touch screen displays, liquid crystal displays, plasma displays, a cathode ray displays or other output devices. In the illustrated embodiment, user I/O 340 comprises a footswitch controller 342, a hand held remote controller 344, and a display 346. Input devices such as footswitch controller 342 and hand held remote controller 344 allow a user to control the operation of actuator 320, and thus the movement of propulsion tube unit 210. For example, the input devices may allow a user to control one or more modes of propulsion, including starting propulsion, stopping propulsion, changing the direction of propulsion, and changing the speed of propulsion. According to some embodiments, actuator 320 may also allow for a high pressure static load function to be selected, which may be configured to stiffen propulsion tube unit 210 to facilitate easy insertion of propulsion tube 220 into the propulsion tube conduit 1025. According to some embodiments, propulsion console 300 may also control operation of the vacuum line 1027 to facilitate loading of the propulsion tube 220 into the propulsion tube conduit.

The propulsion console 300 may comprise a vacuum pump 3500 configured to evacuate air from the vacuum line 1027. The vacuum pump 3500 may comprise a negative pressure suction pump, for example a DC12V 120 kPa vacuum pump. The vacuum pump 3500 may be powered by the power supply 350 and controlled by the controller 325 to provide a negative pressure differential in the range of 50-90 kPa, 60-70 kPa or approximately 65 kPa, for example, and may be capable of evacuating air from the vacuum line at a rate of approximately 5 L/min, for example.

The vacuum pump 3500 may be operated in Setup Mode selectable from the GUI Touch display of the propulsion console 300 to facilitate loading of the Propulsion Tube 220 into the Propulsion Tube Conduit 1025 via the Y-Connector 140. The vacuum pump 3500 may also operate during operation of the propulsion system, for example, when other Propulsion Profiles are activated by any user input e.g. Footswitch. This may further resist movement of the propulsion tube 220 in the propulsion tube conduit 1025 during operation.

The vacuum pump 3500 may comprise an internal pressure transducer configured to provide logic level reporting of the vacuum state to the controller 325. For example, no static vacuum may indicate that: the external tube 3505 is not connected; the endoscope 110 is not connected; or that no propulsion tube 220 is present in the propulsion tube conduit 1025 of the endoscope 110.

The vacuum pump 3500 may be connected to the vacuum line 1027 via an external vacuum connector tube 3505 extending between the propulsion console 300 and the connector body 160 of the endoscope 110. For example, the vacuum line 1027 may terminate in a small luer port in the connector body 160 and the vacuum pump 3500 may be in communication with a console port 3501 of the propulsion console 300, with the external vacuum connector tube 3505 configured to fluidly connect the port in the connector body with the console port 3501.

The console port 3501 may comprise a luer lock fitting, such as a Cadence ¼" Female Luer to 5/16" Barbed Male Tube fitting w/Panel Mount Screw Fitting, for example. The external vacuum connector tube 3505 may comprise ¼" Male Luer to ¼" PVC Tube to ¼" Male Luer, for example. The console port 3501 may be connected to the vacuum pump 3500 by internal vacuum tubes 3511.

In some embodiments, the propulsion console 300 may comprise a liquid trap 3520 disposed between and in communication with the vacuum pump 3500 and console port 3501 via the internal vacuum tubes 3511, as shown in FIG. 3C. The liquid trap 3520 may be configured to allow air to pass through it while collecting any liquid that enters the liquid trap 3520. For example, the liquid trap 3520 may be similar in configuration to a conventional medical suction fluid reservoir.

The propulsion console 300 may further comprise a liquid sensor 3522 disposed in the liquid trap 3520 and configured to detect the presence of liquid in the liquid trap 3520. For example, liquid in the vacuum line 2017 during operation of the endoscope system 100 may indicate a leak in the propulsion tube 220, for example. The liquid sensor 3522 may be in electrical communication with the controller 325 which may be configured to halt operation of the propulsion console 300 if liquid is detected in the liquid trap 3520, or alert the operator to a potential leak. The liquid sensor 3522 may comprise a simple two-conductor (normally Open) liquid conductivity switch with 3.3V TTL logic signal being transmitted when both conductors are in contact with a liquid.

Footswitch controller 342 may be configured to be activated by the foot of a user, and may be designed to be positioned on a floor. Footswitch controller 342 may be galvanically or otherwise electrically isolated from console 300 for user and patient safety. Footswitch controller 342 may also be optically isolated from console 300. Footswitch controller 342 may be configured to allow the user to cause computing device 330 to execute program code 336 to activate a predetermined actuator control sequence which initiates the running of actuator 320 to cause propulsion of propulsion tube unit 210. According to some embodiments, footswitch controller 342 may also allow the user to cause computing device 330 to execute program code 336 to activate a predetermined actuator control sequence which ceases the running of actuator 320 to cause propulsion of propulsion tube unit 210 to stop.

Hand held remote controller 344 may be configured to be activated by hand, and may be incorporated into the endoscope control body 150. Hand held remote controller 344 may be galvanically and optically isolated from console 300 for user and patient safety. Hand held remote controller 344 may be configured to allow the user to cause computing device 330 to execute program code 336 to activate a predetermined actuator control sequence which initiates the running of actuator 320 to cause propulsion of propulsion tube unit 210. According to some embodiments, hand held remote controller 344 may also allow the user to cause computing device 330 to execute program code 336 to activate a predetermined actuator control sequence which ceases the running of actuator 320 to cause propulsion of propulsion tube unit 210 to stop.

According to some embodiments, display 346 may comprise an LED display panel. According to some embodiments, display 346 may comprise a programmable intelligent LED display panel. Display 346 may be a touchscreen display in some embodiments, and may be configured to allow the user to cause computing device 330 to execute program code 336 to activate a predetermined actuator control sequence which initiates the running of actuator 320 to cause propulsion of propulsion tube unit 210. According to some embodiments, display 346 may also allow the user to cause computing device 330 to execute program code 336 to activate a predetermined actuator control sequence which ceases the running of actuator 320 to cause propulsion of propulsion tube unit 210 to stop.

Display 346 may operate as a selectable user input designation device, to enable a user to select which user input devices should control which functions of actuator 320. Display 346 may be a resistive touch screen, for example, and may be located in a front panel of console 300, in some embodiments. A user may be able to use display 346 to select that hand held remote controller 344 controls forward movement, while footswitch controller 342 controls reverse movement. Display 346 may also be configured to display operation information, such as the state of connection of propulsion tube unit 210 to the propulsion console 300. Display 346 may be configured to display setup information, to direct a user through the setup of the system by onscreen prompts and confirming correct actions. The user may initiate RUN and STOP modes of propulsion tube unit 210 from display 346. Error messages and warnings may also be displayed on display 346. Video output from the interface may also be displayed as a data overlay on display 346, providing real-time information to the clinician on the propulsion system 200.

Components of propulsion console 300, including computing device 330, detection and ID components 311, actuator controller 525, user I/O 340 and communications module 360, may be powered via a power supply 350, which may receive power from a mains power supply. In some embodiments, power supply 350 may comprise two power supplies for supplying different voltages, such as power supply 352 and power supply 254, as described above. In some embodiments, power supply 350 may additionally or alternatively comprise one or more batteries, or alternative power supply devices. According to some embodiments, power supply 350 may comprise a galvanically isolated, medical grade power supply.

According to some embodiments, propulsion console 300 further comprises a communications module 360 to provide for communications between computing device 330 and external devices. For example, communications module 360 may facilitate communication between computing device 330 and propulsion tube unit 210 via an endoscope interface 362. Communications module 360 may further facilitate communication between computing device 330 and external computing devices, such as PCs, laptops, smart phones, and other smart devices, via a serial interface 364, for example. According to some embodiments, communications module 360 may facilitate communications via one or more wired communication protocols, such as RS-232, USB, or Ethernet, or via one or more wireless communication protocols such as Bluetooth, Wi-Fi or NFC, for example.

For example, according to some embodiments, communications module 360 may be configured to facilitate communications between computing device 330 and propulsion tube unit 210 via endoscope interface 362 using the RS-232 protocol. Communication between computing device 330 and propulsion tube unit 210 may allow for a number of functions to be performed based on data received from sensors located on the propulsion tube unit 210.

For example, according to some embodiments, the endoscope may comprise a motion sensor or accelerometer 760 mounted on the camera side of the distal coil pipe collar. The motion sensor may comprise an electronic motion sensor configured to detect vibration or changes in tilt angle, such as a Signal Quest SQ-MIN-200 sensor, or accelerometer such as a single axis accelerometer arranged to detect momentum changes along a longitudinal axis of the endoscope during operation of the propulsion system. During correct operation, each fluid pulse created by actuation of piston assembly 450 by actuator 320 results in advancement of the distal tip of propulsion tube unit 210. The accelerometer 760 may be configured to send data generated based on the movement of the distal tip of propulsion tube unit 210 to computing device 330, which may execute a differential counter code module to determine if the distal tip of propulsion tube unit 210 is not moving relative to the number of pressure pulses applied by actuator 320. At a certain predetermined threshold, which may be stored in memory 334, an imbalance between the accelerometer data and the number of pulses expected, computing device 330 may be configured to send a program interrupt signal to actuator controller 325 to halt operation of actuator 325. This can prevent excessive force being applied to the bowel at times where vision may be obstructed, or in the case of bowel pathology causing stricture, obstruction, diverticulum or other abnormality.

In some embodiments, propulsion tube unit 210 may be fitted with a pressure transducer within the gas delivery tube, which is calibrated to a safe pressure/voltage threshold. Endoscopy is commonly performed by inflating the bowel with air or $CO_2$ gas to provide space for visualisation, but normal peristalsis and strictures can close of sections of the bowel to movement of gas. Increased pressure caused by the relatively rapid movement of the endoscope and inflation may produce an abnormally high intraluminal pressure, which can be sensed by the pressure transducer. The pressure transducer may be configured to send data to computing device 330. If a predetermined safe pressure threshold is exceeded, computing device 330 may be configured to send a program interrupt signal to actuator controller 325 to halt operation of actuator 325 and to require user intervention or a reset of the device.

According to some embodiments, communications module 360 may be configured to facilitate communications between computing device 330 and external computing devices via serial interface 364 using USB protocol. This may allow for external computing devices to write to memory 334 of computing device 330, to provide updated program code and operational parameters, for example.

Figure 4A:
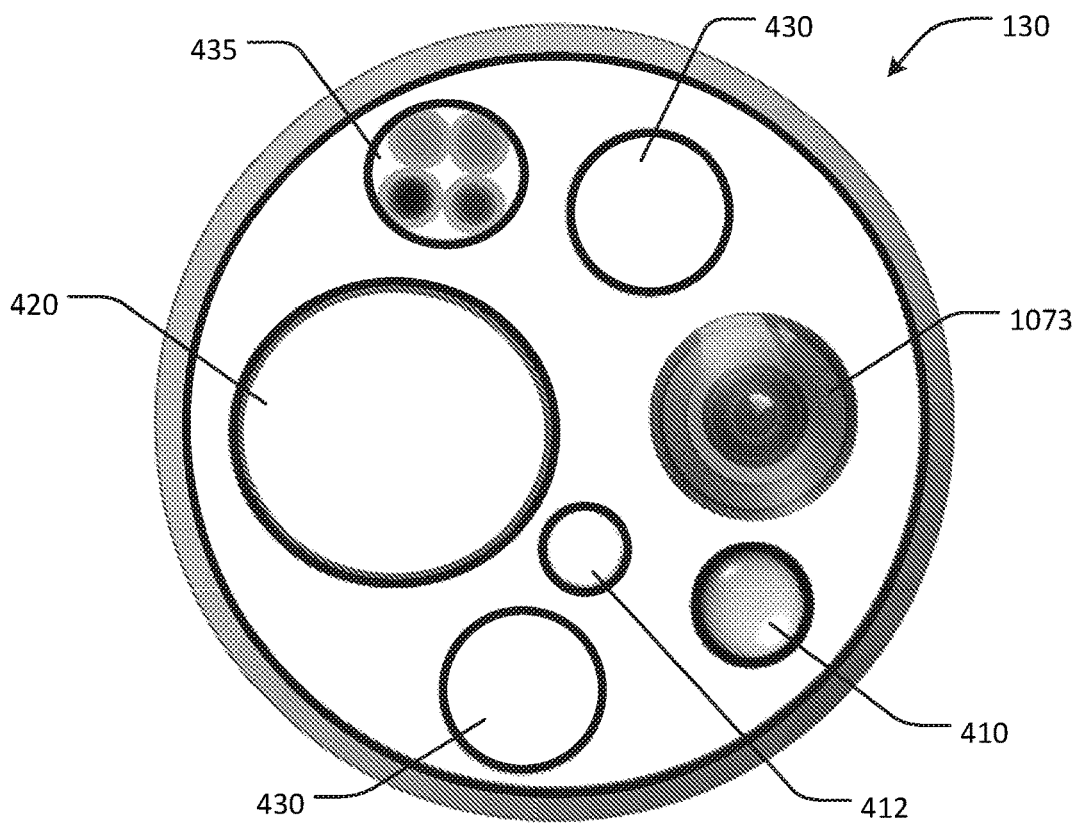
FIG. 4A is an end view of the endoscope of FIG. 1A as indicated by line A-A in FIG. 1A.

Referring again to the endoscope 110, FIG. 4A shows an end view of the distal head 130 according to some embodiments. The distal head 130 comprises a camera 1073, camera lens wash nozzle 410, forward waterjet nozzle 412, biopsy port/instrument channel 420, lights 430, and optionally a multifrequency output LED 435 for illuminating the field of view of the camera 1073 with selected frequencies of light. The lights 430 may comprise lenses at the end of optic fibre light guides, or in some embodiments the lights 430 may comprise LED lights connected via cables in the insertion tube 1071.

Figure 4B:
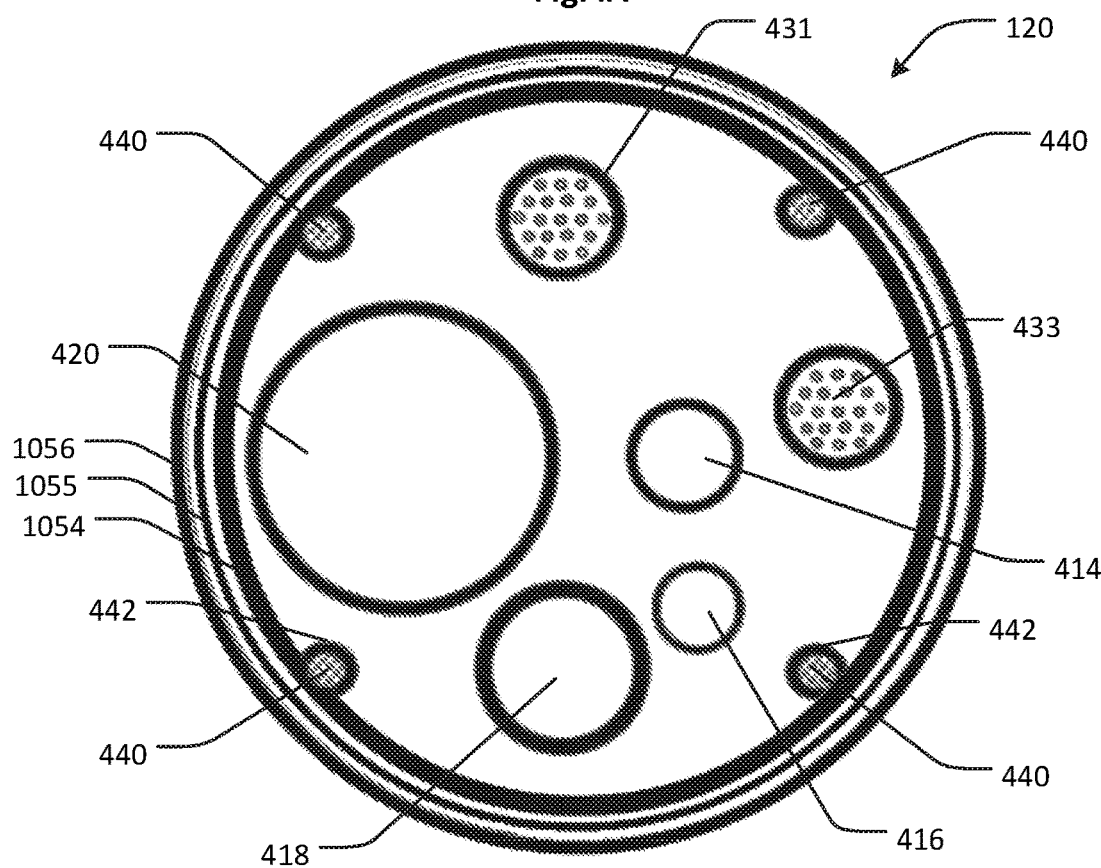
FIG. 4B is a cross-section of the endoscope of FIG. 1A as indicated by line B-B in FIG. 1A.

Referring to FIG. 4B, the lens wash nozzle 410 may be supplied by air and water lines 414 and 416, and a separate water conduit 418 may supply water to the forward waterjet 412. The air and water conduits 414, 416, 418 may extend the full length of the endoscope 110 to the connector body 160, and be controlled by valves at the control body 150, as per a conventional endoscope.

The lights 430 and/or LED 435 may be connected to the video console via light guides or cables 431 and the camera 1073 may be connected to the video console by camera cable 433.

FIG. 4B also illustrates the opposed positions of the angulation cables 440 in the bending section 120, threaded through eyelets 442 in the link rings of the bending section 120.

Figure 4C:
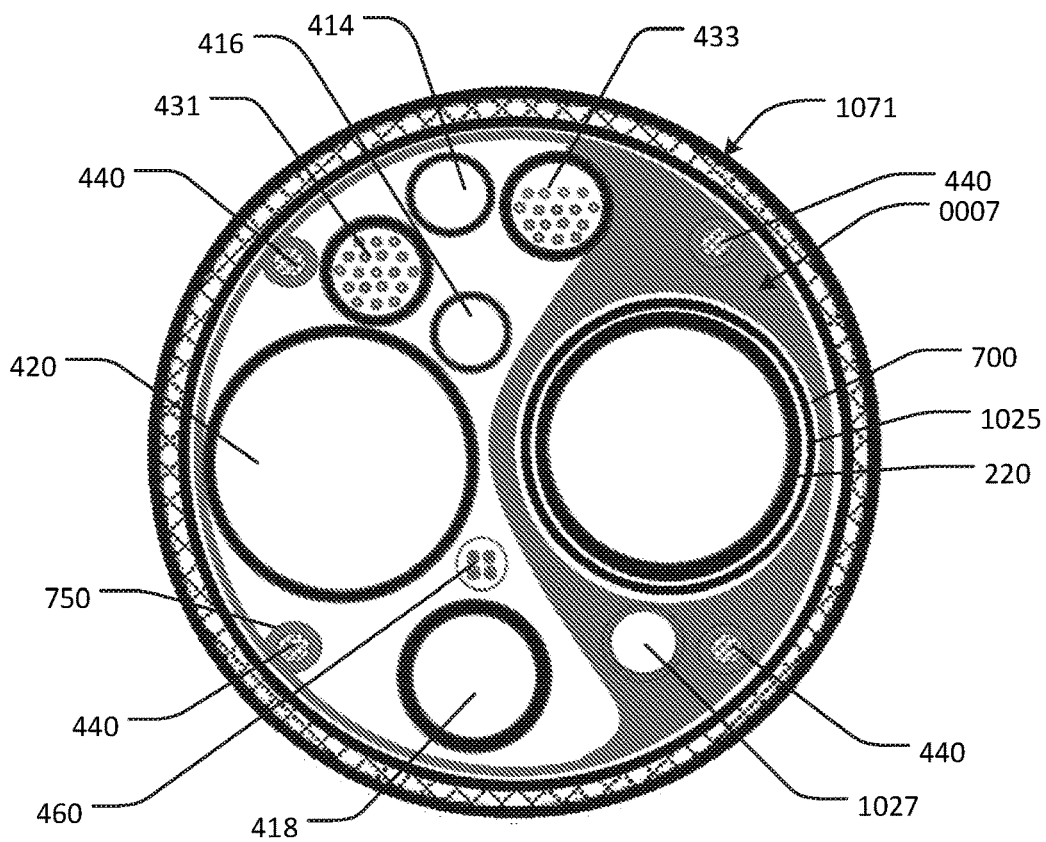
FIG. 4C is a cross-section of the endoscope of FIG. 1A as indicated by line C-C in FIG. 1A.

FIG. 4C illustrates a cross-section of the endoscope 110 where the propulsion tube conduit 1025 terminates in the connector 0007, as described further below with reference to FIG. 7. A vacuum line 1027 for evacuating air from the propulsion tube conduit is also shown, as well as the propulsion tube 220 installed in the propulsion tube conduit 1025.

Figure 4D:
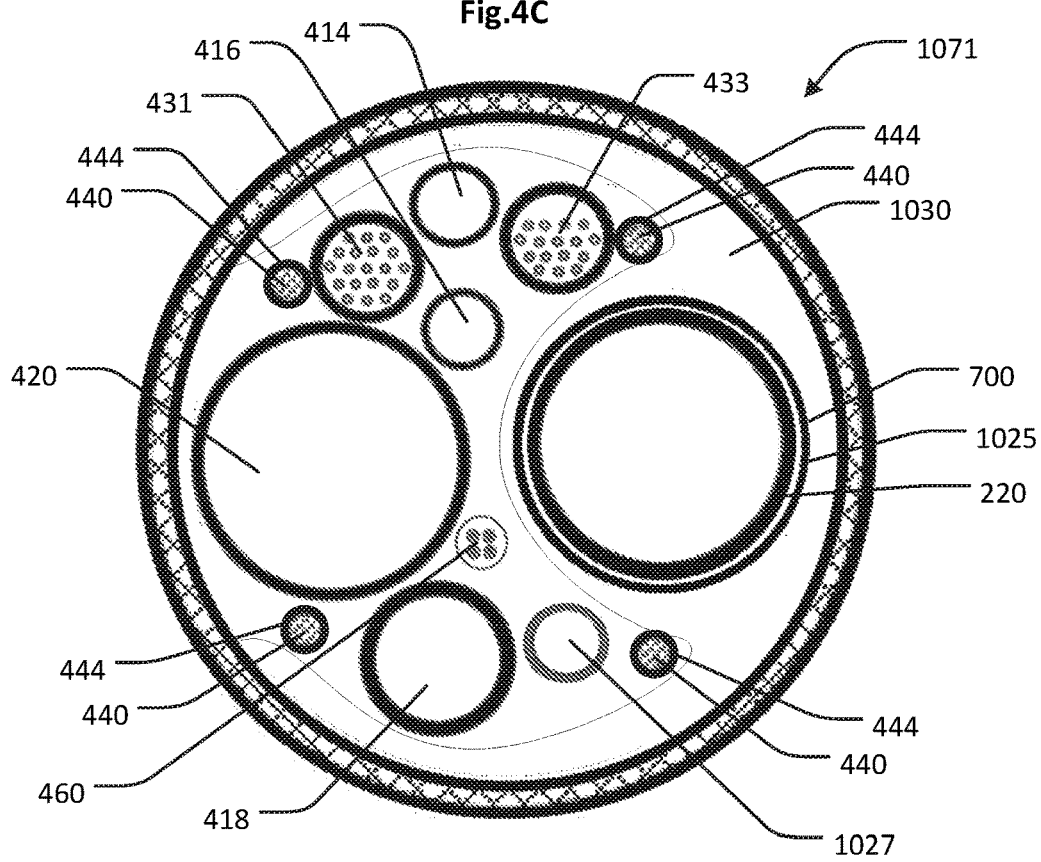
FIG. 4D is a cross-section of the endoscope of FIG. 1A as indicated by line D-D in FIG. 1A.

FIG. 4D shows a cross-section of the insertion tube 1071 between the connector 0007 and the Y junction 140, illustrating the position of one of the friction ribs 1030 partially surrounding the cables and conduits of the endoscope 110.

Figure 4E:
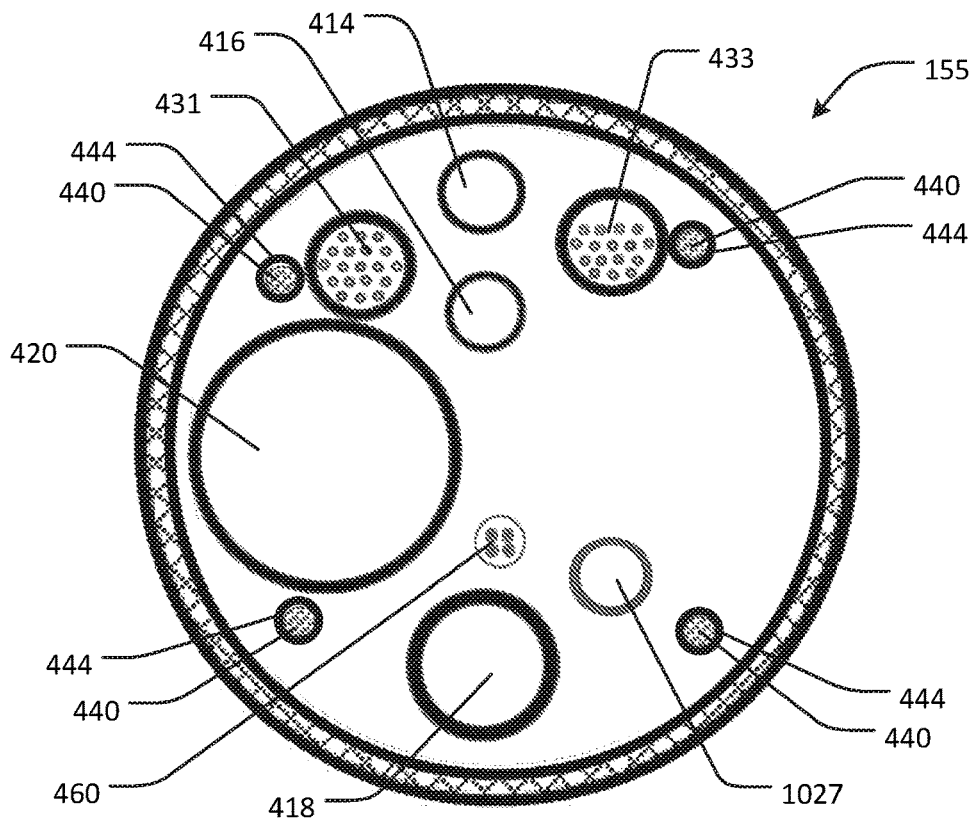
FIG. 4E is a cross-section of the endoscope of FIG. 1A as indicated by line E-E in FIG. 1A.

FIG. 4E a shows a cross-section of the control tube 155 between the Y junction 140 and the control body 150. The propulsion tube conduit 1025 is not present as it terminates at the Y junction 140.

Figure 4F:
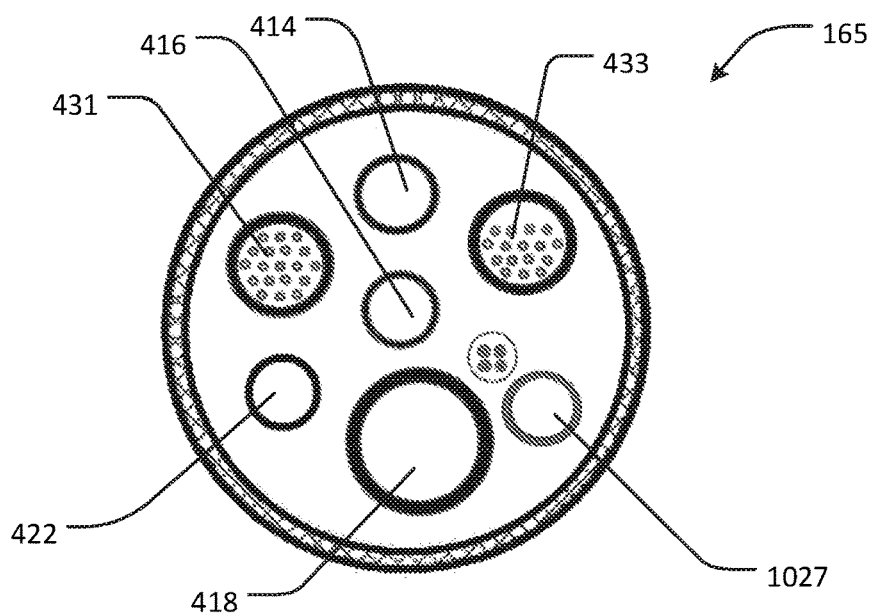
FIG. 4F is a cross-section of the endoscope of FIG. 1A as indicated by line F-F in FIG. 1A.

FIG. 4F shows a cross-section of universal tube 1094 between the control body 150 and the connector body 160. The instrument channel 420 is not present as a terminates at the biopsy port of the control body 150. Suction is selectively supplied to the instrument channel 420 by suction line 422 which connects to a suction source at the connector body 160.

In some embodiments, the endoscope system 100 may comprise a polymer insertion tube 1071. Conventional medical endoscopes are typically constructed with insertion tubes comprising steel coils and steel mesh braiding to provide sufficient stiffness in the insertion tube to allow the endoscope to be pushed into the gastrointestinal tract by an operator. As such, this stiffness limits the passive bending radius of the device, increasing frictional forces and limiting the insertion depth that can be achieved with this method of propulsion.

The propulsion system 200 of the present endoscope system 100 may reduce or eliminate the requirement for pushing the endoscope 110. Therefore, less stiffness is required in the insertion tube. A polymer insertion tube may be cheaper to manufacture and allow for a smaller passive bending radius, which can more easily conform to the intestinal anatomy.

Figure 5A:
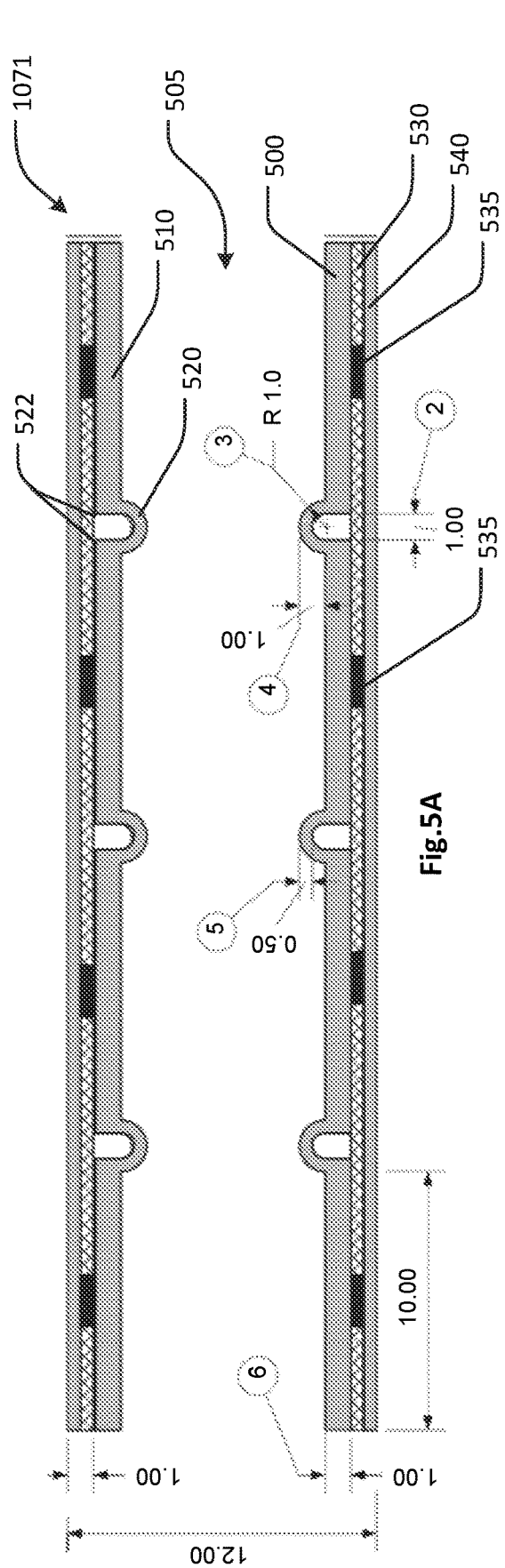
FIG. 5A is a longitudinal cross-section of a polymer insertion tube according to some embodiments.
Figure 5C:
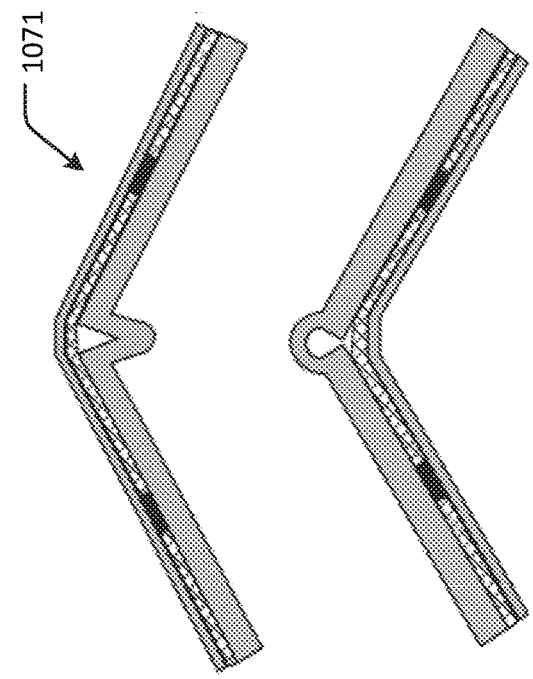
FIG. 5C is a longitudinal cross-section of the insertion tube of FIG. 5A in a flexed configuration.
Figure 5B:
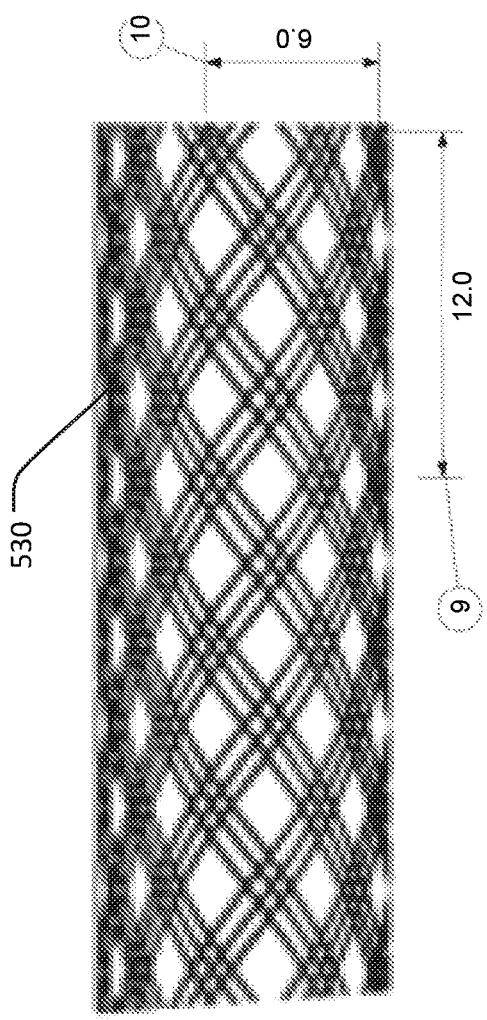
FIG. 5B is a side view of a fibre mesh layer of the insertion tube of FIG. 5A.

Referring to FIGS. 5A to 5C, the insertion tube 1071 may comprise an inner convoluted polymer tube 500 defined by a plurality of cylindrical portions 510 joined end to end by annular rib portions 520 allowing the insertion tube 1071 to be flexed about the rib portions 520. The inner convoluted tube 500 defines a lumen or channel 505 configured to accommodate the various conduits, tubes, channels and cables of the endoscope 110.

The cylindrical portions 510 may resist ovalisation with flexing of the insertion tube 1071. These cylindrical portions 510 protect the cables and conduits of the endoscope 110 from crushing when the insertion tube 1071 flexes. The thickness of the cylindrical portions 510 may be varied for endoscopes of different diameters or for different applications.

The annular rib portions 520 provide the insertion tube 1071 with flexibility, due to a relatively lower wall thickness in comparison with a wall thickness of the cylindrical portions 510. The annular rib portions 520 may be designed to limit the flexibility of the insertion tube 1071 to a minimum bending radius. This may assist in protecting certain instruments or instrument channels, which may require a limited bending radius for correct operation.

The annular rib portions 520 may extend radially inwardly relative to the cylindrical portions 510. Annular edges 522 may be formed at junctions between the cylindrical portions 510 and rib portions 520.

The convoluted tube 500 may be moulded or extruded from a flexible polymer material such as high molecular weight polyethylene (HMWPE), for example. In some embodiments, the convoluted polymer tube 500 may include fibre elements of other high-strength inelastic polymers (such as ultra high molecular weight polyethylene (UHMWPE) or Kevlar™, for example) to increase the fatigue strength of the material, particularly in the rib portions 520 where the material is thinner and subject to higher compression and tension with flexing of the insertion tube 1071.

A radial depth of the annular rib portions 520 may be reduced significantly with the addition of reinforcing fibres. In some embodiments, the rib portions 520 may define a W-shaped profile to reduce the radial depth of the rib portions 520.

When the insertion tube 1071 is flexed, as shown in an exaggerated manner in FIG. 5C, the flexion angle is limited by the size and shape of the annular rib portion 520 as the annular edges 522 come into abutment with each other (at the most acutely angled side of the flexed insertion tube 1071, on the inside of the curve of the flexed insertion tube 1071), and the cylindrical portions 510 pivot about the annular edges 522 until the annular rib portion 520 is extended to its limit, restricting the insertion tube 1071 from flexing any further.

The insertion tube 1071 further comprises an intermediate layer of woven polymer fibres 530 surrounding the convoluted tube 500. The fibres 530 may be formed of an inelastic polymer such as UHMWPE or Kevlar™, for example, to resist elongation of the insertion tube 1071. The layer of woven fibres 530 may be formed as a textile braided tube, for example.

In some embodiments, the fibres 530 are bonded to the convoluted tube 500 at specific bonding locations 535. As the insertion tube 1071 is flexed, the fibres 530 limit the extent to which the annular edges 522 can be separated at the outside curve of the flexed insertion tube (opposite the point of abutment of the annular edges 522). This is another way in which the minimum bending radius of the insertion tube 1071 can be limited.

The fibres may be bonded to the convoluted tube by heat welding, for example. The fibres may be bonded to the convoluted tube in an annular bonding region 535 extending circumferentially around the convoluted tube 500. The bonding locations may be equally spaced along a length of the insertion tube. There may be one bonding location 535 on each cylindrical portion 510.

The insertion tube 1071 may further comprise an outer polymer coating 540 surrounding the woven fibres 535. The outer layer 540 may be formed of polyurethane elastomer, for example.

The minimum bending radius of the insertion tube may be set by selecting one or more of a length, orientation, and tension of the fibres between bonding locations when the insertion tube is in an un-flexed or straight configuration. The amount of slack in the fibres 530 between each bonding region 535 may be selected to allow a certain selected bending radius of the convoluted tube.

The insertion tube illustrated in FIG. 5A provides exemplary dimensions suitable for a reusable, 12 mm diameter gastrointestinal endoscope with a passive bending radius of approximately 60 mm. This allows for most commonly used instruments, such as graspers and biopsy forceps, to pass through a standard 3.9 mm biopsy channel designed for 3.2 mm diameter instruments. For example, the outer diameter of the insertion tube may be in the range of 8 mm to 16 mm, 10 mm to 14 mm, or approximately 12 mm. The wall thickness of the cylindrical portions 510 of the insertion tube may be in the range of 0.5 mm to 2 mm, or approximately 1 mm. The thickness of the fibre layer 530 and outer sheath 540 may be in the range of 0.5 mm to 2 mm, or approximately 1 mm. The inner diameter of the cylindrical portions 510 may be in the range of 4 mm to 10 mm, 5 mm to 8 mm, or approximately 6 mm. The cylindrical portions 510 may have a length in the range of 4 mm to 40 mm, 6 mm to 24 mm, 8 mm to 16 mm, 10 mm to 14 mm, or approximately 10 mm. The wall thickness of the annular rib portions 520 may be in the range of 0.2 mm to 1 mm, 0.3 mm to 0.8 mm, 0.4 mm to 0.6 mm or approximately 0.5 mm. The annular rib portions 520 may protrude radially inward from an internal surface of the cylindrical portions 510 by a depth in the range of 0.2 mm to 2 mm, 0.5 mm to 1.5 mm, 0.8 mm to 1.2 mm, or approximately 1 mm. The width of a an annular channel formed by the annular rib portions 520 between external surfaces of adjacent cylindrical portions 510 in an non-flexed state may be in the range of 0.2 mm to 2 mm, 0.5 mm to 1.5 mm, 0.8 mm to 1.2 mm, or approximately 1 mm. An axial length of the bonding regions 535 may be in the range of 1 mm to 10 mm, 2 mm to 8 mm, 3 mm to 6 mm, or 4 mm to 5 mm. The insertion tube may be configured to have a minimum bending radius in the range of 10 mm to 200 mm, 20 mm to 160 mm, 40 mm to 120 mm, 60 mm to 100 mm, 60 mm to 80 mm or approximately 60 mm.

Figures 5D, 5E:
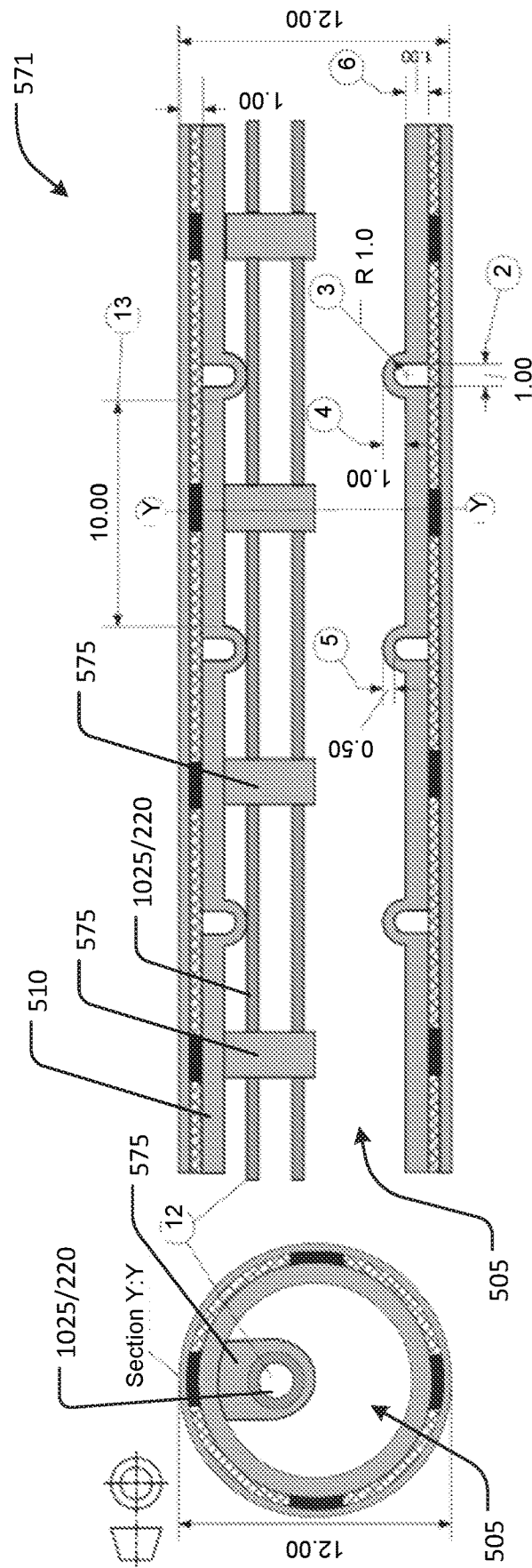
FIG. 5D is a longitudinal cross-section of an alternative polymer insertion tube according to some embodiments.
FIG. 5E is a transverse cross-section of an alternative polymer insertion tube according to some embodiments.

Referring to FIGS. 5D and 5E, an alternative insertion tube 571 is shown according to some embodiments. In some embodiments, the endoscope 110 may comprise an insertion tube 571 as shown in FIGS. 5D and 5E rather than the insertion tube 1071 shown in FIGS. 5A to 5C.

The insertion tube 571 has similar features to insertion tube 1071 with the additional features of protrusions 575 extending radially inwardly from the cylindrical portions 510 to support the propulsion tube conduit 1025 and/or propulsion tube 220.

The protrusions 575 may define apertures configured to receive the propulsion tube conduit 1025, which may be bonded in place with adhesive, for example. In some embodiments, the propulsion tube conduit 1025 may be integrally formed with the protrusions 575. In some embodiments, the convoluted tube 500 may be moulded together with the protrusions 575 and optionally also the propulsion tube conduit 1025 using a three-part mould, for example.

In some embodiments, the propulsion tube unit 210 may be fixed to and/or form part of the endoscope 110. The propulsion tube 220 may be fixed in or form part of the insertion tube. For example, the propulsion tube 220 may be bonded to or integrally formed with the insertion tube 1071, 571. In such embodiments, the endoscope 110 may not include a separate propulsion tube conduit 1025, or vacuum line 1027, vacuum line aperture 740, vacuum line socket 742, terminus 700 or striking block 710, and the endoscope system 100 may not include any of the components associated with the propulsion tube conduit 1025 or vacuum line 1027, such as the vacuum pump and associated connectors.

In some embodiments, the protrusions 575 may define apertures configured to receive the propulsion tube 220, which may be bonded in place with adhesive, for example. In some embodiments, the propulsion tube 220 may be integrally formed with the protrusions 575. In some embodiments, the convoluted tube 500 may be moulded together with the protrusions 575 and optionally also the distal portion 224 of the propulsion tube 220 using a three-part mould, for example.

In some embodiments, where an insertion tube 1071 is used without the protrusions 575, the propulsion tube conduit 1025 may be formed separately and inserted into the insertion tube 1071 with the other conduits and cables of the endoscope 110.

Referring to FIGS. 6A to 6C, a propulsion tube conduit 1025 is shown according to some embodiments. The propulsion tube conduit 1025 comprises a plurality of ribs 1030, which may be referred to as friction ribs for example. The friction ribs 1030 may press against an internal surface of the insertion tube 1071 to resist axial movement of the propulsion tube conduit within the insertion tube. The friction ribs 1030 may be formed of flexible silicon, for example. FIG. 6B illustrates the shape of the flexed friction ribs 1030 once installed in the insertion tube 1071 with the propulsion tube conduit 1025.

The friction ribs 1030 may define apertures through which the propulsion tube conduit 1025 may be threaded, and the friction ribs 1030 may be adhesively bonded to the propulsion tube conduit to hold them in place, for example. In some embodiments, the friction ribs 1030 may be integrally formed with the propulsion tube conduit.

Each friction rib 1030 may comprise a generally cylindrical central hub 1030*a*, each hub defining an aperture 1030*b* configured to closely receive the propulsion tube conduit 1025. In some embodiments, the apertures 1030*b* may have an internal diameter slightly smaller than the external diameter of the propulsion tube conduit 1025 in order to provide a tight friction fit when the hub 1030*a* is stretched over the propulsion tube conduit 1025. Each friction rib 1030 may also comprise a pair of legs 1030*c* extending laterally away from a base of the hub 1030*a*, and configured to extend substantially perpendicularly away from the propulsion tube conduit 1025. The legs 1030*c* may define a flat rectangular profile with a width of the leg 1030*c* (defined in an axial direction relative to the hub 1030*a*) greater than a thickness of the leg 1030*c*. In some embodiments, the thickness of each leg 1030*c* may taper to a tip 1030*d* (distal to the hub 1030*a*), such that the leg is more flexible near the tip 1030*d* than it is nearer the hub 1030*a*.

The propulsion tube conduit 1025 may be installed in the insertion tube 1071 with other conduits and cables of the endoscope 110. FIG. 6C illustrates a method of installing the propulsion tube conduit and other conduits and cables into the insertion tube. A fabric sheet may be wrapped around the cables and conduits to form a sleeve 660 with the friction ribs 1030 at least partially surrounding the cables and conduits. The fabric sleeve 660 may be stitched together with a steel wire 670 which may pass between the flexed friction ribs 1030 and the bundle of conduits then back to an outer surface of the fabric sleeve 660 to temporarily fix the friction ribs 1030 to the fabric sleeve 660, as shown in FIG. 6C.

A draw wire 680 may be fixed to an end of the fabric sleeve 660 to assist in drawing the fabric sleeve through the insertion tube 1071 carrying the cables and conduits within the fabric sleeve 660. Once the cables and conduits are installed in the insertion tube 1071, the steel stitching wire 670 may be removed from the fabric sleeve 660, and the fabric sheet may be removed from the insertion tube, leaving the cables and conduits in place in the insertion tube. Any suitable low friction fabric may be used for the fabric sleeve 660, such as rayon or nylon fabric, or braided cable fabric, for example.

Referring to FIGS. 7A to 7H, a connector 0007 is shown according to some embodiments. Alternative connectors 1035 and 1048 are shown in FIGS. 13 and 14, respectively, with like features indicated by similar reference numerals. The connector 0007 may also be referred to as an insertion tube collar, a propulsion tube conduit collar, a propulsion tube conduit termination connector, a pipe collar, a coil pipe collar, or a distal connector. The distal connector 0007 may be suitable for use with the polymer insertion tube 1071 to connect the insertion tube 1071 to the bending section 120.

The connector 0007 may define a terminus 700 (see FIGS. 7A and 7G) configured to receive the distal end of the propulsion tube conduit 1025 and connect the propulsion tube conduit to the connector 0007. The terminus 700 may define a propulsion tube striking block 710 (see FIG. 7G) configured to be impacted by the propulsion tube, in use in the endoscope, to transfer momentum from the propulsion tube to the bending section 120 and insertion tube 1071.

The connector 0007 defines an outer wall 720 configured to engage the insertion tube 1071 at a proximal end of the connector 0007 and the bending section 120 at a distal end of the connector 0007 to connect the bending section to the insertion tube. In some embodiments, the outer wall 720 of the connector 0007 may be configured to engage internal surfaces of the insertion tube 1071 and/or bending section 120. In some embodiments, the outer wall 720 of the connector 0007 may be configured to engage external surfaces of the insertion tube 1071 and/or bending section 120 in the manner of a male connector.

The connector 0007 defines an aperture or passage 730 (see FIG. 7E) to allow passage of the cables and conduits from the insertion tube 1071 to the bending section 120.

The terminus 700 may be defined within the outer wall 720 of the connector 0007. A central axis 701 of the terminus 700 may be parallel to and laterally offset from a central axis 703 of the connector 0007 (see FIG. 7F).

In some embodiments, the terminus 700 may define a socket 705 configured to receive the distal end of the propulsion tube conduit 1025. In some embodiments, the terminus 700 may define an annulus 715 between the socket 705 and a striking block 710 to receive the distal end of the propulsion ship conduit 1025.

In some embodiments such as the connector 1048 shown in FIGS. 14A and 14B, the terminus 700 may define a tapered socket 705 and a tapered striking block 710. The annulus 715 may be configured to receive the distal end of the propulsion tube conduit 1025. The striking block 710 may be threadedly engaged with a body 702 of the terminus 700 and rotatably adjustable to reduce radial thickness of the annulus 715, to clamp the distal end of the propulsion tube conduit in the annulus 715. In other words, rotating the striking block relative to the socket to move the striking block 710 along its axis of rotation like a screw to adjust the distance between the striking block 710 and the socket 705, and thus the radial thickness of the annulus 715.

In some embodiments, the striking block 710 may define a keyed recess 711 configured to receive a complimentary surface of a tool to facilitate rotation and axial adjustment of the striking block 711. For example, the recess 711 may define a hexagonal prism recess configured to receive an Allan Key or Hex-head tool.

In some embodiments, the striking block 710 may define an aperture 740 to allow fluid communication between the propulsion tube conduit and the vacuum line. This may allow for air to be evacuated from the distal end of the propulsion tube conduit to assist with insertion of the propulsion tube in the propulsion tube conduit. The striking block aperture 740 may be in fluid communication with a vacuum line socket 742 defined in the connector 0007 and configured to receive a distal end of the vacuum line of the endoscope. In some embodiments, the vacuum line socket 742 may be defined in the terminus or striking block coaxial with the terminus, as shown in FIGS. 13 and 14.

Figure 7H:
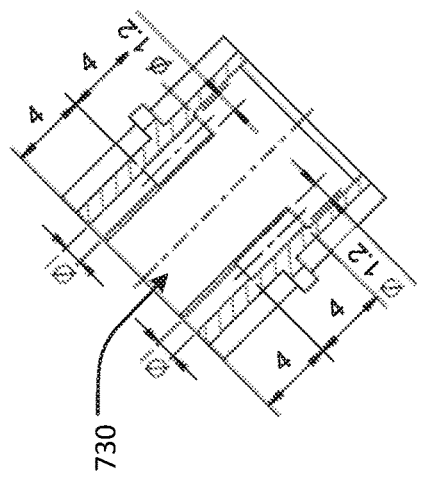
FIG. 7H is a cross-section of the connector of FIG. 7A as indicated by line C-C in FIG. 7E.
Figure 7F:
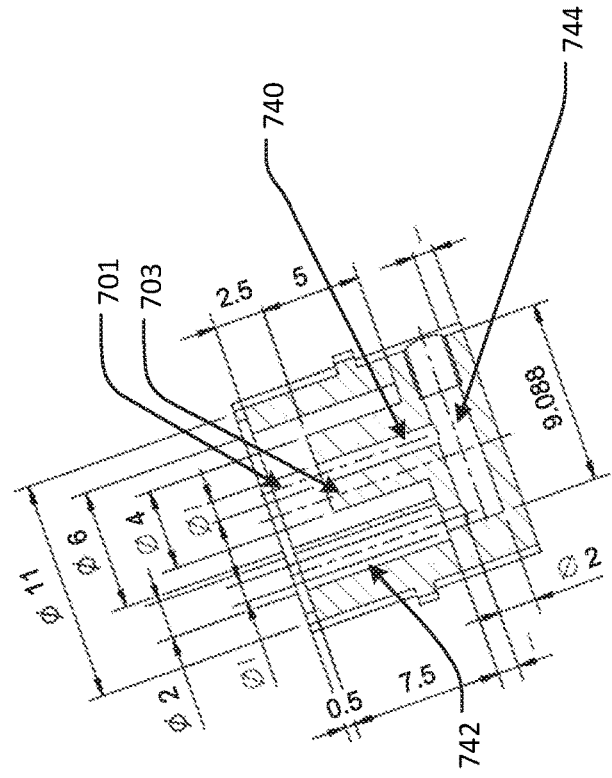
FIG. 7F is a cross-section of the connector of FIG. 7A as indicated by line A-A in FIG. 7E.

In some embodiments, the vacuum line socket 742 may be defined in the connector 0007 adjacent the terminus 700 as shown in FIGS. 7A and 7F. The vacuum line socket may extend in parallel with the terminus and striking block aperture. The connector 0007 may further define a vacuum manifold or lateral vacuum passage 744 fluidly connecting the vacuum line socket to the striking block aperture, as shown in FIG. 7F. The lateral vacuum passage 744 may extend through the outer wall of the connector, and may be sealed with a vacuum manifold set screw or plug 0008.

In some embodiments, the connector 0007 may define a plurality of angulation cable channels 750. The angulation cable channels may be located near a periphery of the connector 0007. The angulation cable channels may extend in parallel with and equally spaced from each other circumferentially around a central axis of the connector 0007.

Figure 13A:
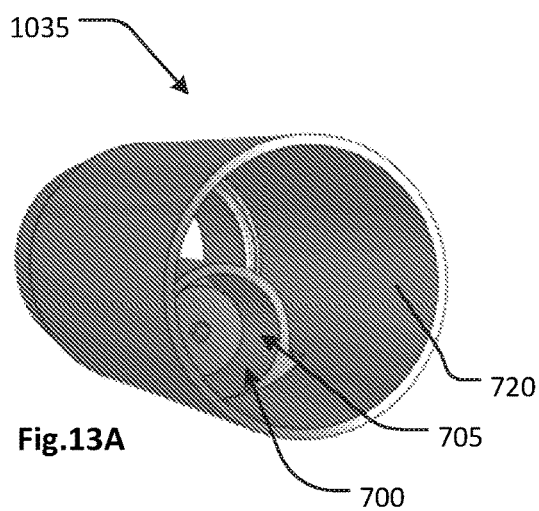
FIG. 13A is a perspective view of a distal connector according to some embodiments.
Figure 13B:
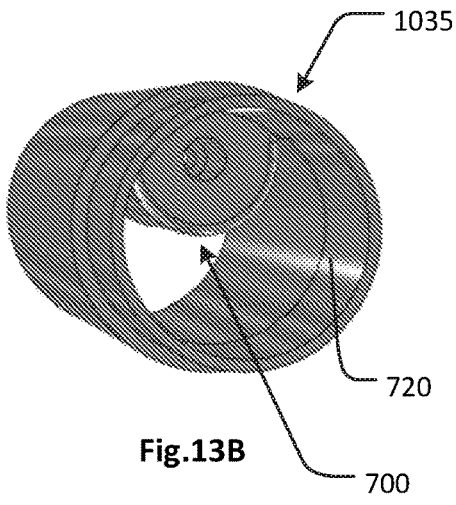
FIG. 13B in the second perspective view of the distal connector of FIG. 13A.
Figure 13C:
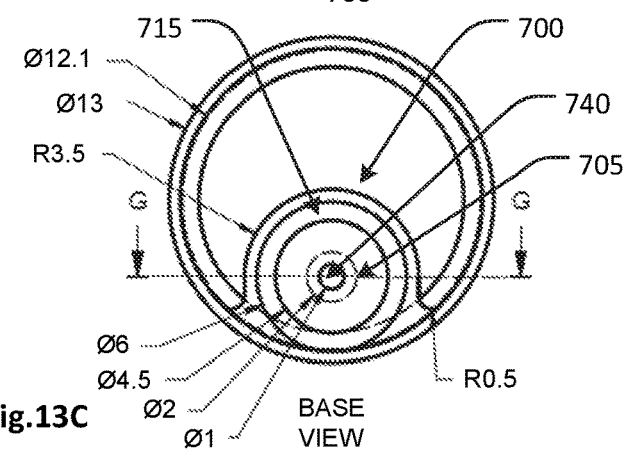
FIG. 13C is an end view of the connector of FIG. 13A.
Figure 13D:
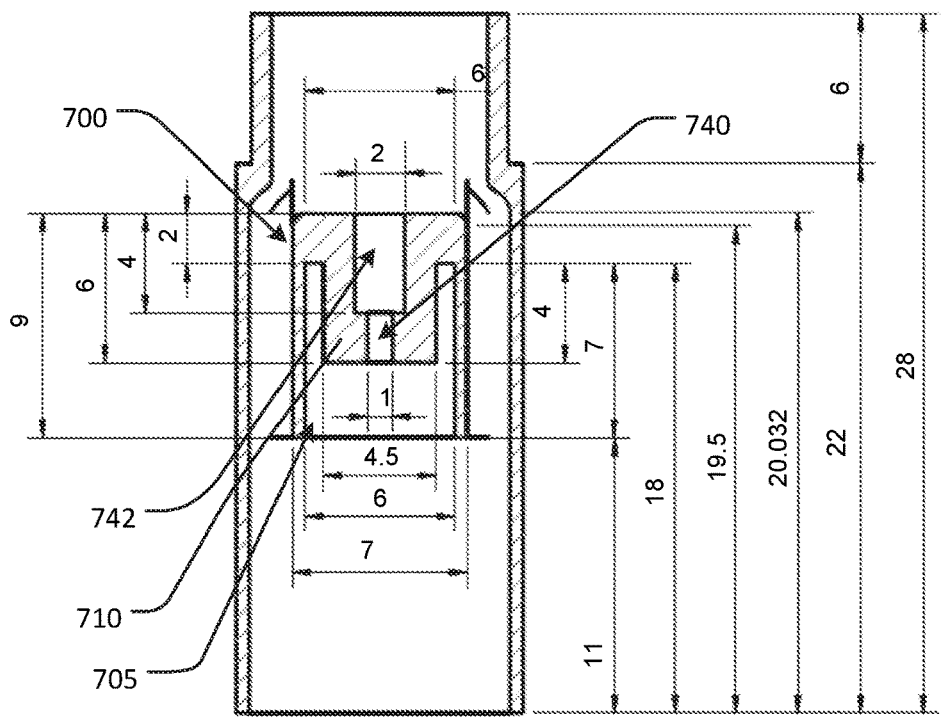
FIG. 13D is a cross-section of the connector of FIG. 13A as indicated by line G-G in FIG. 13C.

In some embodiments, the connector 0007 may comprise a motion sensor or accelerometer 760 (as shown in FIG. 13F) configured to detect movement of the connector. For example, the accelerometer 760 may comprise a single axis accelerometer arrange to detect momentum changes along a longitudinal axis of the endoscope 110 during operation of the propulsion system. The endoscope 110 may comprise a motion sensor signal cable 460 (see FIGS. 4C to 4F) to carry measurement signals from the motion sensor 760 to a monitoring station, such as the computer device 330 of the propulsion console 300, as described above in relation to FIGS. 3A to 3D.

Referring now to FIGS. 8 to 11, the Y junction 140 is shown in detail, according to some embodiments, the assembly of which is described in the assembly instructions set out below.

The Y junction 140 comprises a Y junction body 1008 defining three branches: an insertion tube branch 142, a control tube branch 144 and a propulsion tube branch 146. The insertion tube branch 142 is configured to connect to and provide a proximal terminus for the insertion tube 1071. The control tube branch 144 is configured to connect to and provide a distal terminus for the control tube 155, which connects the control body 150 to the Y junction 140. All of the cables and conduits of the insertion tube 1071 other than the propulsion tube 220 and propulsion tube conduit 1025 (including instrument channel 420, vacuum line 1027, angulation cables 440 and channels 444, air and water conduits 414, 416, 418, light guides or cables 431, camera cable 433) pass through the control tube branch 144 and insertion tube branch 142 of the Y junction 140 from the control tube 155 to the insertion tube 1071.

The propulsion tube branch 146 is configured to receive a propulsion tube port assembly 148 defining a propulsion tube port 149 configured to receive the propulsion tube 220. The propulsion tube port 149 may also be configured to receive the step down collar 3007 of the propulsion tube 220, and the propulsion tube port assembly 148 may comprise a locking mechanism or latch 1013 to resist removal of the propulsion tube 220 from the Y junction 140.

The propulsion tube port 149 allows passage of the distal portion 224 of the propulsion tube 220 through the propulsion tube branch 146 and insertion tube branch 142 of the Y junction 140 to be received by and accommodated within the propulsion tube conduit 1025 of the insertion tube 1071. Insertion of the distal portion 224 of the propulsion tube 220 into the propulsion tube conduit 1025 may be facilitated by applying vacuum pressure to the propulsion tube conduit 1025 via the vacuum line 1027 connected to the distal connector 0007, 1035, 1048 that is in fluid communication with the propulsion tube conduit 1025.

The propulsion tube 220 may be connected to the propulsion console 300, and the propulsion system 200 may be operated to facilitate insertion of the propulsion tube 220 into the propulsion tube conduit 1025. This may include alternating the channel pressure in the propulsion tube 220 to successively induce cavitation and dissolution of gas in the fluid to progress the propulsion tube 220 along the propulsion tube conduit 1025. Alternatively, the propulsion system 200 may be operated to increase the channel pressure of the propulsion tube 220 to stiffen the propulsion tube 220, allowing the propulsion tube 220 to be pushed into the propulsion tube conduit 1025 manually by a user.

A lubricant may be applied to the distal portion 224 of the propulsion tube 220 prior to insertion into the propulsion tube conduit 1025. The lubricant may comprise a water-based lubricant, such as methylcellulose based lubricant, or other fast drying lubricant, for example. Air drawn through the vacuum line 1027 may dry out the lubricant so that it becomes sticky or tacky, thereby helping to hold the distal portion 224 of the propulsion tube 220 in the propulsion tube conduit 1025. The dried lubricant may act as an adhesive layer between the external surface of the distal portion 224 of the propulsion tube 220 and the internal surface of the propulsion tube conduit 1025. This may assist in forming a friction bond between the propulsion tube 220 and the propulsion tube conduit 1025.

When a water-based lubricant is used and dried to hold the distal portion 224 of the propulsion tube 220 within the propulsion tube conduit 1025, removal of the propulsion tube 220 may be facilitated by flushing the propulsion tube conduit 1025 with water via the vacuum line 1027 to dissolve the lubricant.

Figure 8A:
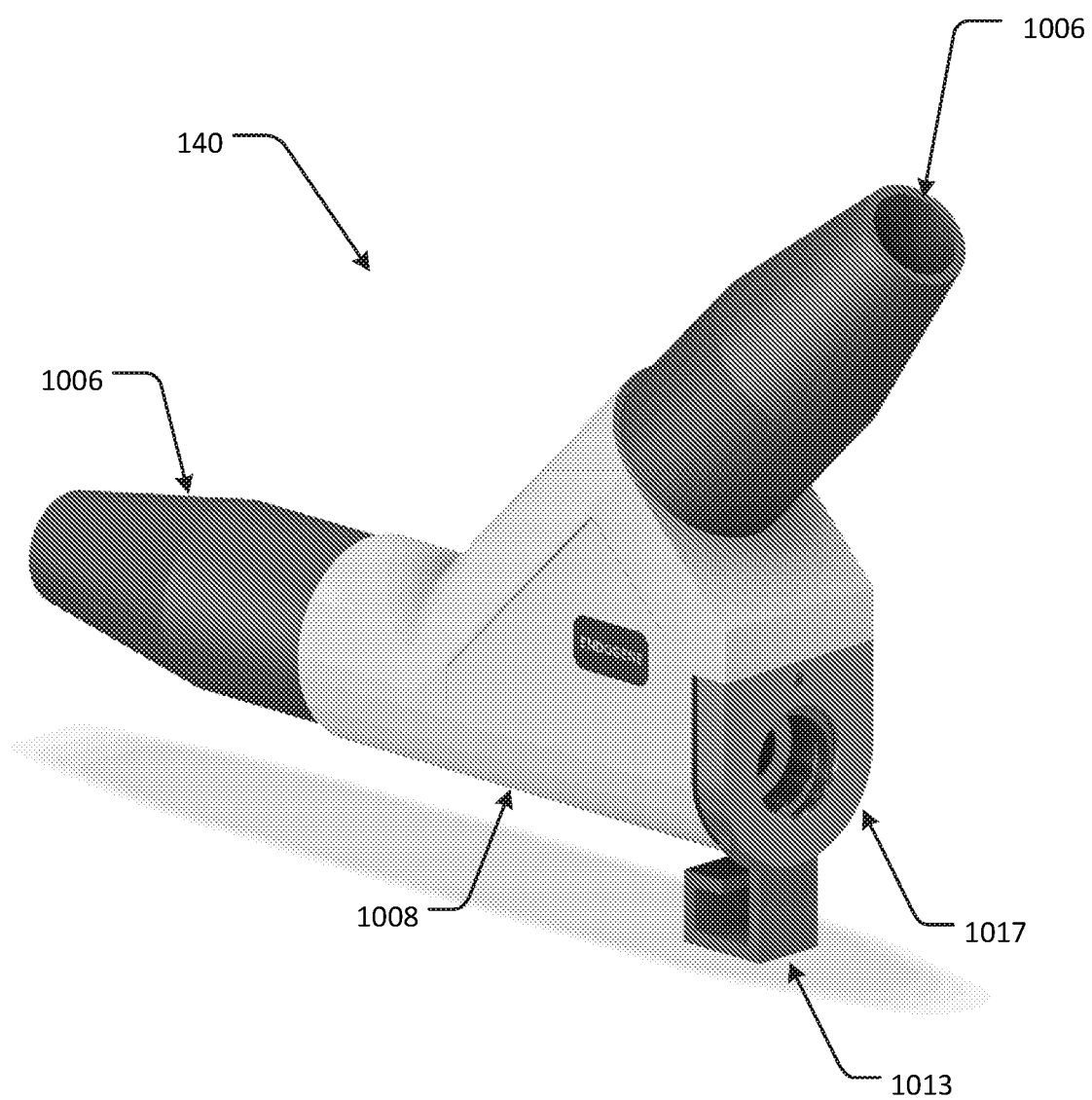
FIG. 8A is a perspective view of a Y junction according to some embodiments.
Figure 8B:
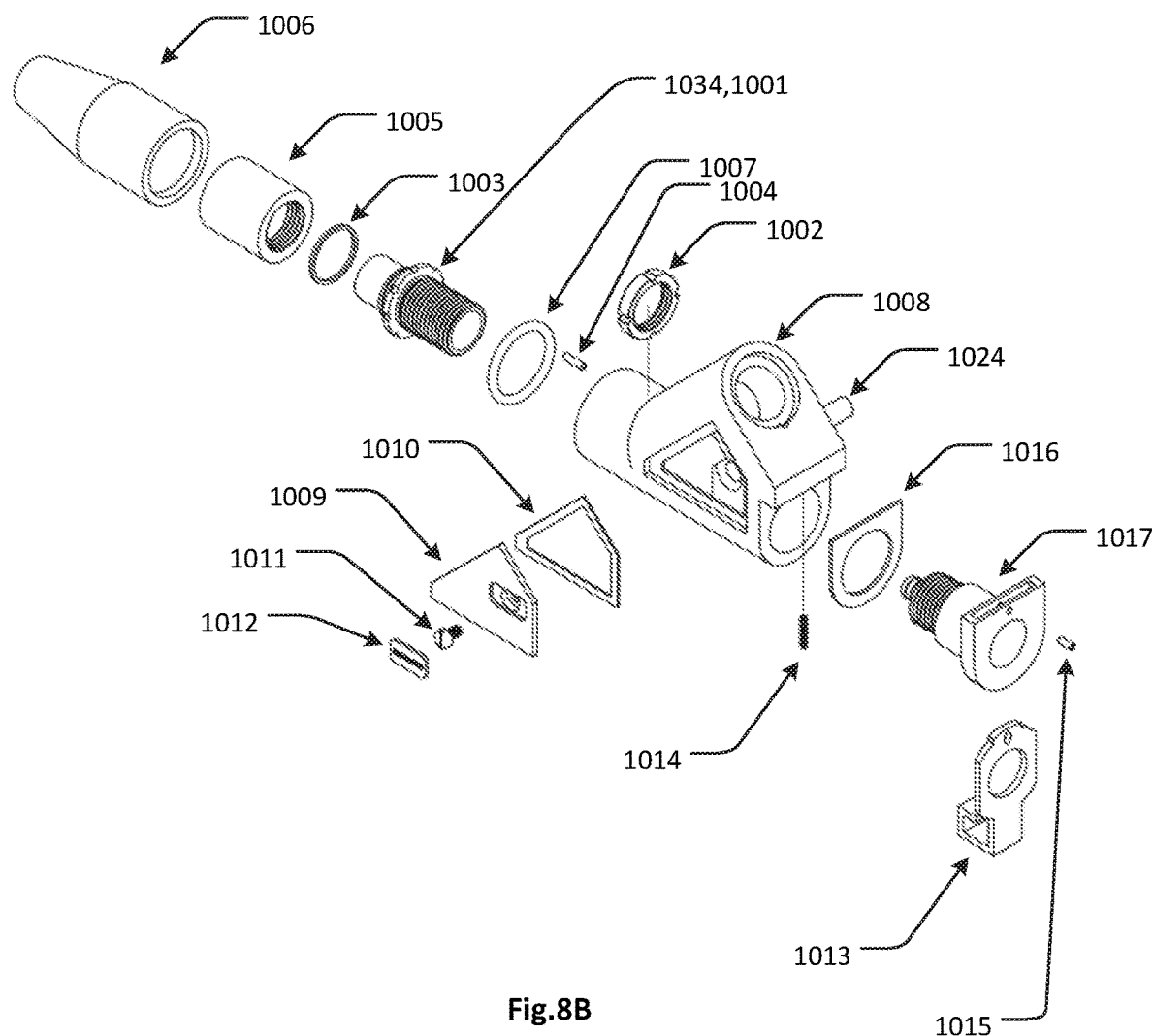
FIG. 8B is an exploded perspective view illustrating the components of the Y junction of FIG. 8A.

Referring to FIG. 8B, the Y junction 140 is shown in an exploded diagram in a disassembled state. The various components of the Y junction 140 are set out in the parts lists below and shown in further detail in FIGS. 9 to 11, according to some embodiments.

Figure 9A:
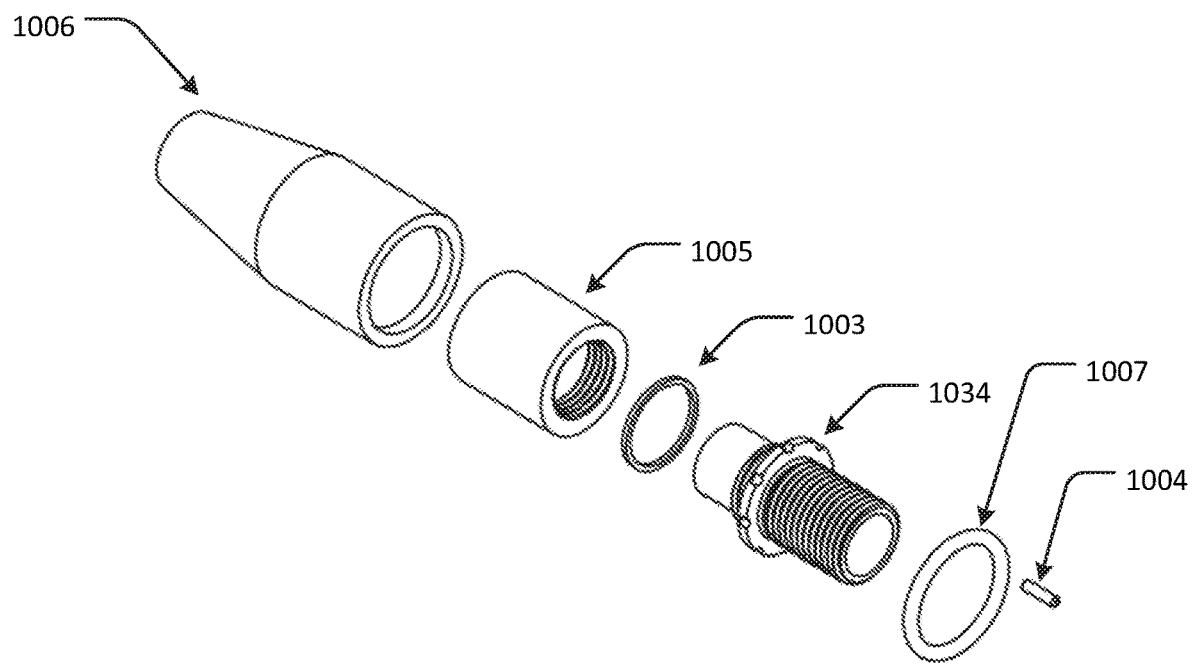
FIG. 9A shows a connector subset of the components of the Y junction of FIG. 8A.
Figure 9B:
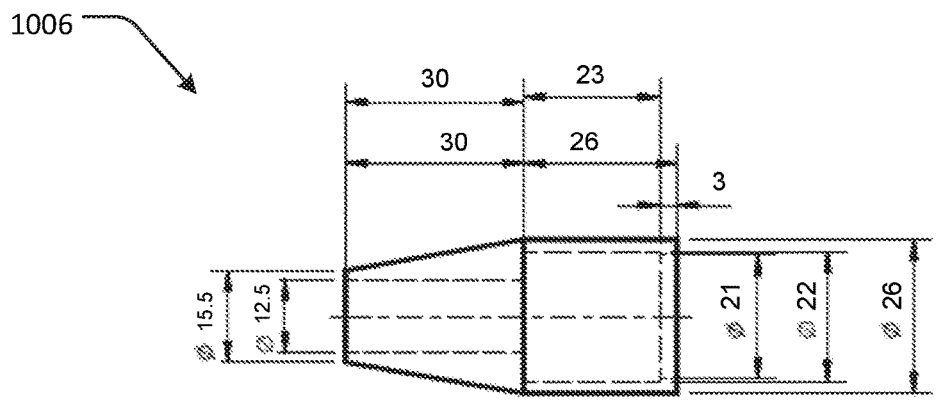
FIG. 9B is a side view of a strain boot of the Y junction of FIG. 8A.
Figure 9C:
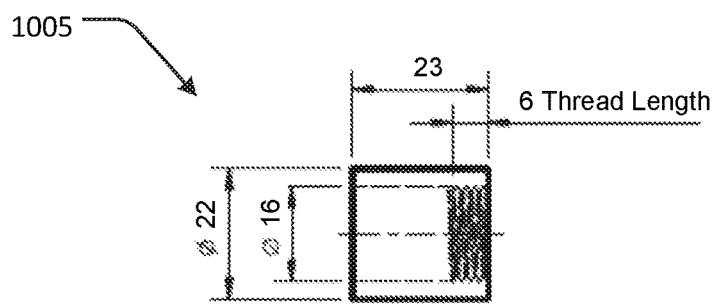
FIG. 9C is a side view of a strain boot Collar of the Y junction of FIG. 8A.
Figure 9D:
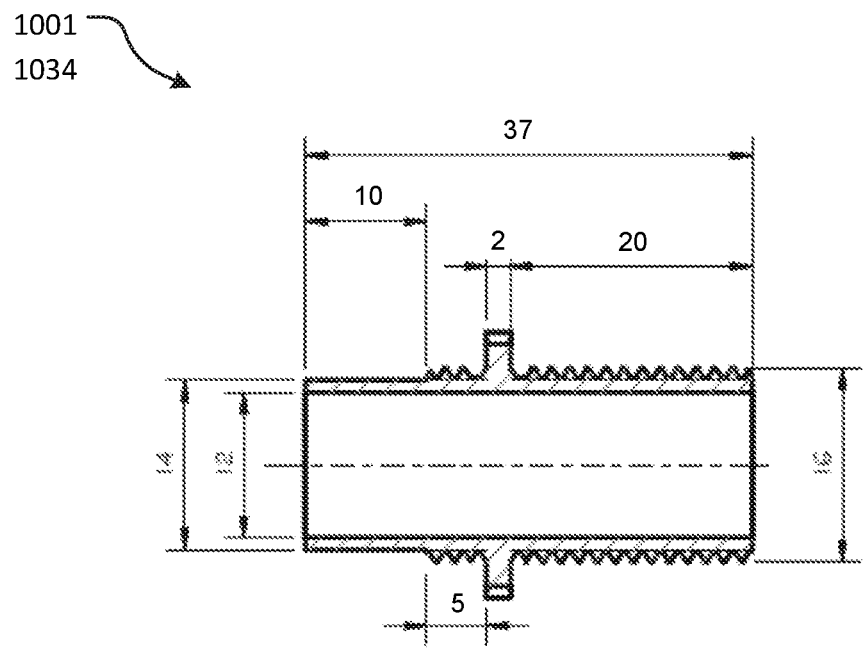
FIG. 9D is a side view of a threaded socket of the Y junction of FIG. 8A.
Figure 9E:
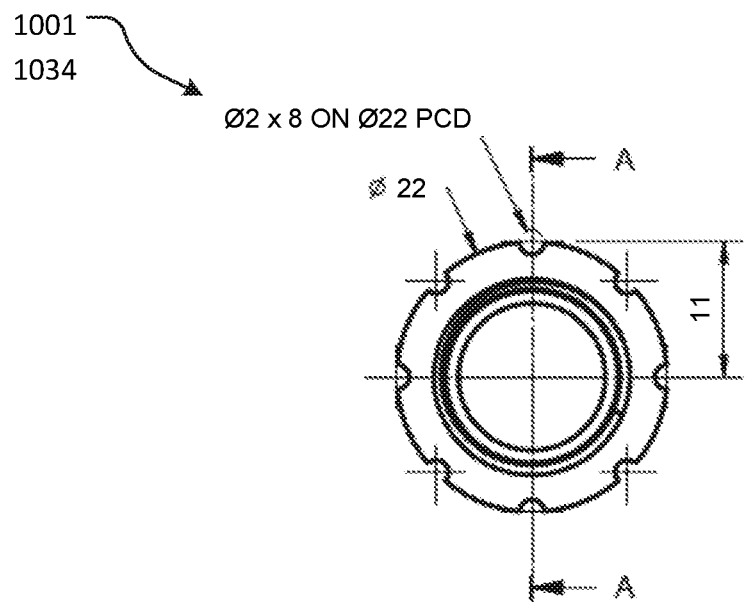
FIG. 9E is an end view of the threaded socket of FIG. 9D.
Figure 9F:
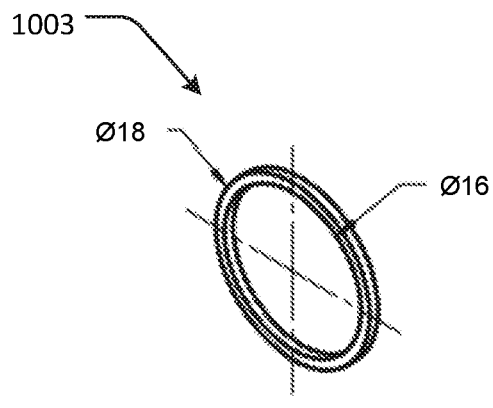
FIG. 9F is a perspective view of a washer of the Y junction of FIG. 8A.
Figure 9G:
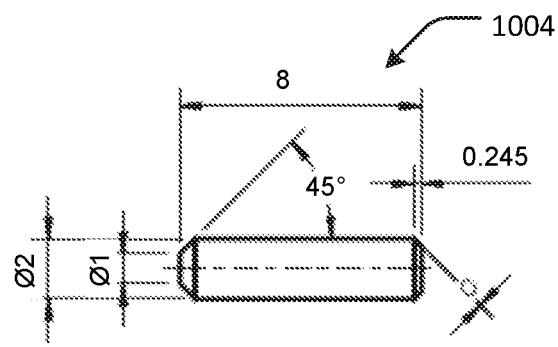
FIG. 9G is a side view of a locking bar of the Y junction of FIG. 8A.
Figure 9H:
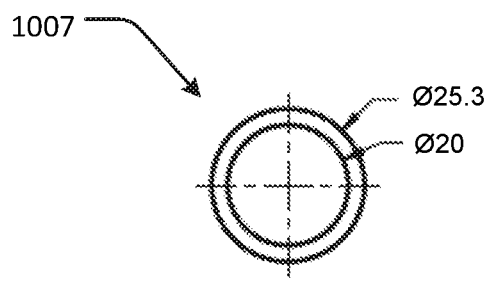
FIG. 9H is a plan view of an O-ring of the Y junction of FIG. 8A.
Figure 9J:
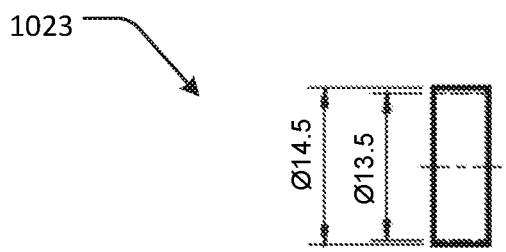
FIG. 9J is assigned to you of the nitinol locking band which may be used in conjunction with the Y junction of FIG. 8A in some embodiments.

FIG. 9A shows a strain boot assembly 1000 of the Y junction 140, including a Threaded Connector Barb or Socket 1001, 1034, Locking Ring 1002, Locking Ring Seal 1003, Anti-rotation Stud 1004, Strain Boot Collar 1005, Strain Boot Rubber 1006, and Strain Boot O-ring 1007. One strain boot assembly 1000 is configured to connect the insertion tube 1071 to the insertion tube branch 142 of the Y junction body 1008 and a second similar strain boot collar assembly 1000 is configured to connect the control tube 155 to the control tube branch 144 of the Y junction body 1008. Another strain boot assembly 1000 may be configured to connect the control tube 155 to the control body 150.

The strain boot assemblies 1000 may be assembled to connect the insertion tube 1071 and control tube 155 to the Y junction body 1008 as described below in the assembly instructions. In some embodiments, the insertion tube 1071 may be glued into a lumen of the threaded socket 1034, 1001. In some embodiments, the insertion tube 1071 may fit over part of the threaded socket 1001, 1034 and may be locked in place with a nitinol locking ring 1023, for example, as described in the assembly instructions.

Figure 10A:
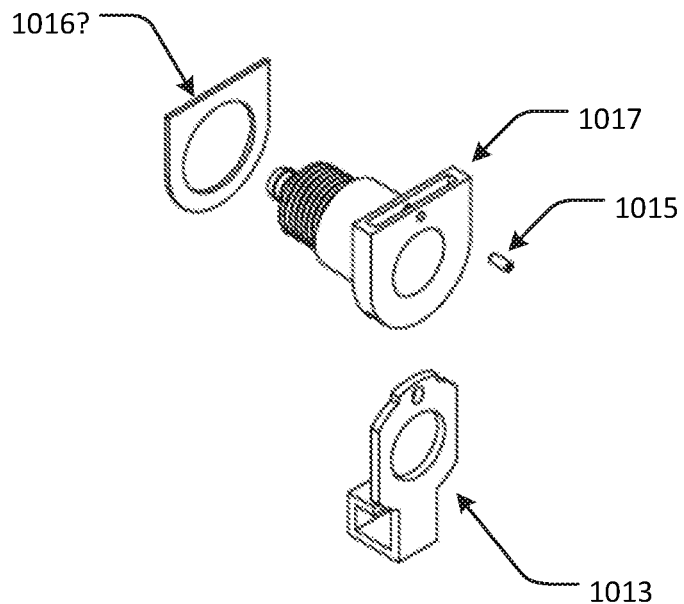
FIG. 10A shows a blade latch subset of the components of the Y junction of FIG. 8A.
Figure 10B:
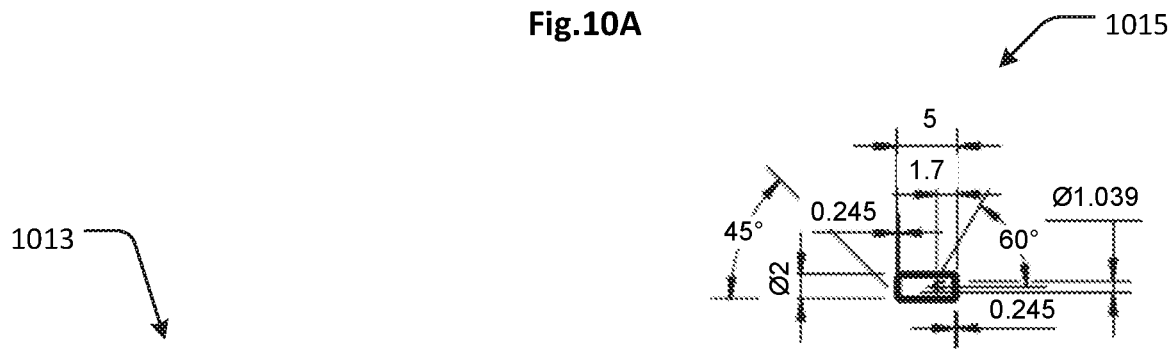
FIG. 10B in the side view of the blade latch locking screw of the Y junction of FIG. 8A.
Figure 10C:
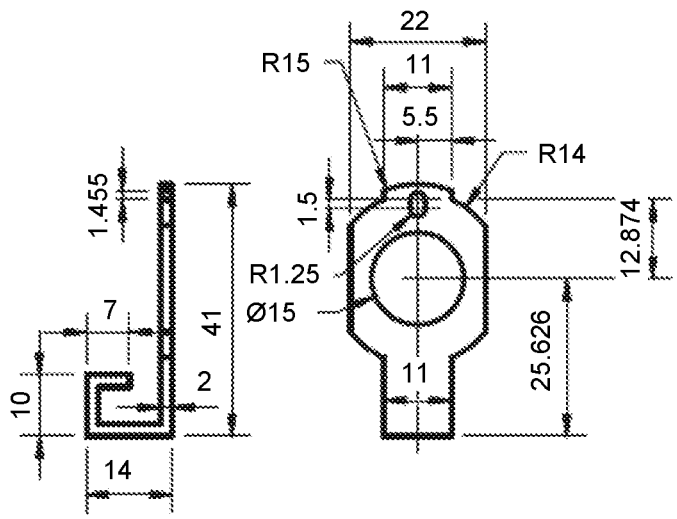
FIG. 10C shows a front and side view of a blade latch of the Y junction of FIG. 8A.

FIG. 10A shows the propulsion tube port assembly 148 in a disassembled configuration, according to some embodiments. Propulsion tube port assembly 148 includes: a propulsion tube barb 1017; connector seal or gasket 1016 configured to seal the barb 1017 against the Y junction body 1008; blade latch 1013; blade latch spring 1014; and blade latch screw 1013.

The propulsion tube barb 1017 defines a recess configured to slidably receive the blade latch 1013, such that respective apertures of the blade latch 1013 and barb 1017 can be aligned to define the propulsion tube port 149 and allow passage of the distal portion 224 and step down collar 3007 of the propulsion tube 220.

The blade latch spring 1014 is configured to be received in a recess in the Y junction body 1008 as shown in FIG. 111A (recess not visible), and to abut the blade latch 1013 when assembled. This arrangement biases the blade latch 1013 to a position in which the respective apertures of the blade latch 1013 and propulsion tube barb 1017 are laterally offset so as to restrict passage of the step down collar 3007 of the propulsion tube 220.

The blade latch 1013 also defines an elongate slot (or slotted hole) configured to receive the blade latch screw 1015. This arrangement retains the blade latch 1013 in the recess of the propulsion tube barb 1017 while allowing movement between the aligned (open) and offset (locked) positions of the respective apertures of the blade latch 1013 and propulsion tube barb 1017.

The propulsion tube barb 1017 defines a stepped recess 1018 configured to receive the step down collar 3007. In some embodiments, the recess 1018 may allow some extra space in an axial direction such that, during operation of the propulsion system 300, the momentum is transferred from the distal portion 224 of the propulsion tube 220 to the propulsion tube conduit 1025 rather than from the step down collar 3007 to the propulsion tube barb 1017 and Y junction 140.

Figure 11D:
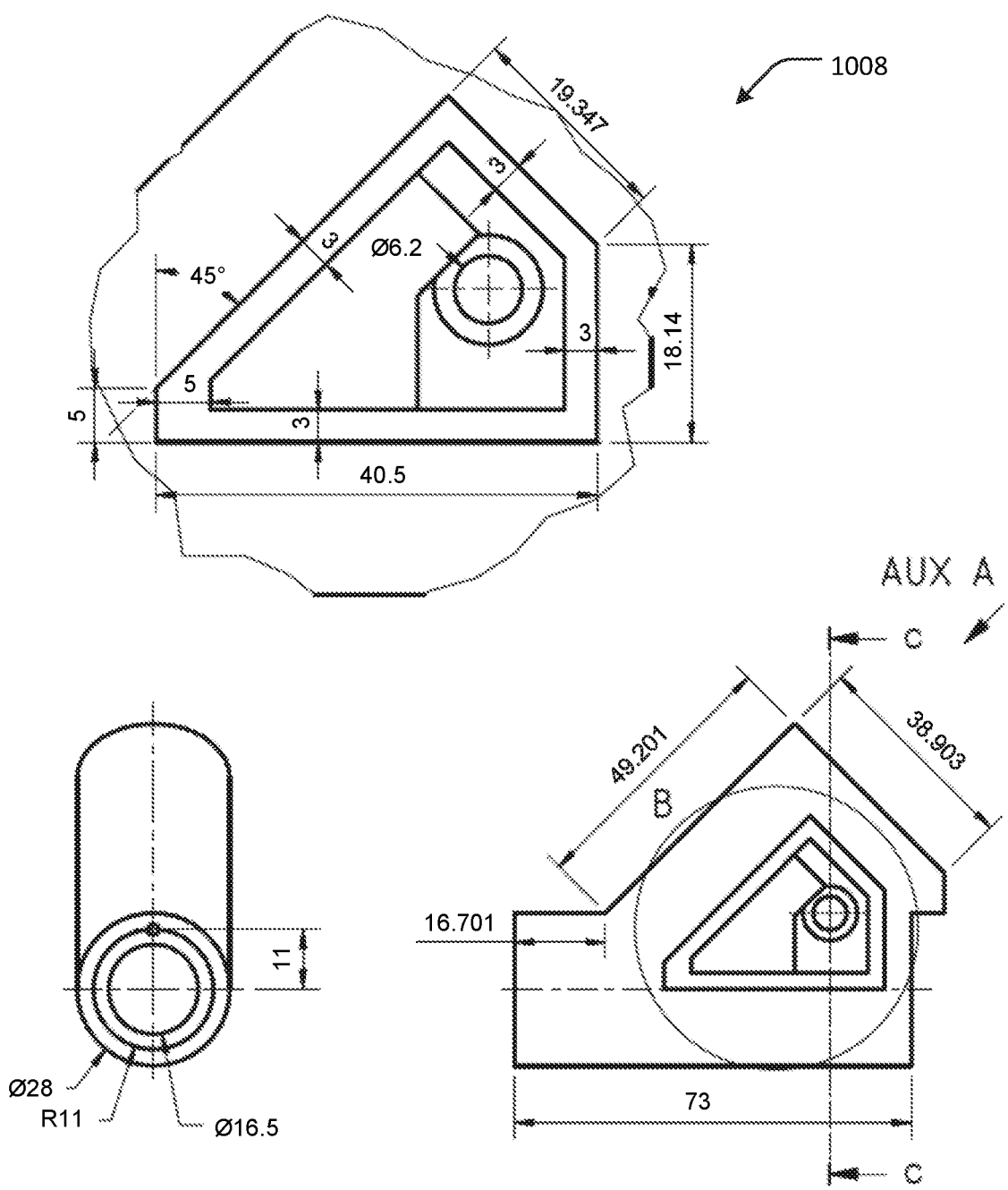
FIG. 11D shows side, end and close-up views of a junction body of the Y junction of FIG. 8A.
Figure 11E:
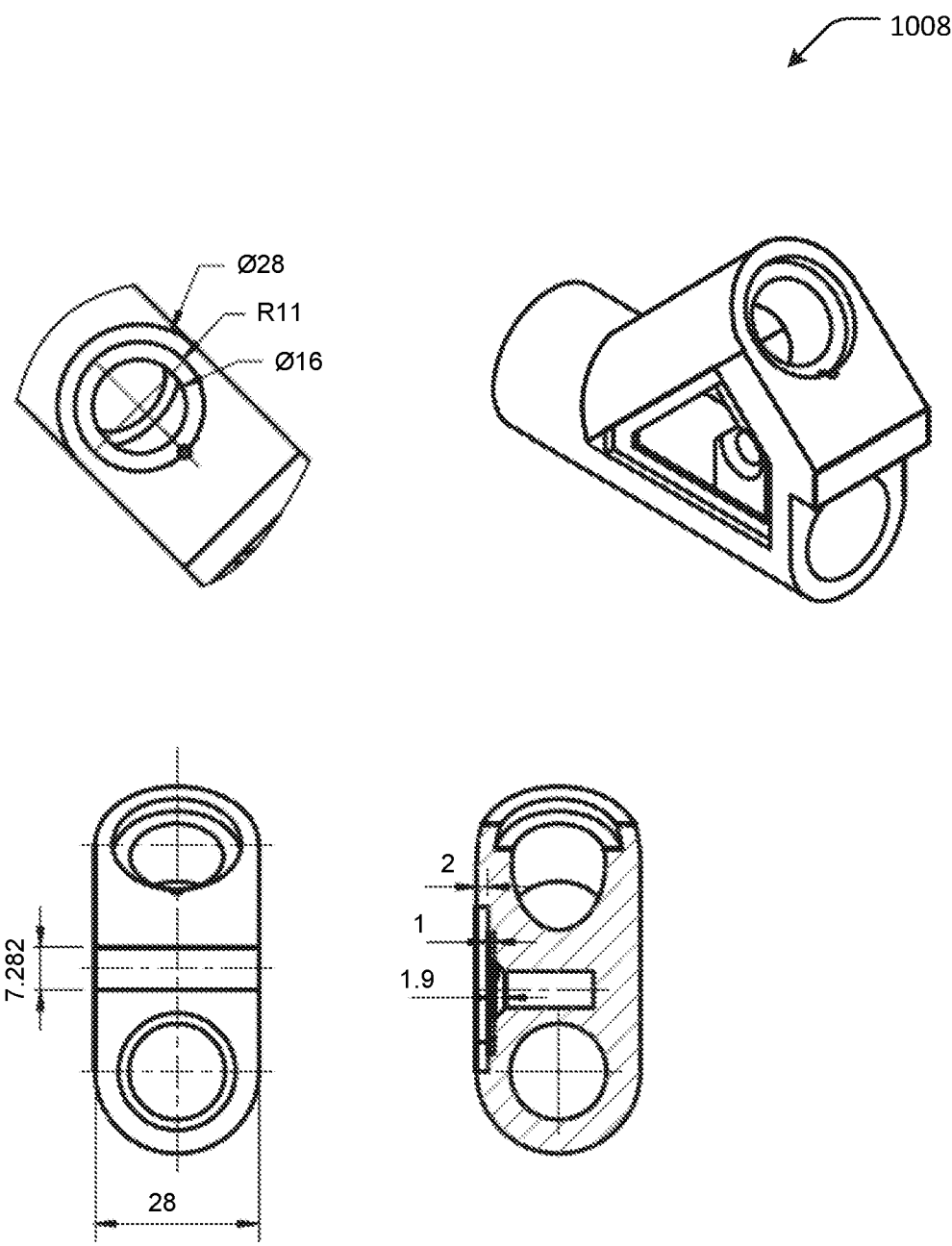
FIG. 11E shows perspective and cutaway views of the junction body of FIG. 11D.

Referring to FIG. 11A, the Y junction body 1008 and hatch assembly is shown, according to some embodiments, including hatch cover 1009, hatch seal or gasket 1010, hatch screw 1011, hatch screw bush 1024, and screw cover plate 1012. The hatch cover 1009 is configured to cover a hatch 1009a in the Y junction body 1008, which allows access for connecting the strain boot assemblies 1000 to the body 1008. The bush 1024 may be glued into a bush recess 1024a in the body 1008 and provide a threaded recess configured to threadedly receive the hatch screw 1011. The bush 1024 may be formed of a metal such as steel, for example.

The endoscope 110 may be assembled in accordance with the following assembly instructions with reference to the following parts list, which refers to novel components included in the drawings as well as conventional endoscope parts which are obtainable from the manufacturers indicated in the parts list.

One embodiment of the endoscope 110 is based on a typical conventional panendoscope, such as the Olympus 160/180 Series, Pentax 70K Series, and Fujifilm Medical Systems 530/600 Series, for example, with the addition of the components required for installation of the propulsion system of the present application. However, it will be appreciated that other instruments such as specialised endoscopic and non-endoscopic instruments may be manufactured to be configured for use with the propulsion system of the present application.

It should also be appreciated that the dimensions shown in the drawings and referred to in the description are for example only and dimensions of the components, conduits and cables may vary depending on application.

| Part Number | Description | Material | Qty Required | Manufacturer |
|---|---|---|---|---|
| | Parascope Parts | | | |
| 1002 | Locking Ring | 316 SS | 3 | Per drawings |
| 1003 | Locking Ring Seal | Nitrile | 4 | Per drawings |
| 1004 | Anti-rotation Stud | 316 SS | 2 | Per drawings |
| 1005 | Strain Boot Collar | 316 SS | 2 | Per drawings |
| 1006 | Strain Boot Rubber | Silicone | 2 | Per drawings |
| 1007 | Strain Boot O-ring | Nitrile | 4 | Per drawings |
| 1008 | Y-Connector Body | ABS | 1 | Per drawings |

-continued

| Part Number | Description | Material | Qty Required | Manufacturer |
|---|---|---|---|---|
| 1009 | Y-Connector Hatch Cover | ABS | 1 | Per drawings |
| 1010 | Y-Connector Hatch Seal | Silicone | 2 | Per drawings |
| 1011 | Y-connector Hatch Screw | 316 SS | 2 | Per drawings |
| 1012 | Screw Cover Plate | 316 SS | 1 | Per drawings |
| 1013 | Blade Latch | 316 SS | 1 | Per drawings |
| 1014 | Blade Latch Spring | SS | 2 | Per drawings |
| 1015 | Blade Latch Screw | 316 SS | 2 | Per drawings |
| 1016 | (PTBC) Connector seal | Silicone | 2 | Per drawings |
| 1024 | Hatch Screw-Threaded Bush | 316 SS | 1 | Per drawings |
| 1025 | Propulsion Tube Conduit 6 mm OD 5 mm ID 3M | PTFE | 1 | Per drawings |
| 1027 | Vacuum Tube 2 mm OD × 1 mm × 4.5M | PTFE | 1 | Geko Optical |
| 1028 | Vacuum Tube Connector Sleeve 3 mm OD 2 mm ID | PE | 4 | Geko Optical |
| 1029 | Luer connector for Vacuum Line | 316 SS | 1 | Cadence |
| 1031 | Loctite 15 s Time Control 3 g | Cyanoacrylate | 1 | Loctite |
| 1033 | Miniature Cable Tie | Polyamide | 2 | NTE |
| 1001 | Threaded Barbed Connector | 316 SS | 2 | Per drawings |
| 1023 | Insertion Tube Locking Band | Nitinol | 2 | Per drawings |
| 0007 | Coil Pipe/PTC Distal Collar | 630 SS | 1 | Per drawings |
| 0008 | Vacuum Manifold Set Screw | 630 SS | 1 | Per drawings |
| 1044 | Loctite 480 Adhesive- Black 30 ml | Cyanoacrylate | 1 | Loctite |
| 1045 | Loctite (All Plastic) Activator 3 g | Heptane/Ester | 1 | Loctite |
| 1046 | Loctite Glue Remover 3 g | Acetic Acid | 1 | Loctite |
| 1047 | Loctite 770 Activator 10 g | Heptane/Ester | 1 | Loctite |
| Endoscope Parts | | | | |
| 1043 | Universal Tube- SS 12.9 mm | Composite | 2 | Yanshun |
| 1071 | INSERTION TUBE 3.0M × 12.9 mm Polymer | Composite | 1 | Per drawings |
| 1094 | Polymer Universal Control Tube 300 mm × 12 mm | | 1 | Per drawings |
| 1050 | Leak Test Device | | 2 | Yanshun |
| 1051 | Biopsy Port Cap | | 10 | Yanshun |
| 1052 | Water/Air Valve | | 2 | Yanshun |
| 1053 | Suction Valve | | 2 | Yanshun |
| 1054 | Bending section & CablesAssembly | | 1 | Yanshun |
| 1055 | Bending section mesh | | 2 | Yanshun |
| 1056 | Bending section Rubber | | 2 | Yanshun |
| 1057 | Flushing Tube Set | | 1 | Yanshun |
| 1058 | Video Connector Cap | | 1 | Yanshun |
| 1059 | Control Body Assembled | | 1 | Yanshun |
| 1072 | LG Connector Assembled | | 1 | Yanshun |
| 1073 | HD CMOS Camera Module with Cable | | 1 | Mitsumi |
| 1074 | Fix Ring (1) | | 1 | Yanshun |
| 1075 | Inlet Adapter for Biopsy Channel | | 1 | Yanshun |
| 1076 | Rubber Cap for Forceps Inlet | | 1 | Yanshun |
| 1077 | Fix Ring (2) | | 1 | Yanshun |
| 1078 | Locking Pin(1) | | 1 | Yanshun |
| 1079 | One-way Valve | | 1 | Yanshun |
| 1080 | Guide Fence | | 1 | Yanshun |
| 1081 | Spacer | | 1 | Yanshun |
| 1082 | Block (right) | | 1 | Yanshun |
| 1083 | Setting Stopper | | 1 | Yanshun |
| 1084 | Wire Guide Sleeve | | 1 | Yanshun |
| 1085 | Locking Pin(2) | | 1 | Yanshun |
| 1086 | Block (left) | | 1 | Yanshun |
| 1087 | Weld Sleeve | | 1 | Yanshun |
| 1088 | Setting Block | | 1 | Yanshun |
| 1089 | Bolt | | 1 | Yanshun |
| 1090 | Fitting to LG Connector | | 1 | Yanshun |
| 1091 | Connector between LG Tube and Control Body | | 1 | Yanshun |
| 1092 | Fix Ring (3) | | 1 | Yanshun |
| 1093 | Conical Sleeve with Connector | | 1 | Yanshun |
| Video Processor Parts | | | | |
| 1060 | HD Video Processor | | 1 | Per drawings |
| 1093 | Light Source- Air Pump | | | Per drawings |
| 1061 | DVI Connector Cable | | 1 | NTE |
| 1062 | IECMains Power Cable 3 PIN | | 1 | NTE |
| 1063 | Wash Bottle | | 1 | Yanshun |
| 1064 | Wash Bottle Connector Tube | | 1 | Yanshun |

| Part Number | Description | Material | Qty Required | Manufacturer |
|---|---|---|---|---|
| 1065 | Endoscope Instruction manual | | 1 | Per drawings |
| 1066 | LS/Video Processor Instruction Manual | | 1 | Per drawings |
| | FKP Interface Parts | | | |
| 1049 | Vacuum Connector Tube Luer M-F | PU/SS | 5 | Cadence |
| 1070 | RS-232 DB9 Interface Cable - 1M | | | NTE |
| | Maintenance Accessories | | | |
| 1067 | Biopsy Port Cleaning Brush | | 10 | Boke |
| 1068 | Propulsion Tube Conduit Cleaning Brush | | 10 | Boke |
| 1069 | Flush adapter for PT Conduit/Vacuum Line | | 2 | Per drawings |

The endoscope 110 can be constructed with a combination of generic endoscope parts sourced from third party OEM vendors and proprietary parts as shown in the drawings, including a highly flexible Polymer Insertion Tube. The endoscope 110 of this embodiment is a 3M×12.9 mm panendoscope incorporating the Propulsion System 200. It will be understood that any parts that are mentioned in the parts list but are not mentioned elsewhere in the specification are common endoscope parts known to those in the field, and comprise components of various sub-assemblies of conventional endoscopes.

In general terms, the assembly of endoscope 110 can consist of inserting a unique Y-Connector 140 into the Insertion Tube 1071 approximately 30 cm below the Control Body 150. The Y-Connector 140 allows for the insertion of the Propulsion Tube 220 from the propulsion console 300, which may be referred to as a FKP Propulsion Console. Two additional conduits are installed in the Insertion Tube. (i) Propulsion Tube Conduit 1025 (ii) Vacuum Line 1027. At the distal end, these conduits terminate at a custom Distal Coil Pipe Collar 0007 into which they insert. At the proximal end the Propulsion Tube Conduit terminates at the Y-Connector 140 and the Vacuum Line terminates at the Light Source/Camera Connector 160. An additional Small Suction Port is installed into the Light Source/Camera Connector Housing to receive and provide suction to the vacuum line 1027.

The following assembly instructions may be followed to produce the endoscope 110 shown in FIG. 1C, according to some embodiments, after dismantling a conventional 3M×12.9 mm panendoscope.

Figure 7E:
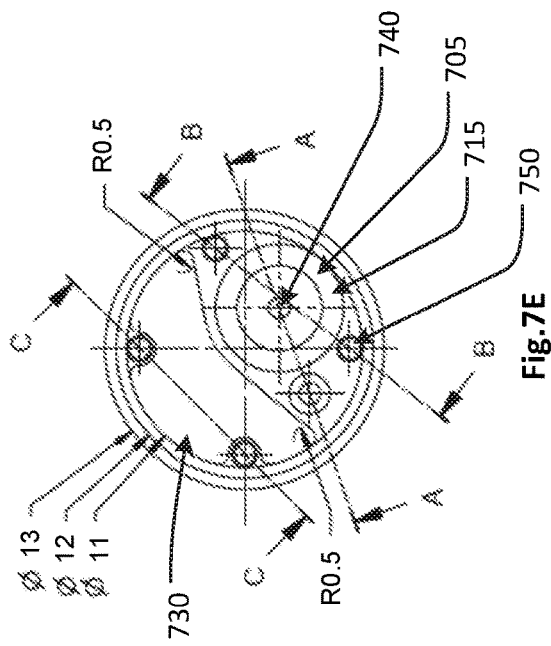
FIG. 7E is an end view of the connector of FIG. 7A indicating a number of cross-section lines.
Figure 7G:
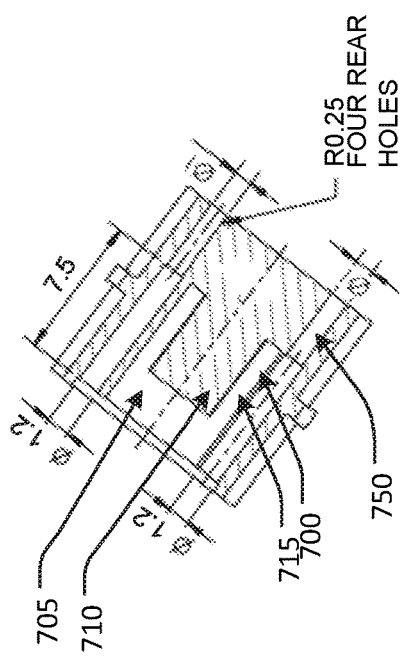
FIG. 7G is a cross-section of the connector of FIG. 7A as indicated by line B-B in FIG. 7E.

(1) Attach the angulation Coil Pipes 444 to the new Custom Distal Coil Pipe Collar (0007) using Silver Solder.
(2) Check cable passage at the distal end
(3) Prepare the Propulsion Tube Conduit Assembly: Cut 3100 mm of the Propulsion Tube Conduit Material.
(4) The (12) twelve Friction Ribs (1030) are to be installed at intervals of 200 mm with the first Rib installed 200 mm from the distal end of the Conduit. Prepare the Ribs by abrading the inside of the hole in each Rib with 100 Grit Abrasive Paper or a Cylindrical Diamond Rasp.
(5) Clean the inside of the hole with 20% Acetic Acid Solution.
(6) Slide the Ribs into place 5 mm distal to their intended final location.
(7) Lay out the Conduit in a straight line and tape to the bench with masking tape at intervals rotating the Ribs as required so that they are all in the same orientation.
(8) Prepare each location by abrading the surface of the Conduit with 100 Grit Abrasive Paper in a 5 mm wide circular band and clean the area with 20% Acetic Acid Solution.
(9) Apply Loctite 770 Activator (1047) to the abraded area and allow for the specified penetration time.
(10) Apply Loctite 15 s Time Control Cyanoacrylate Adhesive to the abraded area and slide the Rib onto the abraded area and remove excess adhesive with Loctite Adhesive remover (1046)
(11) Allow 30 sec. fixation time before moving to the next Rib.
(12) Attachment of the Propulsion Tube Conduit to the Distal Coil Pipe Collar: Roughen the external distal 10 mm of the tube with 100 grit Abrasive Paper and clean with acetone. (NB: Limit the acetone contact to only the abraded area.)
(13) Apply Permabond TA4610 adhesive to the distal 5 mm of the tube and insert in the Distal Coil Pipe Collar at point No. 10 as indicated at FIG. 1 No. 10. (NB: Ensure no adhesive obstructs the central hole in the base of the receptacle)
(14) Cut 440 mm of Vacuum Tube material (1027). Roughen the external distal 10 mm of the tube with 100 grit Abrasive Paper and clean with acetone. Apply Permabond TA4610 adhesive to the distal 5 mm of the tube and insert in the Distal Coil Pipe Collar into vacuum line socket 742 as indicated in FIGS. 7A, 7E and 7F. (NB: To ensure no adhesive obstructs the central hole in the base of the receptacle place a piece of 0.7-0.9 monofilament, braid or cable through the base hole and out the side of the Distal Coil Pipe Collar. (NB: The hole in the side (lateral vacuum passage 744) is continuous with the holes at the base of the vacuum line socket 742 and striking block aperture 740 as shown in FIG. 7F. After the conduits are attached, the material may be removed via the side hole before the adhesive sets.)
(15) Allow the adhesive to cure for at least 60 minutes (preferably overnight) before continuing with the build.
(16) Insert the Vacuum Manifold Set Screw (0008) into the side hole 744 of the Distal Coil Pipe Collar and seal with Loctite Thread Seal.
(17) Insert the Angulation Cables 440 into the distal Coil Pipes 444, 750 from the distal end.
(18) Insert the remaining cables conduits and pipes through the large lumen 730 in the Distal Coil Pipe Collar.

(19) Insert the Collar 0007 into the Bending Section 120 and fix the Bending Section to the Collar with the four (4) fixation screws in the bending section.
(20) Assemble the components of the Y-Connector 140 as per the exploded view drawing (FIG. 8B), without the Strain Relief Boots attached.
(21) Layout the Polymer Insertion Tube (1071), Polymer Universal Tube (1094), Bending Section 120, Propulsion Tube Collar 0007 with Coil Pipes 444 and angulation cables 440.
(22) Slide the Strain Relief Boots and Strain Boot Seals (1007) over the proximal Insertion Tube 1071 and the distal and proximal ends of the of the Polymer Universal control Tube 155, so that they can be slide into position when required.
(23) Remove the distal Threaded Barb 1001 from the Y-Connector Body 1008.
(24) Take one of the Nitinol Locking Bands 1023 and place over the Threaded Barb.
(25) Commence insertion of the Threaded Barb 1001 in to the Insertion Tube 1071 by heating the proximal end of the insertion tube 1071 allowing it to be stretched over the barb 1001. When the insertion tube is close to the Locking Band, lift the Locking band onto the insertion tube and continue pushing the insertion tube to within 3 mm of the flange.
(26) Place a bead of Silicon Sealing compound between the Insertion Tube and the flange. Continue insertion until the Insertion Tube is against the flange of the barb 1001; the Locking Ring should be about 3 mm from the flange.
(27) Heat the Nitinol Locking Ring with a temperature-controlled soldering iron set to 170 degrees C. Heat for 10 seconds. The Nitinol will contract with heating and lock it into position (The Nitinol locking ring is pre stretched, when heated it returns to its shape memory form which has a smaller diameter). The outer Viton™ layer of the Insertion tube is heat resistant and will not melt. (NB: Do not heat for longer than specified as the inner layers of the Insertion Tube will be affected.)
(28) Repeat this process with the Proximal Threaded Barb 1001 of control tube branch 144 of the Y-Connector 140 and the distal end of Polymer Universal control Tube 155.
(29) Repeat this process with the distal Threaded Barb of the Control Body 150 and the proximal end of the Polymer Universal Control Tube 155.
(30) Assemble both the Insertion Tube and the Polymer Universal Control Tube 155 to the Y-Connector Body 1008 by placing the Locking Ring (1002) on the inside of the Y-Connector Body and screwing the threaded end of the Threaded Barb (1001) into it from the distal end of the Y-Connector Body. (NB: A small screwdriver blade may be inserted through the side hatch 1009a of the Y-Connector Body to prevent the Locking Ring from rotating as the Threaded Barb 1001 is tightened.)
(31) Tighten the Threaded Barb so that one of the notches in the flange aligns with the hole at the 12:00 O'clock position on the face of the Y-Connector body.
(32) Insert the Anti Rotation Stud 1004 into the hole until it is flush with the face of the flange.
(33) Repeat the above procedure with the Threaded Barb 1001 of the distal Polymer Universal Control Tube 155.
(34) Slide the Strain Relief Boots and Seals over the Insertion Tube until the threads on the Strain Boot Collar engage with the threads on the Threaded Barb and screw into place until the Strain Boot is flush against the Y-Connector Body.
(35) Insert the Blade Latch Spring (1014) into the Y-Connector Body.
(36) Assemble the Propulsion Tube Barb (1017) and Seal (1016) to the Y-Connector Body.
(37) Secure internally with a Locking Ring (1002).
(38) Insert the Blade Latch (1013) into the slot in the Propulsion Tube Barb (1017) and secure in place with the Blade Latch Screw (1015).
(39) Insert a cable Draw Wire through the Insertion Tube from the proximal to the distal end.
(40) Lay out the Rayon Cable Passing Sleeve on the bench. The sleeve should commence just below the lowest Rib. (NB: The Ribs are designed to grip the inside of the Insertion Tube in normal operation of the Propulsion System. In order to introduce them into the Insertion Tube, they can be compressed and contained in a low friction sleeve to deliver them into the correct position.)
(41) Layout the Propulsion Conduit 1025 with the Ribs 1030 in the centre of the material and the remaining cables and conduits on top.
(42) Wrap the assembly tightly at each Rib location compressing the bundle to less than 11 mm diameter and pin the Sleeve material to maintain the compression. Pin from proximal to distal with the 0.5 mm×3.5M Spring Steel Wire Needle 670 (as shown in FIG. 6C).
(43) Twist and knot the proximal Sleeve material and attach to a Cable Passing Hood together with the proximal loop of the needle Wire to the Draw Wire 680.
(44) Draw the Cable Bundle through the Insertion Tube, Y-Connector and Control Tube 155.
(45) Place a Nitinol Locking Ring over the distal Polymer Insertion Tube.
(46) Reduce the Insertion Tube to the Distal Coil Pipe Collar to its fully seated depth.
(47) Slide the Nitinol Ring into position over the proximal flange of the distal Propulsion Tube Collar 0007.
(48) Heat the Nitinol Locking ring directly with a Temperature Controlled Soldering Iron to 170 Degrees C. (Maximum clamping force is obtained at 165 degrees C.) In this case the components should be assembled, and the Locking Ring cooled with compressed air within (15) ten seconds to prevent heat damage to the underlying polymer layers.)
(49) Remove the Drawing wire, disconnect the Drawing Hood and untie the Rayon Sleeve.
(50) Withdraw the Spring Steel Wire Needle from the proximal end.
(51) While holding the proximal wires and cables, loosen the Rayon sleeve from around its contents via the side hatch of the Y-Connector.
(52) Pull the free end of the Propulsion Tube Conduit 1025 out through the Side Hatch 1009a
(53) Remove the proximal part of the sleeve through the Side Hatch and then withdraw the distal part of the Sleeve. (NB: The distal part of the sleeve should withdraw without placing undue tension on the Light Guides and Camera Cables. Counter force can be applied to the Propulsion Tube Conduit as the Sleeve Material is withdrawn.)
(54) Cut the Propulsion Tube Conduit to length to fit over the connector of the Propulsion Tube Barb (1017).
(55) Place the Conduit Clamp over the Propulsion Tube Conduit.

(56) Loosen the Locking Ring of the Propulsion Tube Barb (1017) and withdraw the Propulsion Tube Barb (1017) sufficiently to allow insertion into the Propulsion Tube conduit. Hold the conduit and avoid kinking as the connector is pushed into its full depth.

(57) Tighten the Locking ring.

(58) Slide the Clamp over barbed section and tighten to secure the Conduit in place.

(59) Pass the Camera cables, Light Guides, and tubes into the Control Body 150.

(60) Reattach the Control Tube 155 to the Control Body 150. (NB: The Control Tube should be connected to orientate the Y-Connector in the same plane as the instrument port and at 90 degrees to the Angulation Control Axis).

(61) Insert the Vacuum Line 1027 through the Control Body 150 and Universal Tube 1094 to the Connector Body 160.

(62) Drill the Connector Body on the side opposite to the Standard Suction Line Connector fitting (Dia. M6).

(63) Place Silicon Sealant under the outer flange of the Barbed Vacuum Line Luer Connector (1029).

(64) Install the 90 Deg. Barbed Vacuum Line Connector through the hole and tighten the internal section with the opening facing towards the Control Body.

(65) Cut the Vacuum Line to length. (1-2 mm from the Connector)

(66) Cut 15 mm of the Vacuum Line Connector Sleeve (1028) material.

(67) Clean the end of the Vacuum Line with Acetone and apply and apply Loctite 15 s Time Control Cyanoacrylate Adhesive to 5 mm of the end of the vacuum line. (NB: Ensure no adhesive obstructs the lumen of the Vacuum Line.)

(68) Insert the Vacuum Line 5 mm into the Vacuum Line Connector Sleeve and allow to set for (1) minute.

(69) Push the Connector Sleeve 1028 over the Threaded Barb and secure with the Miniature Cable Tie over the Barbed Section.

(70) Reconnect the Camera Cables, Light Guides and Water and Air Line connections.

(71) Test that Vacuum is continuous with the Propulsion Tube Conduit at the rear of the Y-Connector.

(72) Close the Connector Housing.

(73) Reconnect the Instrument Chanel and Angulation Cables in the Control Body 150.

(74) Fit the Bending Section Rubber.

(75) Test all system functions.

(76) Close the Control Body.

(77) Apply Silicon Grease to the Y-Connector Hatch Seal (1010)

(78) Insert the Seal into the Y-Connector around the hatch 1009a.

(79) Install the Y-Connector Hatch Cover (1009).

(80) Place Silicon Sealant under the head of the Y-Connector Hatch Cover Screw (1011)

(81) Secure the Hatch with the Y-Connector Hatch Cover Screw.

(82) Secure the Screw Cover Plate (1012) the Hatch Cover with Contact Adhesive (NB: Do not apply Acetone to the Y-Connector or Hatch Cover).

(83) Conduct leak testing in the normal manner.

Figure 12A:
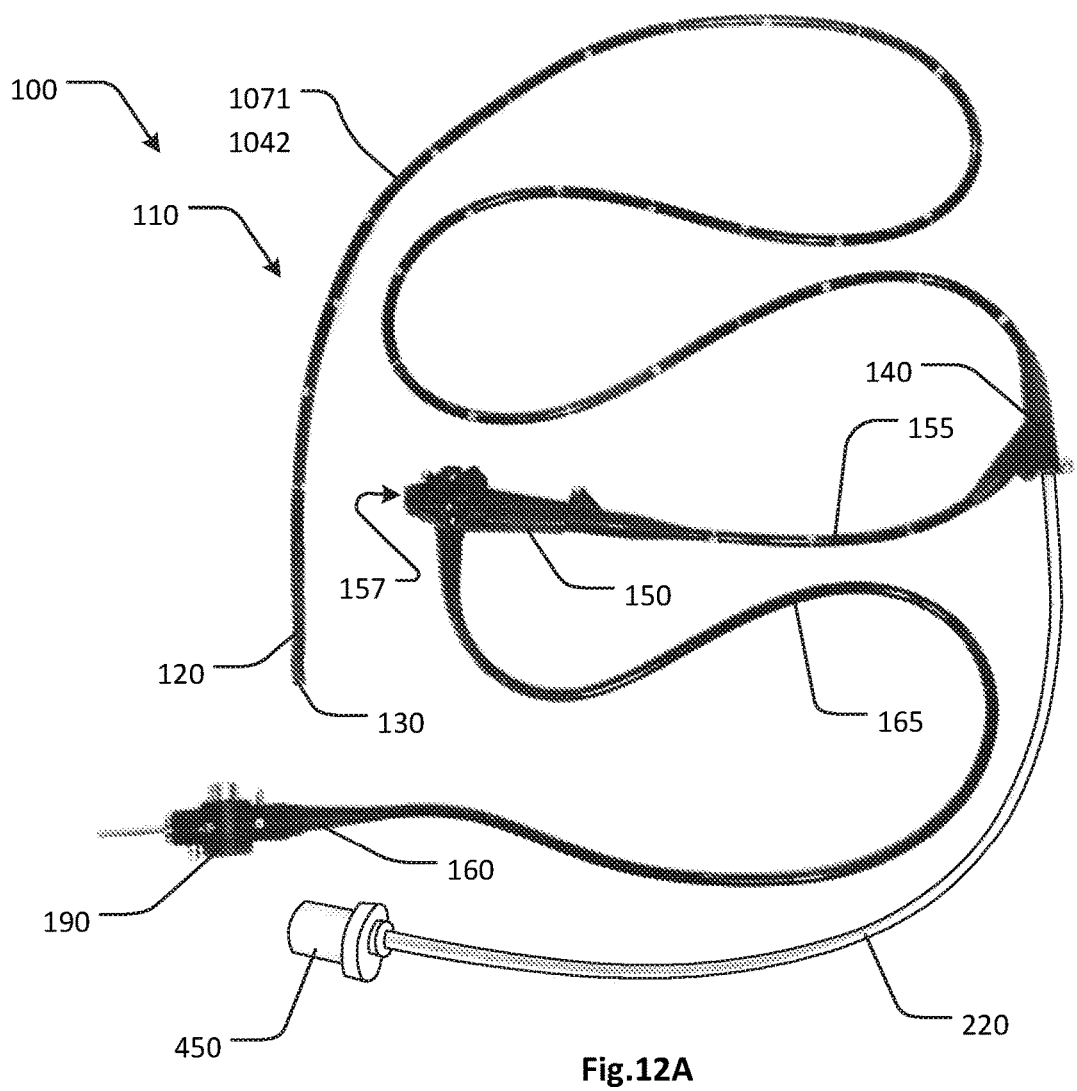
FIG. 12A is a layout drawing of a modified endoscopic system and propulsion tube unit.

Referring to FIG. 12A, an alternative endoscope 110 is shown according to some embodiments. The endoscope may comprise a conventional metal braid insertion tube instead of a polymer insertion tube. Due to the decreased flexibility of conventional metal braid insertion tubes, an alternative distal connector 1035 or 1048 may be used as shown in FIGS. 13 and 14, respectively.

Figure 12B:
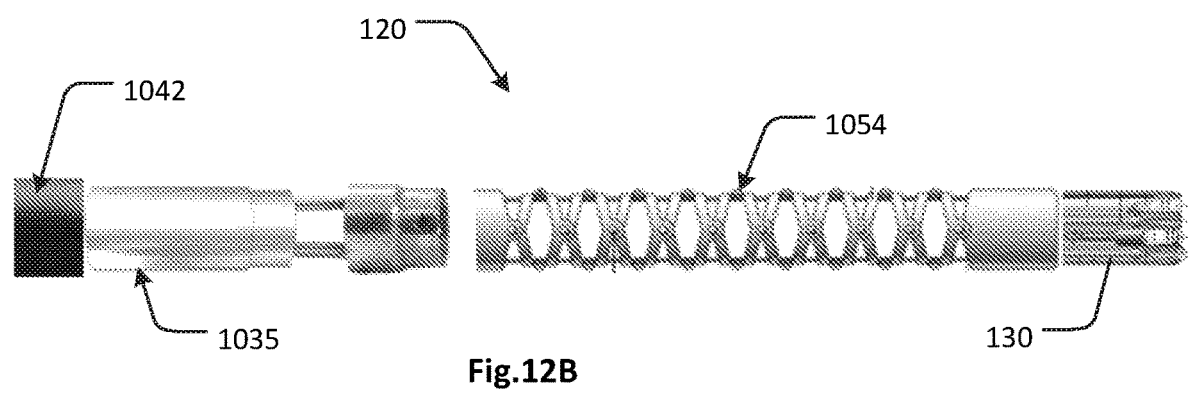
FIG. 12B as a close-up view of the distal connector and bending section of the endoscopic system of FIG. 12A.
Figure 12C:
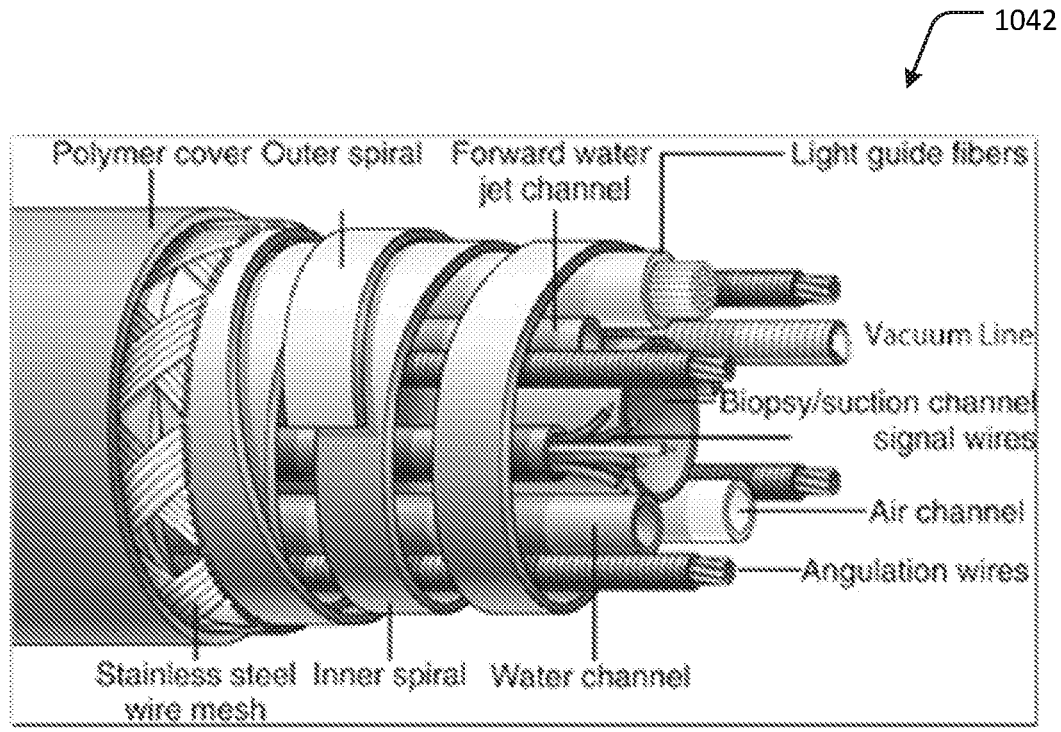
FIG. 12C is a peal back view of a conventional endoscope insertion tube.
Figure 12D:
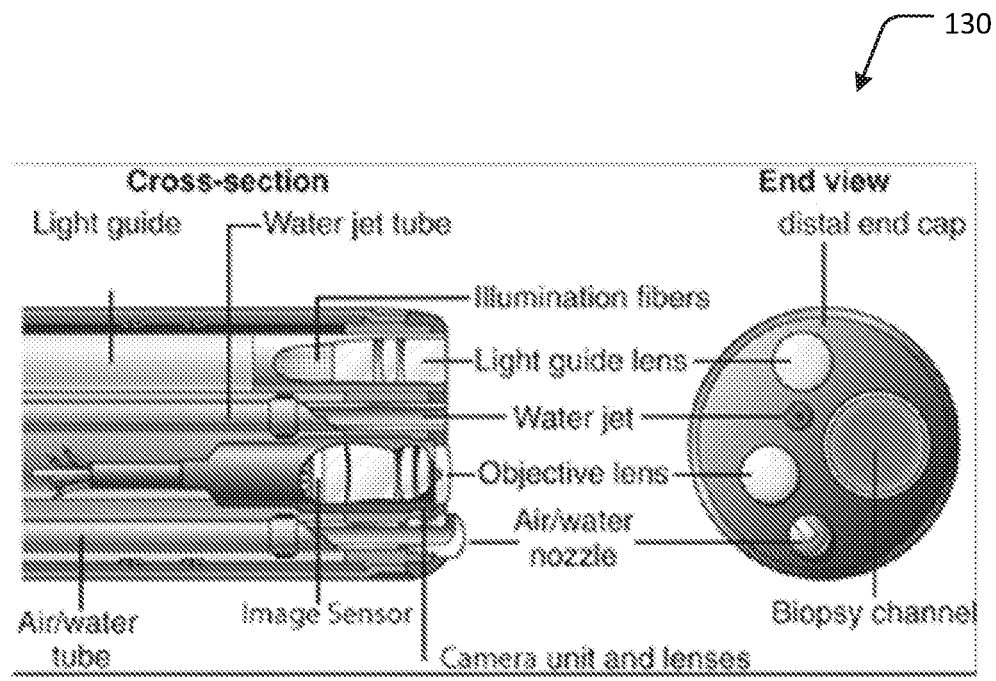
FIG. 12D shows a cross-section and end view of a distal head of the conventional endoscope.

FIGS. 12C and 12D illustrate the construction of a conventional insertion tube and distal head.

The connector 1035, 1048 may define the terminus 700 as described above without defining angulation cable conduits, and the aperture may be relatively larger to allow for the other cables and conduits to pass the terminus 700. The connector 1035, 1048 may be connected to a conventional coil pipe collar as shown in FIG. 12B to connect the bending section to the insertion tube 1042 and provide a terminus for the propulsion tube conduit 1025. For example, insertion tube 1042 may comprise a conventional type insertion tube, or one of the alternative insertion tubes 1071, 571 described above.

Referring to FIG. 13F, the vacuum line 1027 may extend through the connector 1035, 1048 and curved back towards a distal end of the terminus to be received in the vacuum line socket 742.

A conventional endoscope with a metal braid insertion tube may be modified according to the following assembly instructions so that it becomes suitable for use with the propulsion system 200. The parts used are substantially similar to the parts disclosed in the list above, with the exception of Threaded Barbed Connector 1001, Insertion Tube Locking Band 1023, Coil Pipe/PTC Distal Collar 0007, Vacuum Manifold Set Screw 0008, and polymer Insertion Tube 1071. In some embodiments, these parts may be, substituted or replaced with Threaded Socket 1034, and Propulsion Tube Collar 1035, 1048.

In some embodiments, the endoscope 110 may be constructed by modification of an existing 3.3M×12.9 mm Dia. Veterinary Endoscope. Such as the Olympus 160/180 Series, Pentax 70K Series, and Fujifilm Medical Systems 530/600 Series, for example.

In general terms, the assembly of the endoscope 110 shown in FIG. 12A comprises inserting a Y-Connector 140 into the Insertion Tube 1042 approximately 30 cm below the Control Body 150. The Y-Connector allows for the insertion of the Propulsion Tube from the Propulsion Console. Two additional conduits are installed in the Insertion Tube: (i) Propulsion Tube Conduit (ii) Vacuum Line. At the distal end, these conduits terminate at a custom Propulsion Tube Collar 1035, 1048 into which they insert. At the proximal end the Propulsion Tube Conduit terminates at the Y-Connector 140 and the Vacuum Line 1027 terminates at the Light Source/Camera Connector 160. An additional Small Luer Suction Port is installed into the Light Source/Camera Connector Housing to provide suction to the vacuum line 1027.

The following assembly instructions may be followed to produce the endoscope 110 shown in FIG. 12A, according to some embodiments.

(1) Dismantle the Control Body and Light Source/Camera Connector.

(2) Disconnect Angulation Cables, Light Guides, Camera Cables, and Biopsy Port.

(3) Remove the Bending Section Rubber.

(4) Disconnect the Bending Section from the Insertion Tube.

(5) Disconnect the Coil Pipe Collar from the Bending Section.

(6) Withdraw the contents of the Insertion Tube from the distal end.

(7) Remove the Coil Pipe Distal Collar and Coil Pipes from the Angulation Cables.

(8) Remove the Bending Section from Camera Head.

(9) Replacement of the Image Sensor Cable—Due to the large diameter of the OEM cable it is necessary to replace the cable with a smaller diameter cable for the section which runs through the Insertion Tube to the Y-Connector. The distal connection should be made at the location just distal to the junction of the Distal Coil Pipe Collar 1035, 1048 and the Bending Section 120. The proximal connections should be made within the Control Body 160 to the existing cable-connection points.

(10) Cut the Cable at the prescribed location and solder the replacement cable, wire for wire, using double-insulation technique, use shielded adhesive heat shrink as a final cover of all connections.

(11) Prepare the Propulsion Tube Conduit Assembly: Cut 3100 mm of the Propulsion Tube Conduit Material. (1025) (PTFE 6/5 mm)

(12) Attachment of the Propulsion Tube Conduit to the Propulsion Tube Collar (1035): Clean the external distal 7 mm and internal 3 mm of the tube with acetone and allow to dry. (NB: Limit the acetone contact to the area to be bonded.)

(13) Using 100 Grit Abrasive Paper, roughen the internal surfaces of the Propulsion Tube Collar or terminus socket 705.

(14) Clean the surfaces with acetone and allow to dry.

(15) Place a wire or Pipe Cleaner through the Vacuum Line hole from the rear to prevent the hole being obstructed by adhesive during the bonding process.

(16) Apply Loctite Activator compound (1045) to the distal 8 mm and internal 3 mm of the Propulsion Tube Conduit and leave for the specified penetration time. (30 sec)

(17) Apply Loctite Time Control Adhesive (1046—Power Easy Gel) to the internal metal surfaces of the socket 705 (NB: Avoid excess adhesive to prevent extrusion into the lumen of the tube which may obstruct the central Vacuum Line hole (striking block aperture 740)).

(18) With the Collar mounted vertically, insert the Propulsion Tube Conduit into the Propulsion Tube Collar, ensuring it is seated at the full depth.

(19) Hold the components together with force for a minimum of two (2) minutes to ensure the initial cure of the adhesive.

(20) Remove the wire from the Vacuum Line hole to ensure it is not bonded to the Collar (leave the components in the vertical position for a minimum of 12 hours before handling to ensure maximum bond strength and minimize the risk of adhesive sag).

(21) Prepare the Vacuum Tube material PTFE 2 mm/1 mm (1027). One end is pre-bent in a U-shape. (NB: The bend radius of the material has been tested to not kink and obstruct down to a radius of 8 mm.) Clean the external distal 5 mm of the tube with acetone.

(22) Insert the entire U-Section of the Vacuum Line through the larger diameter end of the Propulsion Tube Collar and out the opposite end. (NB: Do not substantially decrease the pre-bent radius of the bend or the tube will kink and obstruct airflow.)

(23) Apply Loctite Activator compound (1045) to the distal 5 mm of the Vacuum Line Tube and leave for the specified penetration time. (30 sec)

Figure 13E:
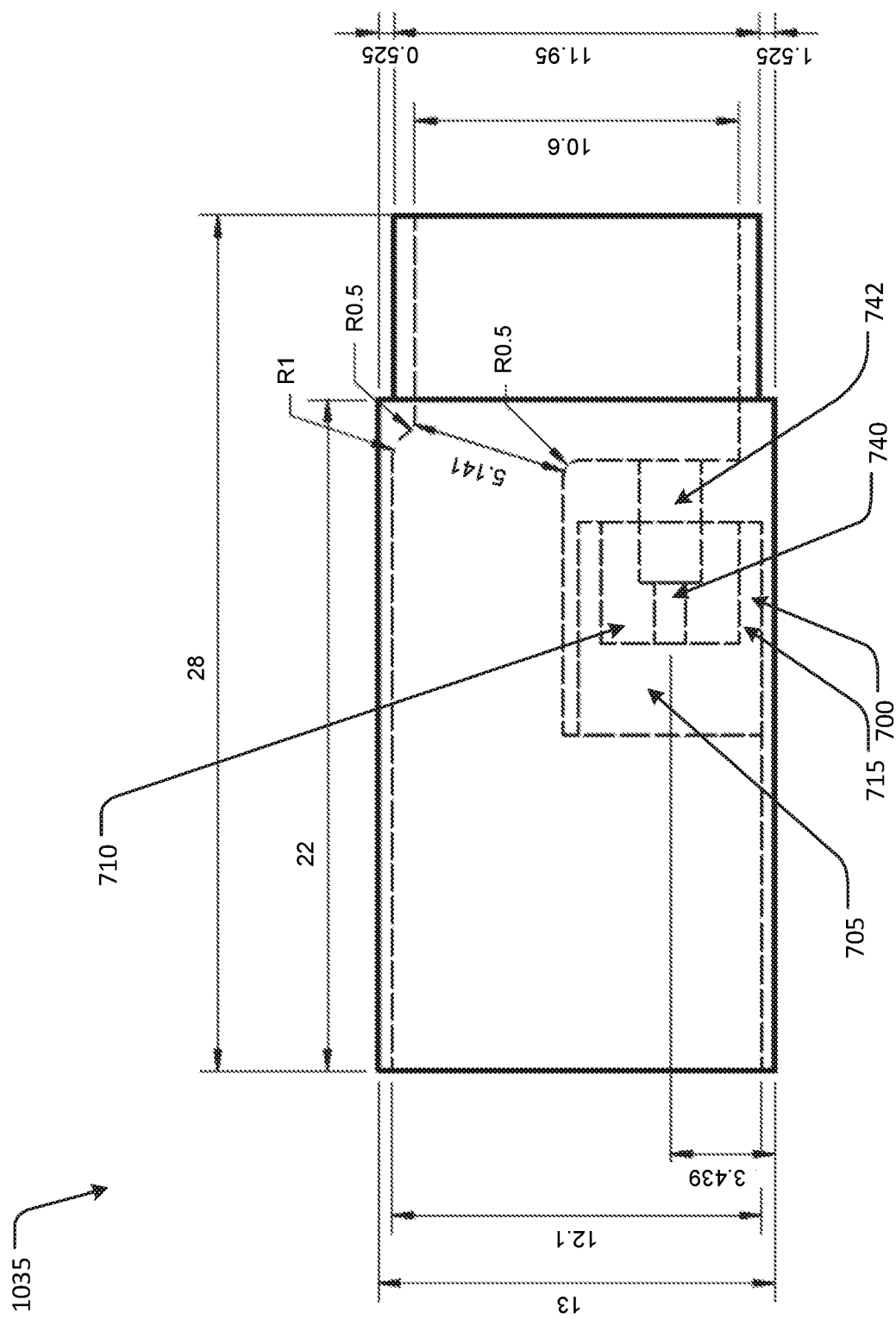
FIG. 13E is a side view of the connector of FIG. 13A.

(24) Apply Loctite Time Control Adhesive (1046—Power Easy Gel) to the internal metal surfaces of the vacuum line socket 742 as indicted in FIGS. 13E and 13F. (NB: Avoid excess adhesive to prevent extrusion into the lumen of the tube which may obstruct the central Vacuum Line hole 740).

(25) While taking care not to crush or reduce the diameter of the tube, insert the tip of the Vacuum Line into the vacuum line socket 742.

(26) Allow the adhesive to cure for at least 60 minutes before continuing with the build.

(27) Insert the Image Sensor Cable, Light Guides, Biopsy Tube, and Pipes through the Bending Section.

(28) Insert the Angulation Cables into the distal Coil Pipes 440 from the distal end.

(29) Insert the Image Sensor Cable, Light guides, Biopsy Tube and Pipes through the Distal Coil Pipe Collar.

(30) Insert the Collar into the Bending Section and fix the Bending Section to the Collar with the four (4) Fixation Screws.

(31) Assembly of the Strain Boots to the Strain Boot Collar: Roughen the external surface of the Strain Boot Collar, clean with acetone, and allow to dry. (NB: Do not apply acetone to the rubber Strain Boot.)

(32) Ensure internally threaded end of the Strain Boot Collar is towards the larger end of the Strain Boot. Apply Loctite Time Control Adhesive (1046—Power Easy Gel) to the internal recessed surface of the Strain Boot.

(33) Rapidly insert the Strain Boot Collar into the Strain Boot so that it seats on the internal recess before the adhesive starts to cure.

(34) Leave for several minutes to allow bonding before handling the assembled unit.

(35) Repeat steps, (34)-(36) with the second Strain Boot and Strain Boot Collar.

(36) Assemble the components of the Y-Connector as per the exploded view drawing, without the Strain Relief Boots or Hatch attached.

(37) Reproduction of the Insertion Tube Length: The variation in design requires the cutting of the Insertion Tube to compensate for the additional length induced by the addition of the Propulsion Tube Collar and the Y-Connector Assembly. For descriptive purposes, the Insertion Tube distal to the Y-Connector will be termed the "Distal Insertion Tube" or insertion tube 1041 and the section between the Y-Connector 140 and the Control Body 150 will be referred to as the "Control Tube 155." The original length of the Insertion Tube must now be made to be equal to the sum of (a) The length of the Propulsion Tube Collar [22 mm], plus (b) The length of the Distal Insertion Tube [3000 mm], plus (c) the length of the Y-Connector (from the distal Threaded Socket to the proximal Threaded Socket) [length to be measured], plus (d), the length of the Control tube 155 [to be calculated]. The variation to the total length will be made by reducing the length of the Control tube 155 segment. The length of the Control tube 155 segment is calculated by subtracting lengths (a), (b), & (c) from the length of the original Insertion Tube.

(38) Lay out the Insertion Tube, Bending Section, and cables to measure the location at which to cut the insertion tube to connect to the distal Threaded Socket 1034 of the Y-Connector Assembly 140.

(39) Mark the Insertion Tube with tape at the 3-metre mark (3000 mm)

(40) Cover the Insertion Tube above and below the marked resection points with a single layer of Duct Tape to prevent damage to the surface of the Insertion Tube.
(41) Cut the Insertion Tube at the marked points with a Rotary Tube Cutter.
(42) Measure 15 mm from the cut end of the Insertion Tube and remove the polyurethane coating exposing 15 mm of the braided metal core of the Insertion Tube. Ensure that the coating is removed as much as possible using solvent and abrasive paper if required. A substantial amount of the bare metal braid should be visible for good epoxy bonding.
(43) Slide the Strain Relief Boots over the Insertion tube and Control tube 155 sections, followed by the O-Ring Seal (1003), so that they can be slid into position when required.
(44) Remove the distal Threaded Socket (1034) from the Y-Connector Body.
(45) Roughen the inside of the non-threaded end of the Threaded Socket with 100 Grit Abrasive Paper to a depth of 15 mm. Clean with acetone and allow to dry.
(46) Apply High Strength Epoxy Resin Adhesive to the prepared cut end of the Distal Insertion Tube and insert into the Threaded Socket. Remove excess adhesive and allow to set for the required bonding time for maximum bond strength.
(47) Lay out the Insertion Tube, Bending Section, and Cables to measure the location at which to cut the Control tube 155 segment to the correct length for connection to the Proximal Threaded Socket 1034 of the control tube branch 144 of the Y-Connector Assembly 140.
(48) Calculate the length of the Control tube 155 Segment as per (39) above. Allow for the length of the Insertion Tube which will insert into the Threaded Socket—15 mm.
(49) Mark the calculated length of the Control tube 155 segment with tape to indicate the location of the cut.
(50) Double-check that the calculated length will allow the reconnection of the Angulation Cables, Biopsy Channel, etc.
(51) Cover the Control tube 155 above and below the marked resection points with a single layer of Duct Tape to prevent damage to the surface of the Insertion Tube.
(52) Cut the Insertion Tube at the marked points with a Rotary Tube Cutter.
(53) Measure 15 mm from the cut end of the Insertion Tube and remove the polyurethane coating exposing 15 mm of the braided metal core of the Insertion Tube. Ensure that the coating is removed as much as possible using solvent and abrasive paper if required. (A substantial amount of the bare metal braid should be visible for good epoxy bonding).
(54) Assemble both Insertion Tube sections to the Y-Connector Body as per the Exploded View drawing. Place the O-Ring Seal (1007) over the long-threaded end of the Threaded Socket and insert the Threaded Socket into the distal end of the Y-Connector Body.
(55) Place the Locking Ring (1002) on the inside of the Y-Connector Body and screw the long-threaded end of the Threaded Socket into it from the distal end of the Y-Connector Body. (NB: A small screwdriver blade or angled probe may be inserted through the side hatch 1009a of the Y-Connector Body 1008 and into one of the side notches of the Locking Ring 1002 to prevent the Locking Ring from rotating as the Threaded Socket 1034 is tightened.)
(56) Tighten the Threaded Socket so that one of the notches in the flange aligns with the hole at the 12:00 o'clock position on the face of the Y-Connector Body.
(57) Insert the Anti-Rotation Stud (1004) into the hole until it is flush with the face of the flange.
(58) Repeat the above procedure with the Control tube 155 segment.
(59) Slide the O-Ring Seal (1003) over the short-threaded section of the Threaded Socket.
(60) Slide the Strain Relief Boots over the Insertion Tube until the threads on the Strain Boot Collar engage with the threads on the Threaded Socket and screw into place until the Strain Boot is flush against the Y-Connector Body.

Setting the Length of the Propulsion Tube Conduit 1025.
(61) Insert a Cable Draw Wire through the Insertion Tube from the proximal (Y-Connector side hatch) to the distal end. Tape the Propulsion Tube Conduit and Vacuum Line to the Draw Wire.
(62) Draw the Propulsion Tube Conduit and Vacuum Line through the Distal Insertion Tube and out through the side hatch of the Y-Connector.
(63) Insert the distal end of the Distal Insertion Tube into the Propulsion Tube Collar in order to get the correct length for the Propulsion Tube Conduit at its termination point within the Y-Connector.
(64) Insert the Propulsion Tube Barbed Connector (1017) through the Seal (1016) into the Y-Connector Body.
(65) Mark the Propulsion Tube Conduit, approximately 2 mm short of the barbed section of the connector.
(66) Cut the Propulsion Tube Conduit at the marked point.
(67) Remove the Propulsion Tube Barbed Connector (1017) and Seal (1016).
(68) Chamfer the inside of the cut surface of the Propulsion Tube Conduit with a Countersinking or Deburring Tool.
(69) Retape a short Draw Wire to the Propulsion Tube Conduit so it can be easily manipulated while passing the other cables and tubes through the Y-Connector.
(70) Separate the Propulsion Tube Collar from the Distal Insertion Tube to facilitate passing of the other wires and cables.
(71) Taking care not to kink the Vacuum Line, insert the Image Sensor Cable, Light Guides, Biopsy Channel, Pipes, and Angulation Cables through the lumen 730 of the Propulsion Tube Collar/Propulsion Tube Conduit assembly.
(72) Draw the Image Sensor Cable, Light Guides, Biopsy Channel, Coil Pipes, and Angulation Cables through the Distal Insertion Tube, and through the Y-Connector to the Control Body.
(73) Abrade and clean the end of the Propulsion Tube Collar and the internal area of the Coil Pipe Collar.
(74) Apply High-Strength Epoxy Adhesive to the distal end of the Propulsion Tube Collar and insert into the Coil Pipe Collar.
(75) Abrade and clean the end of the Distal Insertion Tube and the inner surface of the Propulsion Tube Collar.
(76) Apply High-Strength Epoxy Adhesive to the distal end of the Distal Insertion Tube and insert into the Propulsion Tube Collar. (NB: These joints are under high load, so they should be left for the prescribed setting time to achieve maximum bond strength.)

(77) Attaching the Connector Sleeve to the Propulsion Tube Conduit: Take Propulsion Tube Collar-Joiner (length of polymer tube to fit over barb 1017 and conduit 1025) and cut to 28 mm length.

(78) Mark the sleeve 8 mm from one end.

(79) Apply Loctite Activator to 20 mm of the proximal end of the Propulsion Tube Conduit via the Y-Connector Hatch 1009a.

(80) Apply Loctite Time Control Adhesive (1046—Power Easy Gel) to the coated section of the Propulsion Tube Conduit.

(81) Insert the Propulsion Tube conduit 20 mm into the sleeve and allow to set.

(82) Place a Locking Ring (1002) over the Propulsion Tube Conduit in the Y-Connector Body 1008.

(83) Insert the Propulsion Tube Barbed Connector (1017) through the Seal (1016) into the Y-Connector Body.

(84) Insert the Propulsion Tube Barb (1017) sufficiently to allow insertion of the barbed section into the Propulsion Tube Conduit Connector Sleeve.

(85) Heat the Sleeve with hot air to soften the material slightly. Hold the Conduit and avoid kinking as the barbed portion of the Connector is pushed into the Sleeve to its full depth. There should be no gap between the Barbed Connector and the inner Propulsion Tube Conduit.

(86) Place the Locking Ring onto the threaded section and tighten using a hook probe in the side slots of the Locking Ring.

(87) Place a miniature Cable Tie over the Barbed section and tighten to secure the Conduit in place.

(88) Trim the Cable Tie to ensure there is clearance for the Hatch Cover to close.

(89) Insert the Blade Latch Spring (1014) into the Y-Connector Body. (NB: It can be introduced through Blade Latch slot by sliding it over a 0.5 mm wire into the spring hole).

(90) Insert the Blade Latch (1013) into the slot in the Propulsion Tube Barb (1017) and secure in place with the Blade Latch Screw (1015).

(91) Insert the Vacuum Line 1027 through the Control Body 150 and Universal Tube 1094 to the Connector Body 160.

(92) Drill the Light Source Connector Body (Dia. 5 mm (3/16")) on the side opposite to the Standard Suction Line Connector fitting.

(93) Place Silicon Sealant under the outer flange of the Luer Vacuum Line Connector (1029).

(94) Install the Luer Vacuum Line Connector through the hole and tighten the internal nut.

(95) Cut 15 mm of the Vacuum Line Connector Sleeve (1028) material. Clean the end of the Vacuum Line with Acetone and apply Loctite Activator. and wait for the required penetration time.

(96) Apply Loctite 15 s Time Control Cyanoacrylate Adhesive to 5 mm of the end of the Vacuum Line. (NB: Ensure no adhesive obstructs the lumen of the Vacuum Line).

(97) Insert the Vacuum Line 5 mm into the Vacuum Line Connector Sleeve.

(98) Push the Connector Sleeve over the barbed portion of the Luer Vacuum Line Connector (1029).

(99) Reconnect the Camera Cables, Light Guides, and Air Line connections.

(100) Test that the Vacuum is continuous with the Propulsion Tube Conduit at the rear of the Y-Connector.

(101) Close the Light Source Connector Housing.

(102) Reconnect the Biopsy/Instrument Channel and Angulation Cables in the Control Body.

(103) Replace the Bending Section Rubber.

(104) Test all system functions.

(105) Close the Control Body.

(106) Apply Silicon Grease to the Y-Connector Hatch Seal (1010).

(107) Insert the Seal into the Y-Connector body 1008 around the side hatch 1009a.

(108) Install the Y-Connector Hatch Cover (1009).

(109) Place Silicon Sealant under the head of the Y-Connector Hatch Cover Screw (1011).

(110) Secure the Hatch with the Y-Connector Hatch Cover Screw.

(111) Secure the Screw Cover Plate (1012) the Hatch Cover with Contact Adhesive. Do not apply Acetone to the Y-Connector or Hatch Cover.

Figure 15:
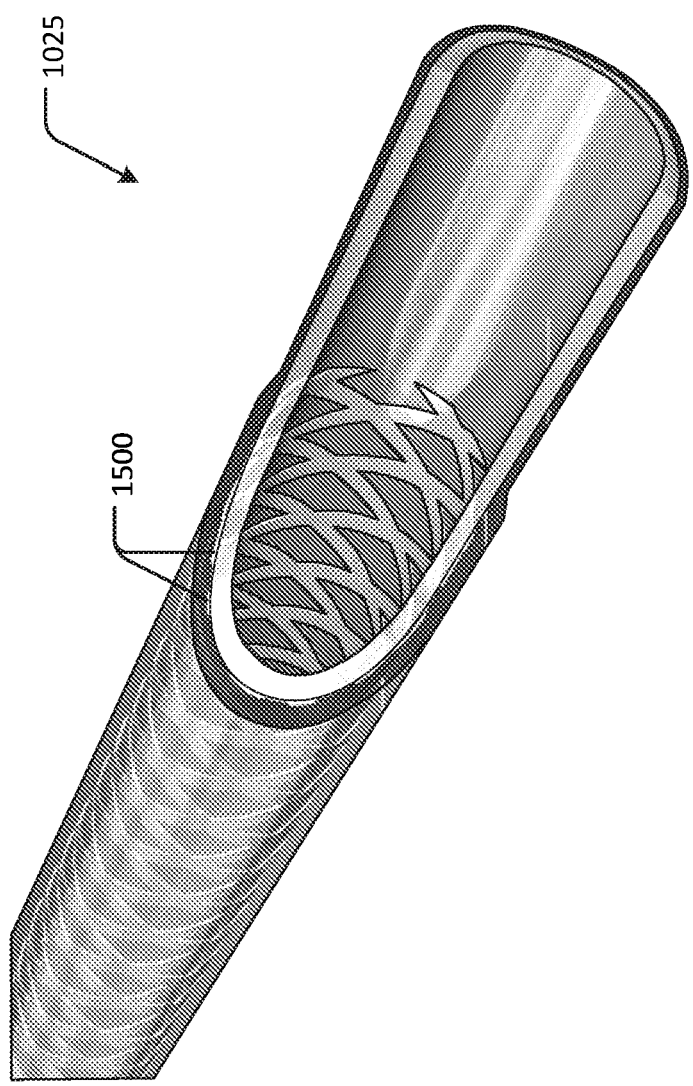
FIG. 15 is a perspective view of a propulsion tube conduit according to some embodiments.

Referring to FIG. 15, in some embodiments the propulsion tube conduit 1025 may comprise reinforcing fibres 1500, such as Kevlar or ultra high molecular weight polyethylene, for example. The reinforcing fibres 1500 may be formed in a woven or braided mesh sandwiched between an inner layer and an outer layer. The inner layer may be formed of PTFE, for example. The outer layer may be formed of Pebax™, for example. The propulsion tube conduit 1025 may have an outer diameter of 6 mm and in a diameter of 5 mm, for example.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An endoscope comprising an insertion tube and a propulsion tube unit, the propulsion tube unit comprising:
   an elongate propulsion tube comprising a first end and a second end opposite the first end, the tube defining a channel configured to accommodate a liquid, a first end of the channel being closed at or near the first end of the tube and a second end of the channel being defined by the second end of the tube;
   a mechanism for promoting gas nucleation or cavitation at a distal end of the propulsion tube; and
   a piston assembly connected to the second end of the tube, the piston assembly comprising:
      a body defining a bore in fluid communication with the channel of the tube; and
      a movable piston disposed within the bore and configured to seal against an internal surface of the bore,
   wherein the piston assembly and the propulsion tube cooperate to define a sealed vessel containing a selected mass of fluid, the fluid including liquid.

2. The endoscope of claim 1, wherein the elongate propulsion tube is bonded to the insertion tube.

3. The endoscope of claim 1, wherein the elongate propulsion tube is integrally formed with the insertion tube.

4. The endoscope of claim 1, wherein the propulsion tube unit further comprises one or more mechanisms configured to promote gas nucleation or cavitation in a plurality of regions spaced along at least part of the length of the channel in the distal portion of the propulsion tube when the pressure is reduced.

5. The endoscope of claim 1, wherein the mechanism for promoting gas nucleation or cavitation at the distal end of the propulsion tube comprises a layer of porous material configured to form an internal distal end surface of the propulsion tube.

6. The endoscope of claim 5, wherein the porous material comprises a porous ceramic material.

7. The endoscope of claim 1, wherein the mechanism for promoting gas nucleation or cavitation at the distal end of the propulsion tube comprises an acoustic transducer positioned near the distal end of the propulsion tube.

8. The endoscope of claim 7, wherein the acoustic transducer comprises an active piezo ceramic transducer element.

9. The endoscope of claim 1, wherein the mechanism for promoting gas nucleation or cavitation at the distal end of the propulsion tube comprises a material of relatively higher thermal conductivity at the distal end of the propulsion tube compared with an adjacent portion of the propulsion tube.

10. The endoscope of claim 1, wherein the mechanism for promoting gas nucleation or cavitation at the distal end of the propulsion tube comprises a catalytic material forming at least part of an internal distal end surface of the propulsion tube.

11. An endoscope comprising an insertion tube and a propulsion tube unit, the propulsion tube unit comprising:
an elongate propulsion tube comprising a first end and a second end opposite the first end, the tube defining a channel configured to accommodate a liquid, a first end of the channel being closed at or near the first end of the tube and a second end of the channel being defined by the second end of the tube;
a mechanism for promoting gas nucleation or cavitation at a distal end of the propulsion tube; and
a diaphragm pump assembly connected to the second end of the tube, the diaphragm pump assembly comprising:
a body defining a chamber in fluid communication with the channel, the chamber extending between a first opening and a second opening; and
a diaphragm covering the first opening of the chamber, the diaphragm comprising a resiliently deformable membrane;
wherein the diaphragm pump assembly and the tube cooperate to define a sealed vessel containing a selected mass of fluid, the fluid including liquid.

12. The endoscope of claim 11, wherein the elongate propulsion tube is bonded to the insertion tube.

13. The endoscope of claim 11, wherein the elongate propulsion tube is integrally formed with the insertion tube.

14. The endoscope of claim 11, wherein the propulsion tube unit further comprises one or more mechanisms configured to promote gas nucleation or cavitation in a plurality of regions spaced along at least part of the length of the channel in the distal portion of the propulsion tube when the pressure is reduced.

15. The endoscope of claim 1, wherein the mechanism for promoting gas nucleation or cavitation at the distal end of the propulsion tube comprises a layer of porous material configured to form an internal distal end surface of the propulsion tube.

16. The endoscope of claim 15, wherein the porous material comprises a porous ceramic material.

17. The endoscope of claim 11, wherein the mechanism for promoting gas nucleation or cavitation at the distal end of the propulsion tube comprises an acoustic transducer positioned near the distal end of the propulsion tube.

18. The endoscope of claim 17, wherein the acoustic transducer comprises an active piezo ceramic transducer element.

19. The endoscope of claim 11, wherein the mechanism for promoting gas nucleation or cavitation at the distal end of the propulsion tube comprises a material of relatively higher thermal conductivity at the distal end of the propulsion tube compared with an adjacent portion of the propulsion tube.

20. The endoscope of claim 11, wherein the mechanism for promoting gas nucleation or cavitation at the distal end of the propulsion tube comprises a catalytic material forming at least part of an internal distal end surface of the propulsion tube.

* * * * *